US012715156B1

(12) United States Patent
Ruhe et al.

(10) Patent No.: US 12,715,156 B1
(45) Date of Patent: Aug. 25, 2026

(54) CHIP CHOPPER SYSTEM

(71) Applicant: J.C. Ford Company, Columbia, TN (US)

(72) Inventors: Scott David Ruhe, Yorba Linda, CA (US); Jason Paul Pealo, Yorba Linda, CA (US); Keith Edward Wilkey, Franklin, TN (US); Manuel Maldonado, Montclair, CA (US); Ray Hammoud, Columbia, TN (US)

(73) Assignee: J.C. Ford Company, Columbia, TN (US)

(*) Notice: Subject to any disclaimer, the term of this patent is extended or adjusted under 35 U.S.C. 154(b) by 146 days.

(21) Appl. No.: 18/900,332

(22) Filed: Sep. 27, 2024

Related U.S. Application Data

(60) Provisional application No. 63/586,993, filed on Sep. 29, 2023.

(51) Int. Cl.
*B26D 7/06* (2006.01)
*B26D 1/00* (2006.01)
*B26D 1/03* (2006.01)

(52) U.S. Cl.
CPC ......... *B26D 7/0641* (2013.01); *B26D 1/0006* (2013.01); *B26D 1/03* (2013.01); *B26D 2001/0033* (2013.01); *B26D 2210/02* (2013.01)

(58) Field of Classification Search
CPC ....... B26D 7/0641; B26D 1/0006; B26D 1/03
See application file for complete search history.

(56) References Cited

U.S. PATENT DOCUMENTS 1,020,873 A * 3/1912 Anschel ............... B26D 1/0006 83/676
3,851,442 A * 12/1974 Miles ...................... B65B 25/08 53/157
3,866,741 A * 2/1975 Carbon .................. B65G 57/11 414/790.7
4,074,509 A * 2/1978 Miles ...................... B65B 25/08 53/157
4,276,318 A * 6/1981 Orlowski ............. A22C 7/0076 425/351
4,768,941 A * 9/1988 Wagner ................ A22C 7/0084 425/197
5,139,801 A * 8/1992 deJesus Montemayor .................. A21C 15/002 118/13
5,249,914 A * 10/1993 Cahlander ............... A47J 27/14 414/794.3
5,846,584 A * 12/1998 Capodieci ................. A23L 5/32 426/512

(Continued)

*Primary Examiner* — Sean M Michalski
(74) *Attorney, Agent, or Firm* — Knobbe, Martens, Olson & Bear, LLP

(57) ABSTRACT

A system for cutting a food product can include a support frame, an infeed conveyor, a discharge conveyor, and/or one or more cutting assemblies. The infeed conveyor and the discharge conveyor can be support by the support frame, with the one or more cutting assemblies operationally positioned between the infeed conveyor and the discharge conveyor. The infeed conveyor can be configured to receive the food product and transport the food product to the one or more cutting assemblies for processing. The one or more cutting assemblies can be configured to cut the food product, which can be directed to the discharge conveyor to convey the cut food product away from the system.

20 Claims, 31 Drawing Sheets

(56) References Cited

U.S. PATENT DOCUMENTS

| | | | | | |
|---|---|---|---|---|---|
| 5,918,538 | A * | 7/1999 | Rodriguez | A21C 15/04 | 99/489 |
| 6,052,969 | A * | 4/2000 | Hart | B65B 35/52 | 53/247 |
| 6,244,153 | B1 * | 6/2001 | McInnes | B26D 3/30 | 83/870 |
| 6,318,225 | B1 * | 11/2001 | Longoria | B26D 3/24 | 53/514 |
| 6,585,477 | B1 * | 7/2003 | Lawrence | B65B 35/50 | 414/793.1 |
| 6,634,483 | B1 * | 10/2003 | Longoria | B65G 23/38 | 198/577 |
| 7,513,450 | B2 * | 4/2009 | Young | B26D 3/26 | 241/292.1 |
| 8,495,941 | B2 * | 7/2013 | Farid | B26D 7/0608 | 83/633 |
| 8,513,571 | B2 * | 8/2013 | Gonzalez | A21B 3/07 | 99/393 |
| 10,518,432 | B2 * | 12/2019 | Aikens | B26D 1/0006 | |
| 11,019,826 | B2 * | 6/2021 | Scherz | B65B 35/44 | |
| 2007/0215736 | A1 * | 9/2007 | Young | B26D 3/26 | 241/292.1 |
| 2013/0025420 | A1 * | 1/2013 | Gerhardt | B26D 7/08 | 83/13 |
| 2015/0135921 | A1 * | 5/2015 | Martinez-Montes | B26D 7/0625 | 83/365 |
| 2019/0216097 | A1 * | 7/2019 | Scherz | B26D 7/0625 | |
| 2021/0260784 | A1 * | 8/2021 | Engel-Hall | B26D 7/34 | |

* cited by examiner

CHIP CHOPPER SYSTEM

PRIORITY INFORMATION

Any and all applications for which a foreign or domestic priority claim is identified in the Application Data Sheet as filed with the present application are hereby incorporated by reference under 37 C.F.R. § 1.57.

This application claims the benefit of U.S. Provisional Patent Application No. 63/586,993, filed Sep. 29, 2023, the entire contents of which is hereby incorporated by reference in its entirety.

BACKGROUND

Field

The disclosure relates to improvements in high speed production assemblies, systems, and devices for comestible products (e.g., tortillas and tortilla chips). More specifically, the disclosure relates to chip chopper systems for tortilla production assemblies.

Related Art

Corn tortillas are cut from a sheet of corn dough, called "masa," and then baked and/or fried. In mass production, the sheeting and cutting stages are accomplished by a tortilla sheeter. In tortillas chip production, the tortillas undergo a second cutting stage using a chip chopper system.

SUMMARY

Various systems, methods, and devices are disclosed for providing a cutting system for high speed production assemblies. The systems, methods, and devices of the disclosure each have several innovative aspects, no single one of which is solely responsible for the desirable attributes disclosed herein.

In some production assemblies for the production of corn tortillas and tortilla chips, pre-cooked units can be cut from a sheet of corn dough, called "masa," and then can be baked and/or fried. In a tortilla production assembly, the sheeting and cutting stages are usually accomplished by a tortilla sheeter. Tortilla sheeters ("sheeters") can be configured as large units that can weigh approximately 15,000 pounds or heavier and can be 10-15 feet tall or taller. Generally, the sheeter can receive a flow of masa from a feed system that delivers a flow of masa from a masa source system. The feed system and sheeter may operate for long periods of time (e.g., multiple days) without stops in production. The sheeter may receive approximately 3000 to 6000 pounds of masa per hour from the feed system. The sheeter can be configured to form the feed of masa into a sheet for generating pre-cooked masa units. The pre-cooked masa units can be transferred to an oven and can undergo a baking process. Once baked, the pre-cooked masa units may be considered tortillas. In some cases, the tortillas can be transferred from the oven to cooling or equilibrating devices to allow the tortillas to cool.

When the tortilla production assembly is configured for tortilla chip production, the tortillas can be transferred from the ovens/cooling systems to a chip chopper system. In conventional chip chopper systems, the tortillas are usually fed first into a counter stacking system. The counter stacker system counts the number of tortillas received and produces large stacks of tortillas (e.g., 100 tortillas) that can weight approximately five to ten pounds. Because the tortillas are fresh from the baking process, the tortillas are too soft to be processed or cut by the chip choppers. Generally, the stacks of tortillas are transported to a storing area, where the tortillas stacks undergo a waiting period before being transferred to a chip chopper. The waiting period is typically around 24 hours, which allows the tortillas to harden. Due to the high volume of production, thousands of pounds of tortillas can be produced by the tortilla production assembly each day. As a result, a large storage facility is required to store the stacks of tortillas for the waiting period.

After this waiting period, the tortillas stacks can be transferred to the chip chopper. The chip choppers can include a large vertical press that pushes the entire stack of tortillas through blades (e.g., 4-6 blades) to produce triangular shaped tortillas pieces. This process results in a tortilla with a round edge and two sharp edges, which is desirable for the consumer. The cut tortilla pieces may then be fried or transferred to a packing facility for transport to a consumer, such as a restaurant. At the restaurant, the tortillas may be fried to produce tortillas chips. If the tortilla stacks are processed in the chip chopper without undergoing the waiting period, the tortillas are usually too soft and may stick together, gumming up the chip chopper. As such, the waiting period is typically an essential part of the tortilla chip production in conventional systems.

There are a number of drawbacks with conventional chip chopper machines used in tortilla production assemblies. For example, due to the long waiting period required, large storage facilities are typically required for mass producing tortilla chips. Additionally, the tortillas are usually not fresh when they are received at the customer location due to the waiting period. In another example, because of the transfer process to the storage facilities and subsequent processing via the chip chopper, the stacks of tortillas may not be even and there may be misalignment in the stack. For example, one or more tortillas can be off center from the rest of the stack. As a result, the sizes of the cut tortilla pieces can vary after being processed via the chip chopper.

The chip chopper system disclosed herein can significantly improve the cutting process in a tortilla production assembly. For example, the chip chopper system can be configured to process smaller stacks of tortillas directly from the upstream production equipment (e.g., the oven or the cooling/equilibrating system). As a result, the waiting period may not be required. Additionally, smaller or no storage facilities are generally required. The cut tortilla pieces can be transferred from the chip chopper system and directly shipped to the customer. In some cases, the cut tortilla pieces may first undergo a tumbling process before shipments. Additionally, because there is no waiting period, the cut tortillas received by the consumer are usually fresher when compared to conventional systems, which can result in fresher and better tasting tortilla chips for the end consumer.

In another example, the chip chopper systems described herein can improve the safety of the cutting process in a production facility. In conventional chip choppers, the blades are often exposed, which can present a safety risk for operators of the chip choppers. Additionally, because blades need to be changed throughout the day for different chip sizes (e.g., corresponding to six or four blades), an operator usually directly handles the blades for any changes required in conventional systems. Conversely, in the chip chopper systems described herein, the blades are not exposed and are instead located within a cabinet of the chip chopper system. As such, the operator is not exposed to the blades. When the operator needs to change the blades, the operator can easily shut down a single cartridge of the chip chopper system, and change out a blade holder portion of the blade holder assembly. As described further herein, changing a blade holder can be accomplished by removing one or more fastening components. For example, in one embodiment, changing out the blade holder can simply require twisting a single thumb screw, removing the old blade holder, inserting a new replacement blade holder, and reinserting the thumb screw. This process can improve the efficiency of a blade holder replacement. Additionally, because the blades are surrounded by the blade holder, the operator does not need to have direct contact with the blades.

In yet another example, the chip chopper systems described herein can reduce the amount of waste in a tortilla production assembly. For example, as described herein, the chip chopper systems can include a chute system including one or more chute plates to receive the tortillas from the upstream production equipment. Each individual chute plate can be aligned with an individual production row from a sheeter as well as an individual chopping cartridge. When a component of the chopping cartridge needs to be inspected or changed, the individual chute for the corresponding row can be actuated such that tortillas in only that individual row are directed to a waste station. The remaining chutes can continue to actively receive their own tortillas rows and the corresponding chopping cartridges can continue to process the rows, ensuring that the upstream production equipment remains operational. Conversely, in conventional tortilla production assemblies, when the downstream production equipment needs to be changed, the entire upstream production assembly is generally shut down, and the system is cleared or evacuated. Evacuating the upstream production equipment can result in thousands of pounds of wasted masa, even if the evacuation process only lasts five minutes. As such, the chip chopper systems described herein can reduce the amount of waste in a tortilla production assembly. The chip chopper system described herein represent many additional improvements in tortillas production, as described further herein.

Thus, in accordance with some embodiments, a system for cutting a food product can include a support frame, an infeed conveyor, a discharge conveyer, and/or one or more cutting assemblies. The infeed conveyor and the discharge conveyor can be supported by the support frame, with the infeed conveyor being configured to receive the food product and the discharge conveyor being configured to convey cut food product away from the system. The one or more cutting assemblies can be operationally positioned between the infeed conveyor and the discharge conveyor, such that the one or more cutting assemblies receive the food product from the infeed conveyor and cut the food product before directing the cut food product to the discharge convey. Each cutting assembly of the one or more cutting assembly can include a valve, a blade assembly, and a vertical press. The valve can move between an open configuration and a closed configuration. In the closed configuration, the valve is configured to receive the food product from the infeed conveyor, and in the open configuration, the valve is configured to open to allow the food product to pass through the valve to the blade assembly. The blade assembly can include one or more blades. The blade assembly is configured to move between a receiving configuration, where the blade assembly is positioned below the valve to receive the food product passing through the valve, and a cutting configuration, where the blade assembly is positioned below the vertical press. The vertical press is configured to move from a top position and a bottom position. As the vertical press moves to the bottom position, the vertical press can press the food put through the blade assembly, which is in the cutting configuration, to cut the food product.

In some embodiments, a valve system for use in a food cutting system can include a top portion, a bottom portion, and one or more vanes (e.g., two vanes, three vanes, four vanes, etc.). The top portion can include a first hole and the bottom portion can include a second hole. The bottom portion can be positioned below the top portion and configured to move relative to the top portion. The one or more vanes can be rotationally coupled to the bottom portion at first points. The bottom portion can move between an open configuration, where the second hole of the bottom portion is aligned with the first hole of the top portion, and a closed configuration, wherein the second hole is misaligned with the first hole. When the bottom portion is in the closed configuration, the one or more vanes extend into the second hole. When the bottom portion is in the open configuration, the one or more vanes rotate outwardly from the second hole.

In some embodiments, a system for cutting a food product can include a support frame, an infeed conveyor, a discharge conveyor, and/or one or more cutting assemblies. The infeed conveyor and the discharge conveyor can be support by the support frame, with the one or more cutting assemblies operationally positioned between the infeed conveyor and the discharge conveyor. The infeed conveyor can be configured to receive the food product and transport the food product to the one or more cutting assemblies for processing. The one or more cutting assemblies can be configured to cut the food product, which can be directed to the discharge conveyor to convey the cut food product away from the system.

In some embodiments, a cutting assembly configured to receive and cut food product can include a valve and a blade assembly. The valve can have an open configuration and a closed configuration. In the closed configuration, the valve can receive and support food product. In the open configuration, the valve can allow the food product to pass through the valve to the blade assembly. The blade assembly can include one or more blades. The blade assembly can move between a receiving configuration, where the blade assembly is positioned below the valve to receive the food product, and a cutting configuration for cutting the food product.

BRIEF DESCRIPTION OF THE DRAWINGS

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Although the various embodiments disclosed herein may have specific relevance to food product production, the features, advantages, and other characteristics disclosed herein may have direct or indirect applicability to other applications, such as, for example, in other manufacturing applications that require evacuating a feed system, other mechanical devices, and/or the like.

Figure 1A:
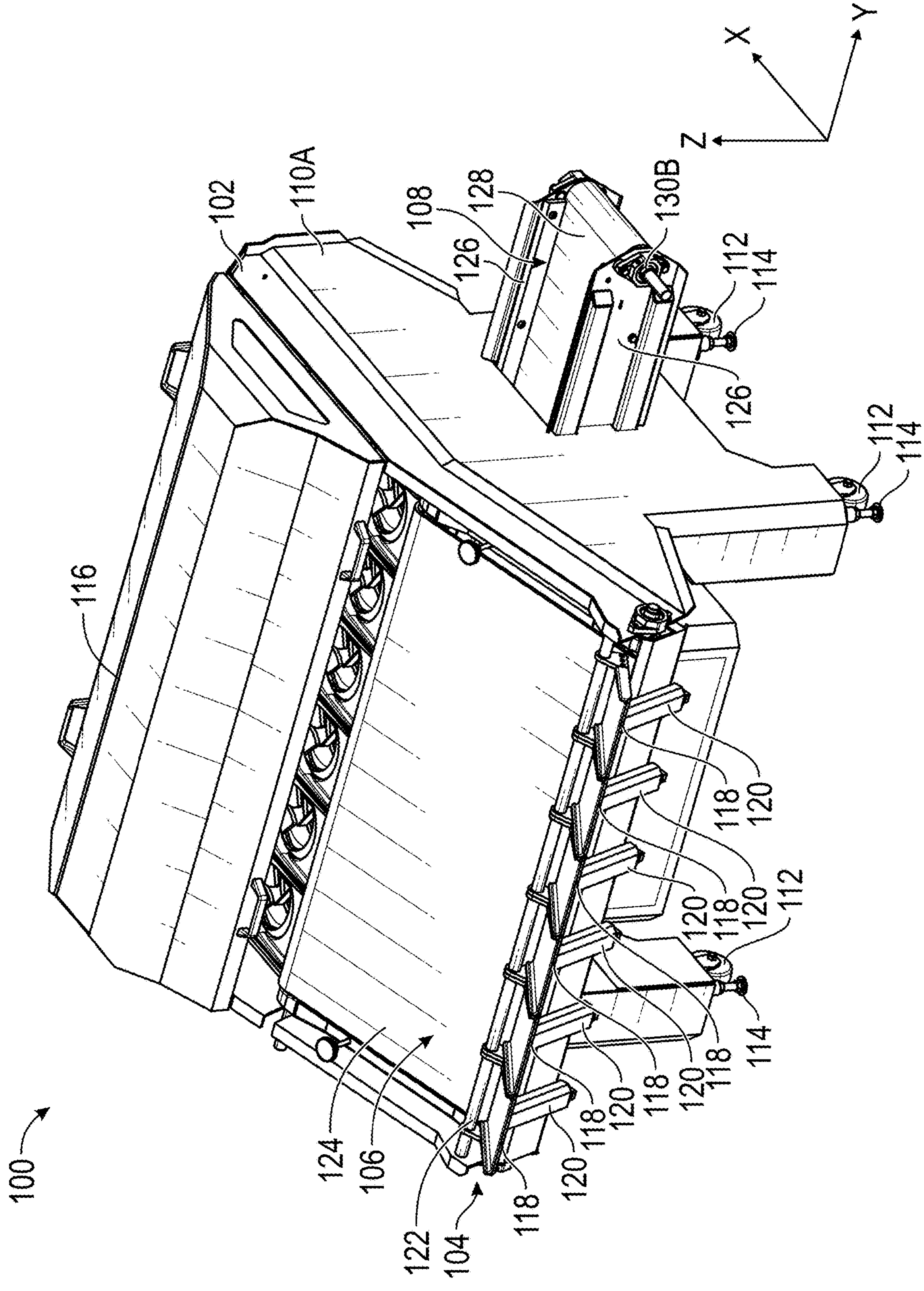
FIG. 1A illustrates a top front perspective view of a chip chopper system.
Figure 1B:
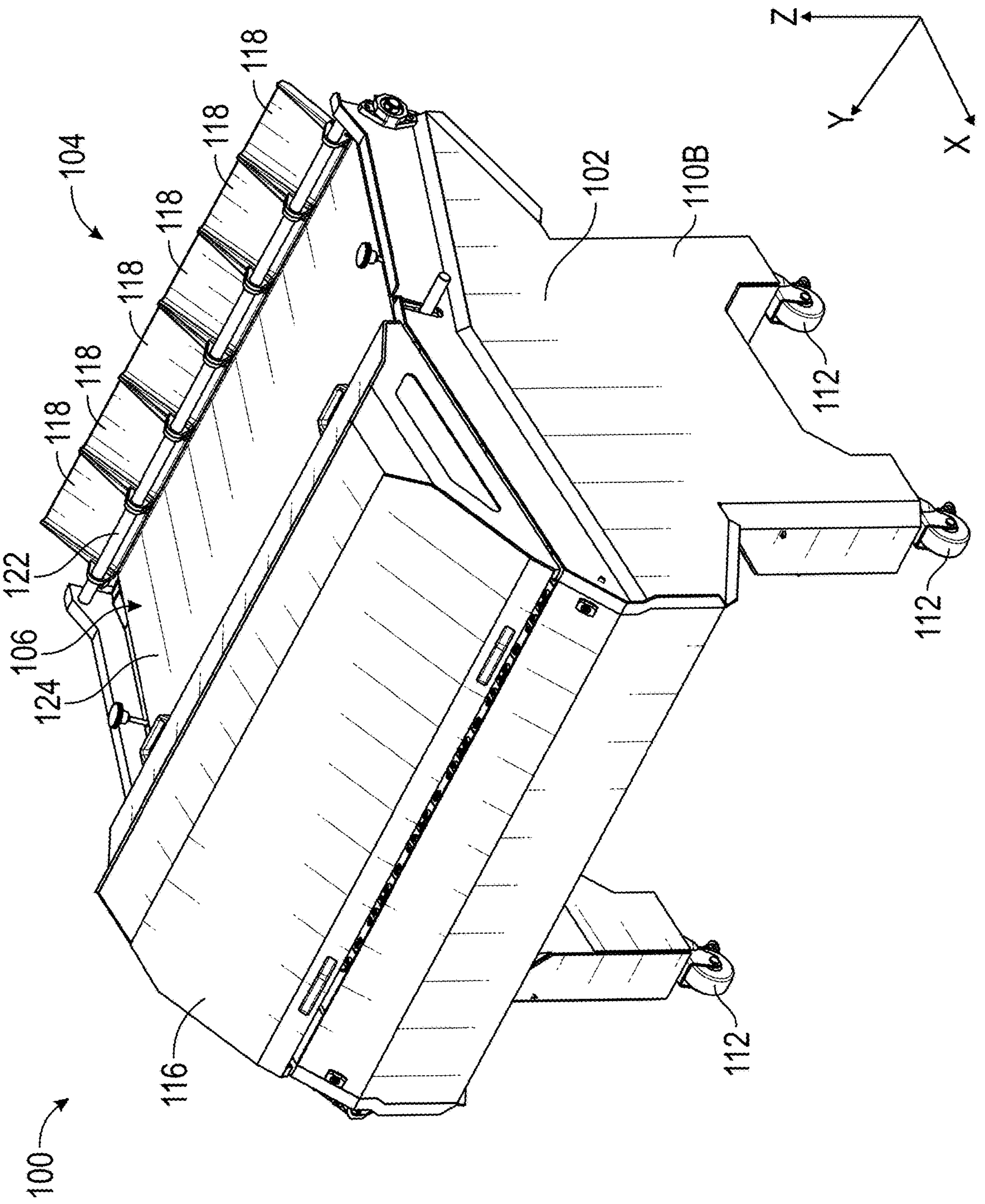
FIG. 1B illustrates a top back perspective view of the chip chopper system of FIG. 1A.
Figure 1C:
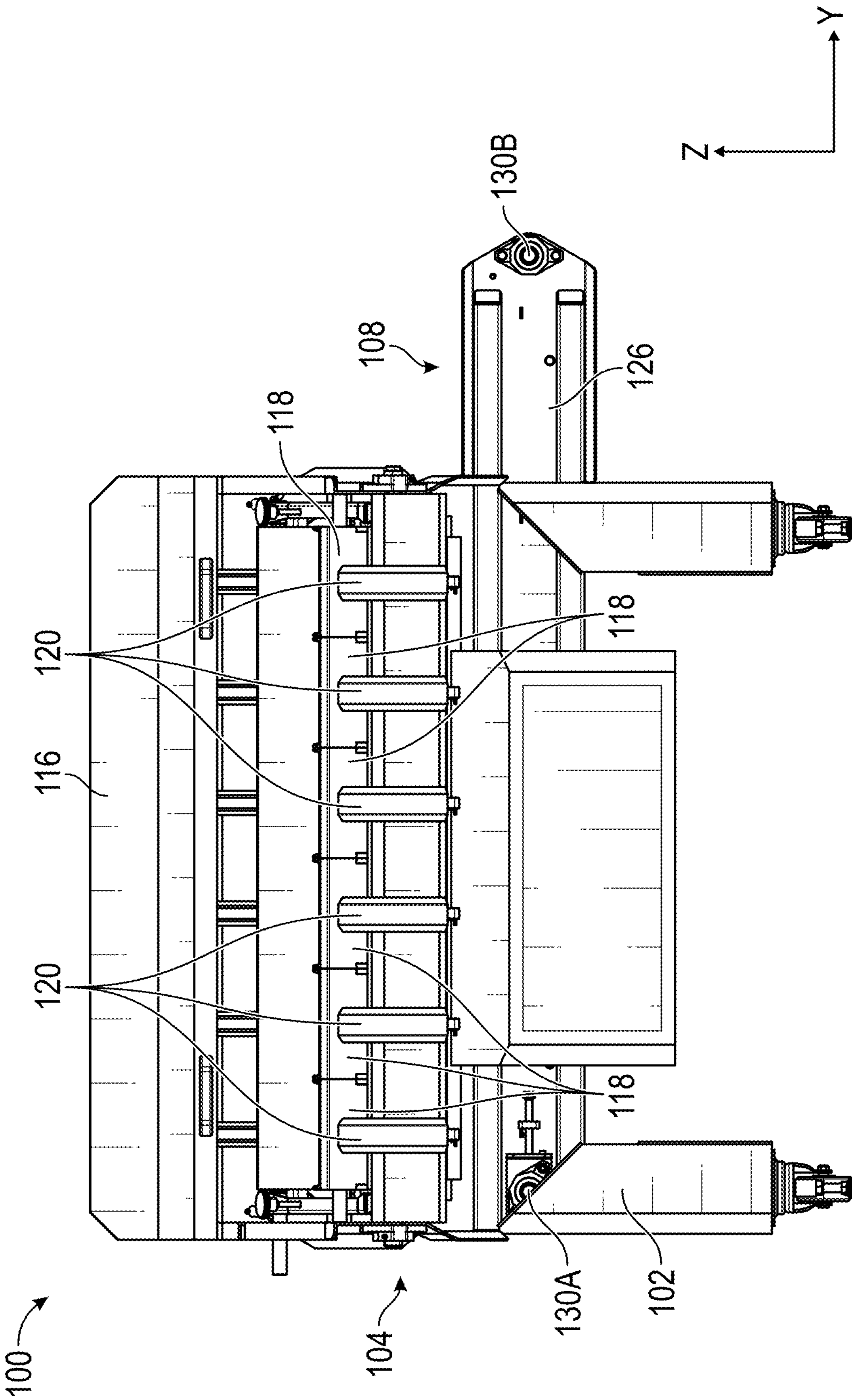
FIGS. 1C-1F illustrate a front side view, a back side view, a right side view, and a left side view respectively of the chip chopper system of FIG. 1A.
Figure 1D:
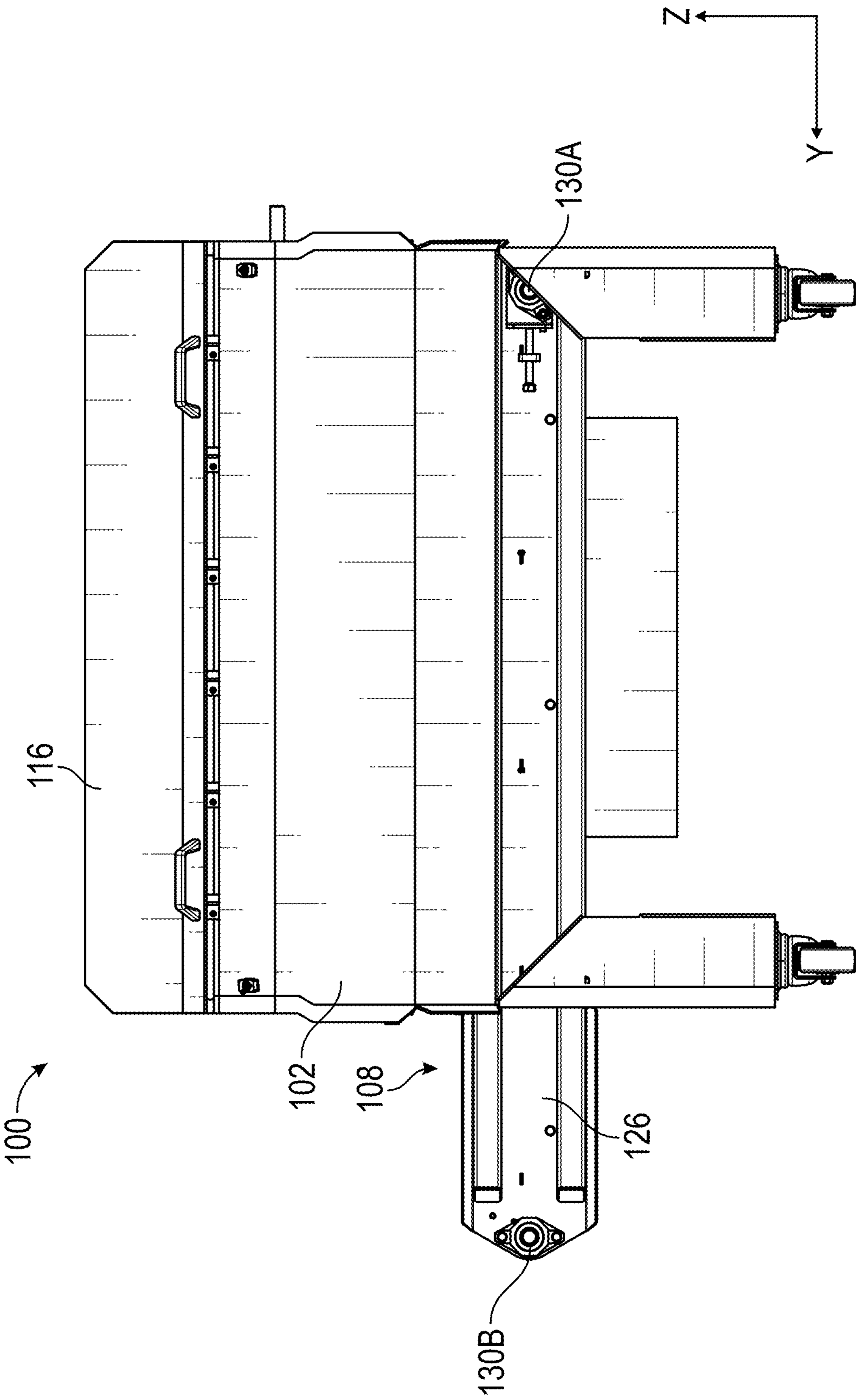
Figure 1E:
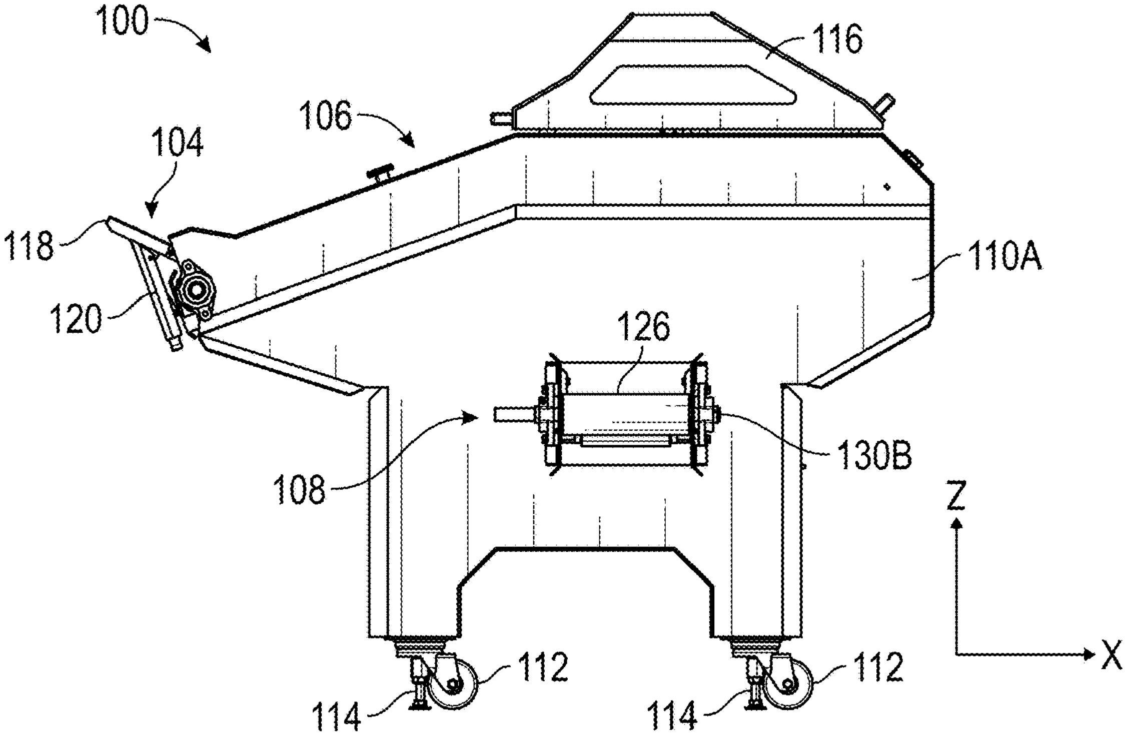
Figure 1F:
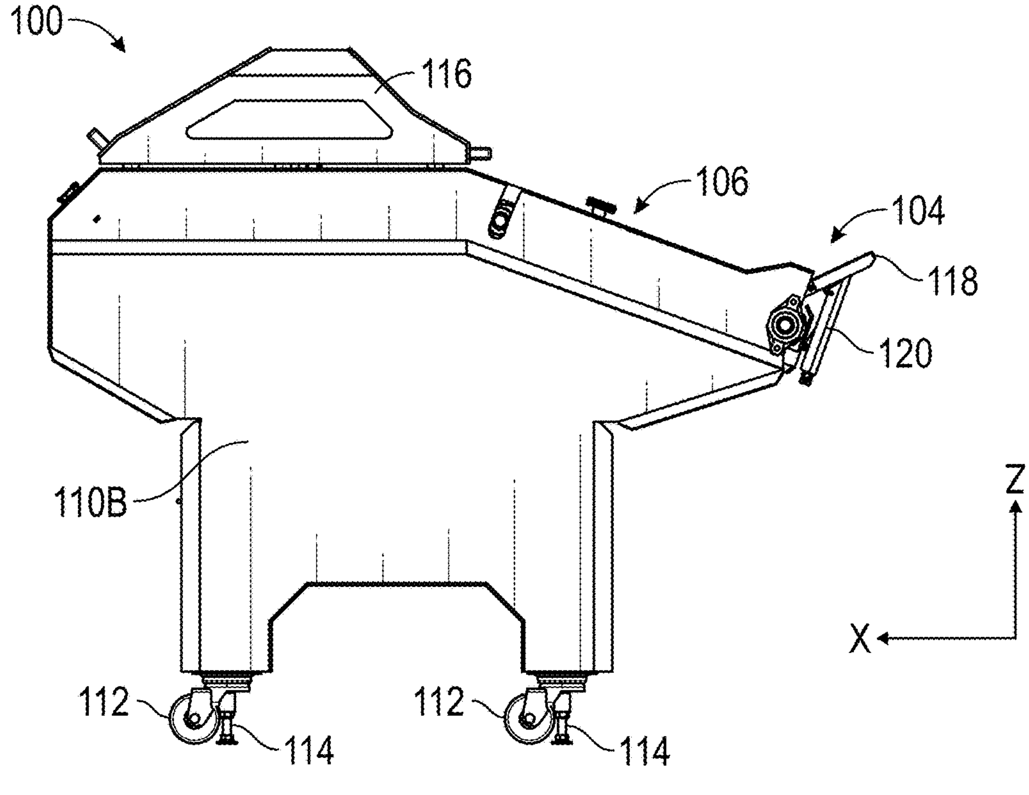

Referring now to the drawings, wherein like reference characters identify corresponding or similar elements in form and function throughout the several views. For ease of reference, a consistent coordinate system (X, Y, and Z) is included in the majority of the Figures herein, either outside of the drawings or embedded within the drawings. FIGS. 1A-1F illustrate various views of an embodiment of a chip chopper system 100. FIG. 1A illustrates a top front perspective view of the chip chopper system 100 and FIG. 1B illustrates a top back perspective view of the chip chopper system 100. FIGS. 1C-1F illustrate a front side view, a back side view, a right side view, and a left side view respectively of the chip chopper system 100. The chip chopper system 100 can be used to process and cut comestible products (e.g., tortillas) into smaller components or pieces. For example, the chip chopper system 100 can chop or cut tortillas into tortilla pieces in the shape of tortilla chips. The chip chopper system 100 can be part of a food production assembly. When used for tortilla production, the chip chopper system 100 can receive tortillas from upstream production equipment. For example, a masa feed system can direct a feed of masa to a tortilla sheeter. The tortilla sheeter can form the masa into circular shaped dough pieces. These dough pieces can be baked in an oven and undergo one or more cooling/equilibrating processes before being delivered (e.g., on a conveyor system) to the chip chopper system 100. In some embodiments, the chip chopper system 100 can be combined into a single machine with one or more of the tortilla production equipment described herein. While the systems and devices described herein refer to use cases include tortillas, it is recognized that any of systems and devices described herein can be used for additional purposes. For example, the systems and devices described herein can be used in the production of other food products, including pitas, round breads, etc.

The chip chopper system 100 can include a support frame assembly 102 (also referred to herein as a "cabinet 102"), a chute system 104, an infeed conveyor system 106, a discharge conveyor system 108, one or more cutting assemblies 200 (also referred to herein as "chopping cartridges 200"), and/or one or more control system(s) (not shown). The support frame assembly 102 can support the chute system 104, the infeed conveyor system 106, the discharge conveyor system 108 and/or the chopping cartridges 200. The chip chopper system 100 can receive tortillas that can be arranged in rows from the upstream production equipment. The chute system 104 can be used to receive the rows of tortillas from the upstream production equipment and transfer the rows of tortillas to the infeed conveyor system 106. The infeed conveyor system 106 can be used to convey the individual rows of tortillas towards the chopping cartridges 200 for cutting operations. For example, each row of tortillas can enter an individual chopping cartridge 200 via a valve assembly (e.g., the valve assembly 300, the valve assembly 600, etc.) of the chopping cartridges 200 (see, for example, FIGS. 4A-4D). The chopping cartridges 200 can be used to create small stacks of tortillas, for example less than or equal to 12 tortillas, preferably less than or equal to 8 tortillas. For example, as each tortilla enters the valve assembly of the chopping cartridge 200, the tortilla can come to rest on the preceding tortilla in the same row. As such, a stack of tortillas can begin to form in the valve assembly.

The chopping cartridges 200 can also be used to cut the small stacks of tortillas into small tortilla pieces in the shape of tortilla chip. For example, the chopping cartridges 200 can include blade assemblies (e.g., blade holder assembly 400) that include blades for cutting the stacks of tortillas (see, for example, FIGS. 4A-4D). The stacks formed in one individual valve assembly can be transferred to an individual blade assembly when the valve assembly moves from the closed configuration to the open configuration. Once the blade assembly receives a stack of tortillas, the blade assembly can travel through the chopping cartridges 200 to a position below a vertical actuator of the chopping cartridge 200. For example, the blade assembly can be configured to travel along a frame of the chopping cartridge 200 between a position below the valve assembly for receiving the tortillas, and a position below the vertical actuator for cutting the tortillas. Once the blade assembly reaches the position below the vertical actuator, the vertical actuator can travel towards and into the blade assembly. The vertical actuator can then contact the stack of tortillas, pushing the stack through the blades of the blade assembly. The cut tortillas pieces can travel completely through the blade assembly to land on the discharge conveyor system 108 and be directed away from the chip chopper system 100 for further processing. This arrangement allows the chip chopper system 100 to selectively process and cut individual rows of tortillas, which can provide a number of advantages, as explained herein.

The support frame assembly 102 can be in the form of a housing which can include and support various types of devices for operations of the chip chopper system 100. Additionally, the support frame assembly 102 can be configured to support the chute system 104, the infeed conveyor system 106, the discharge conveyor system 108, and/or the chopping cartridges 200. In the illustrated embodiment, the support frame assembly 102 includes a left-side plate member 110A and a right-side plate member 110B. The left-side plate member 110A and the right-side plate member 110B can be supported by one or more wheels 112 and/or one or more legs 114. The one or more wheels 112 can allow the chip chopper system 100 to be easily moveable.

With continued reference to FIGS. 1A and 1B, the support frame assembly 102 can include a cover 116. The cover 116 may provide some protection to the internal components to, for example, prevent any food production material from compromising any mechanical components and to prevent mold from growing inside the chip chopper system 100. For example, the cover 116 can be supported by the plate members 110A, 110B and positioned over the one or more chopping cartridges 200 in the assembled chip chopper system 100. The cover 116 can be removably coupled to the plate members 110A, 110B. In some cases, an operator may remove the cover 116 to access the internal components of the chip chopper system 100. For example, an operator may wish to remove a chopping cartridge 200 from the chip chopper system 100. In some implementations, the chopping cartridges 200 can be removably fixed to the support frame assembly 102. For example, the chopping cartridges 200 may be fixed to the support frame assembly 102 via fasteners.

The chute system 104 can be configured to receive tortillas (e.g., in the form of tortilla rows) from upstream production equipment, such as a separate conveyor system. The chute system 104 can transfer the tortillas from the upstream production equipment to the infeed conveyor system 106. In this manner, the chute system 104 acts as a bridge or connecting component between the upstream production equipment and the chip chopper system 100. As explained herein, in some embodiments, the chute system 104 can be configured to receive and/or reject individual rows of tortillas from the upstream production equipment. As such, the chip chopper system 100 can process some rows of tortillas while rejecting other rows of tortillas, without impacting or hindering either the upstream production equipment or the downstream production equipment. This arrangement can provide a number of benefits, including allowing an operator to interact with individual chopping cartridges 200 in a time and waste efficient manner. The chute system 104 can include one or more chute plate(s) 118, chute actuator(s) 120 and/or support rod(s) 122.

The support rod 122 can extend between the left-side plate member 110A and the right-side plate member 110B. The support rod 122 can extend along the Y-axis. The plurality of chute plates 118 can be supported by the support rod 122 and rotatable relative to the support rod 122. For example, the plurality of chute plates 118 can rotate about the Y-axis. The number of chute plates 118 included in the chute system 104 can vary and may depend on the upstream production equipment. For example, the number of chute plates 118 included in the chute system 104 can depend on the number of tortillas rows or streams produced by the upstream production equipment. Generally, tortillas sheeters produce and discharge tortillas in rows ranging from four rows to eight rows. However, more, or less are possible. In one example, when the sheeter in the upstream production equipment produces four rows of tortillas, the chute system 104 can include four chute plates 118. In the illustrated embodiment, the chute system 104 includes six chute plates 118, as such, the chip chopper system 100 is configured to be used in a tortilla production assembly where six rows of tortillas or less are created.

Each chute plate 118 can be supported on a bottom side by an individual chute actuator 120. The chute actuators 120 can be coupled to the bottom sides of the chute plates 118 (see e.g., FIG. 1C) and the support frame assembly 102. The plurality of chute actuators 120 can be linear actuators, and can include a power source (e.g., an electric motor or pneumatic cylinder) to generate force for movement of an arm or rod (not shown). In some embodiments, one power source can be used for the entire chute system 104. In other embodiments, each chute actuator 120 can include its own power source. The chute actuators can operate independently of each other or together. The plurality of chute actuators 120 can be controlled by the control system of the chip chopper system 100. Each of the chute actuators 120 can move the corresponding chute plate 118 between a first/receiving configuration and a second/rejecting configuration. The plurality of chute plates 118 are shown in the receiving configuration in the FIGS. 1A and 1B. In the receiving configuration, the plurality of chute plates 118 transfer the tortillas rows to the infeed conveyor system 106. To move to the rejecting configuration, the chute actuator 120 can be engaged, driving the chute plate 118 at least partially in the vertical Z-direction such that the chute plate 118 rotates about the support rod 122. When in the rejecting configuration, the chute plate 118 can move away from the separate upstream conveyor system such that tortillas in the row of the individual chute plate 118 are not transferred to the infeed conveyor system 106. Instead, the tortillas in that particular row can fall to a waste area/container.

Having chute plates 118 that can be individually actuated can provide certain benefits. In one example, other components in the row of an individual chute plate 118, such as an individual cartridge 200 (see FIGS. 2A-2B), can be accessed for maintenance, operations, inspection, and/or the like, without shutting down the entire chip chopper system 100. For example, where one individual chute plate 118 is in the rejecting configuration, the other chute plates 118 can remain in the receiving configuration such that the chip chopper system 100 can be continuously operated. In conventional chip chopper systems, when downstream equipment needs to be shut down, the entire tortilla production assembly, including the production equipment, can be required to shut down, which cause time delays and increase the amount of wasted product. Conversely, in the chip chopper system 100, the upstream production equipment can continue running while issues in a single row can be addressed.

Figure 2A:
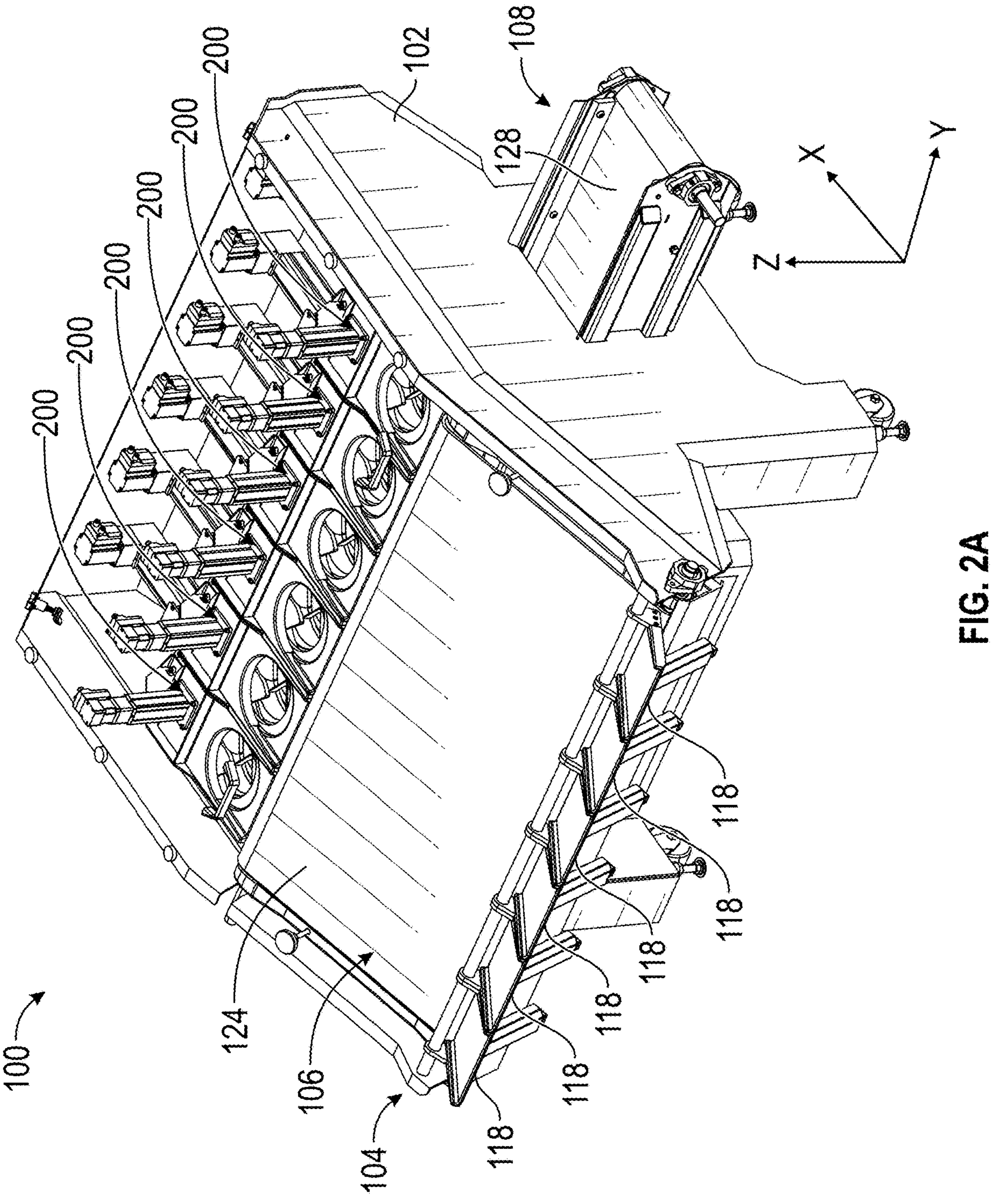
FIGS. 2A and 2B illustrate a top front perspective view and a top back perspective view respectively of the chip chopper system of FIG. 1A with a cover removed.
Figure 2B:
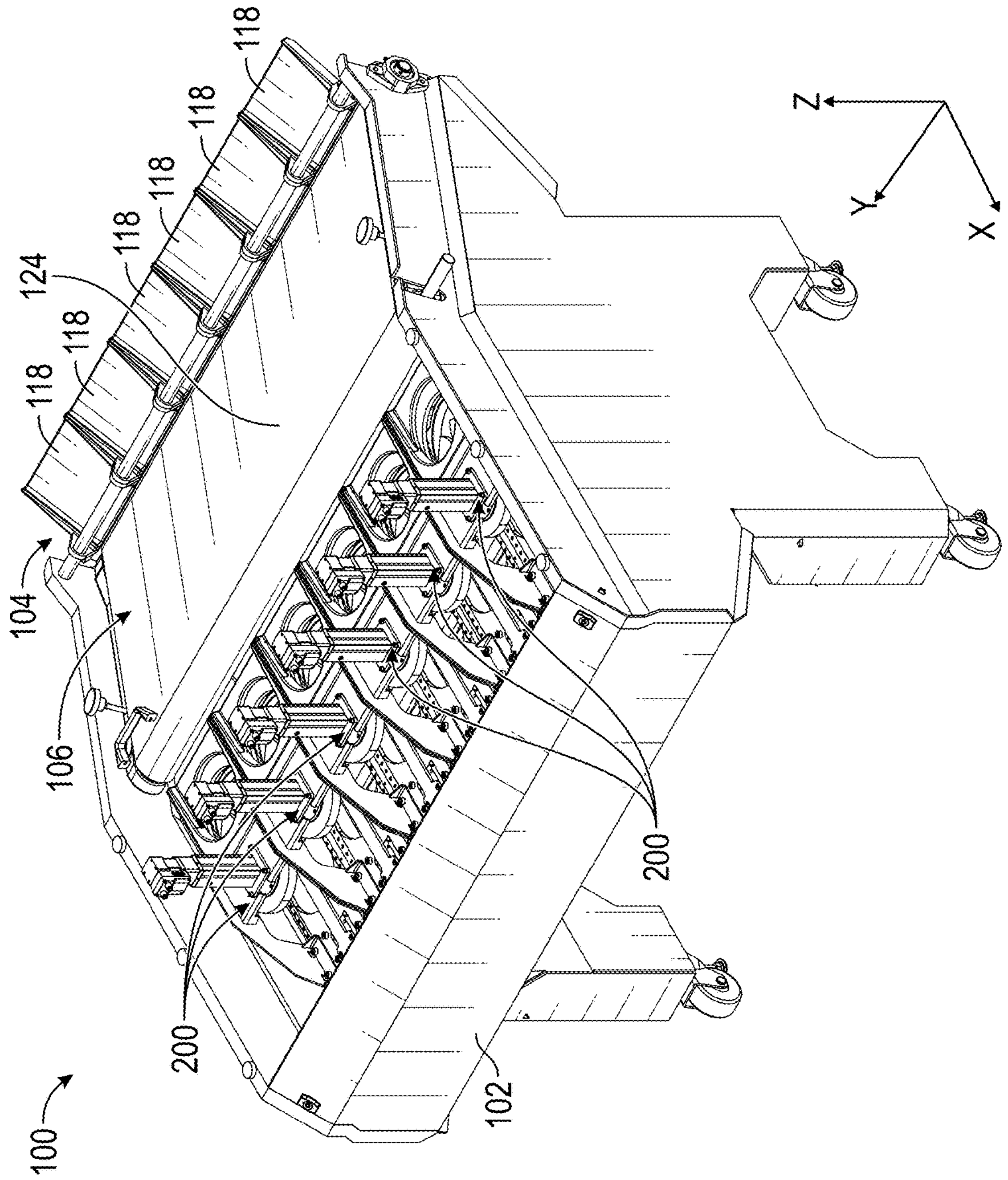

The infeed conveyor system 106 can be configured to receive tortillas from the chute system 104 and transfer the tortillas to the chopping cartridges 200 shown in FIGS. 2A-2B. The infeed conveyor system 106 can be used to direct the rows of tortillas to the individual chopping cartridges 200 without compromising the rows of tortillas (e.g., causing the tortillas to become misaligned in their respective rows). As explained herein, the infeed conveyor system 106 can also provide the speed necessary to convey the rows of tortillas into the correct position in the chopping cartridges 200 for a cutting operation. Additionally, in some embodiments, the infeed conveyor system 106 can elevate the rows of tortillas relative to the ground the chip chopper system 100 is positioned on. As such, the chopping cartridges 200 can be positioned above the discharge conveyor system 108 while processing the rows of tortillas, allowing the gravity to transfer the cut tortilla pieces to the discharge conveyor system 108. The infeed conveyor system 106 can be supported by the support frame assembly 102. The infeed conveyor system 106 can include an infeed conveyor belt 124. The infeed conveyor belt 124 can be a continuous loop of durable material. The infeed conveyor belt 124 can extend between the chute system 104 and the one or more chopping cartridges 200. The infeed conveyor system 106 can also include various additional components known to those skilled in the art, including rollers, pulleys, motors, a control system, etc. for operation. In some embodiments, the chute system 104 can be angled in the receiving configuration such that tortillas received from the upstream equipment are directed in a downward direction towards the infeed conveyor system 106. The infeed conveyor system 106 can also be angled such that the tortillas received from the chute system 104 are directed towards the chopping cartridges 200 in an upward direction. In some cases, the infeed conveyor belt 124 can plateau at or near the chopping cartridges 200.

Figure 3A:
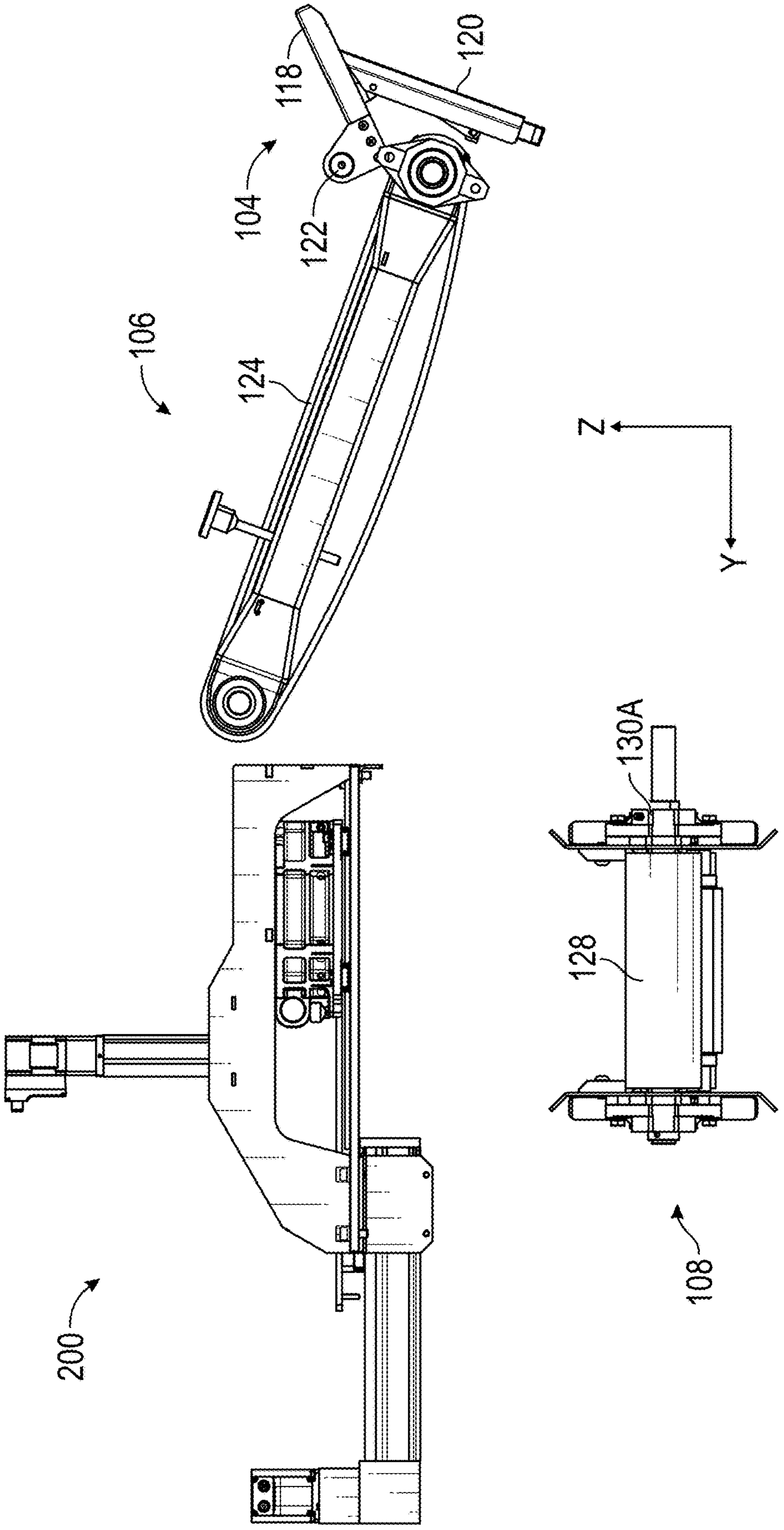
FIGS. 3A and 3B illustrate a left side view and back side view respectively of components of the chip chopper system of FIG. 1A.

The discharge conveyor system 108 is configured to received cut tortilla pieces from the chopping cartridges 200 and transport the cut tortilla pieces to the downstream equipment of the tortilla production assembly. For example, the discharge conveyor system 108 can transport the cut tortilla pieces to another conveyor system, a tumbler system, a packaging system, and/or the like. The discharge conveyor system 108 can function to catch the cut tortilla pieces from the chopping cartridges 200 and convey the cut tortilla pieces away from the chip chopper system 100. The discharge conveyor system 108 can be positioned below the chopping cartridges 200, as shown in FIG. 3A. In the illustrated embodiment, the discharge conveyor system 108 can convey the cut tortilla pieces in a direction that is generally perpendicular (e.g., the Y-direction) relative to the infeed conveyor system 106. In other embodiments, the discharge conveyor system 108 may convey the cut tortillas pieces in a direction that is generally parallel (e.g., the X-direction) to the infeed conveyor system 106. In this arrangements, the cut tortilla pieces would be directed out of the back of the chip chopper system 100.

The discharge conveyor system 108 can include a frame 126, a conveyor belt 128, and/or one or more motors. In the illustrated example, the discharge conveyor system 108 includes a motor assembly 130A and a roller assembly 130B (see e.g., FIG. 3A). The discharge conveyor system 108 can also include various additional components known to those skilled in the art, including rollers, pulleys, a control system, etc. for operation. The frame 126 can be supported by and/or coupled to the support frame assembly 102. At least a portion of the frame 126 can extend out of the right-side plate member 110B or the left-side plate member 110A. The frame 126 can support the motor assembly 130A and the roller assembly 130B and other components of the discharge conveyor system 108. The conveyor belt 128 can be a continuous loop of durable material. The conveyor belt 128 can extend between the motor assembly 130A and the roller assembly 130B. The conveyor belt 128 can travel along the Y-axis, with the top surface of the conveyor belt 128 traveling in the positive Y-direction in the illustrated embodiment. In some embodiments, the conveyor belt 128 can be narrower than the infeed conveyor belt 124. As described herein, the conveyor belt 128 can be generally aligned with openings in the chopping cartridges 200 (e.g., frame holes 218) such that the conveyor belt 128 receives the cut tortilla pieces from the chopping cartridges 200. The motor assembly 130A can include one or more of a roller, shaft, and drive motor. The roller assembly 130B can include a roller and bearings for the conveyor belt 128.

FIGS. 2A and 2B illustrate a top front perspective view and a top back perspective view respectively of the chip chopper system 100 with the cover 116 removed. In the illustrated embodiment, the chip chopper system 100 includes six chopping cartridges 200. Like the chute plates 118, the number of chopping cartridges 200 included in the chip chopper system 100 can be dependent on the number of rows of tortillas produced in the upstream production equipment. For example, the chip chopper system 100 can include one, two, three, four, five, six, seven, eight, nine, ten, and/or the like chopping cartridges 200. As shown, each chopping cartridge 200 can be aligned with an individual chute plate 118. For example, a central axis in the X-direction of each chute plate 118 can be generally aligned with a central axis in the X-direction of each chopping cartridge 200. In this arrangement one chute plate 118 conveys one tortilla row to one chopping cartridge 200. The chopping cartridges 200 can be supported by the support frame assembly 102 and can be arranged side by side along the Y-axis.

Figure 3B:
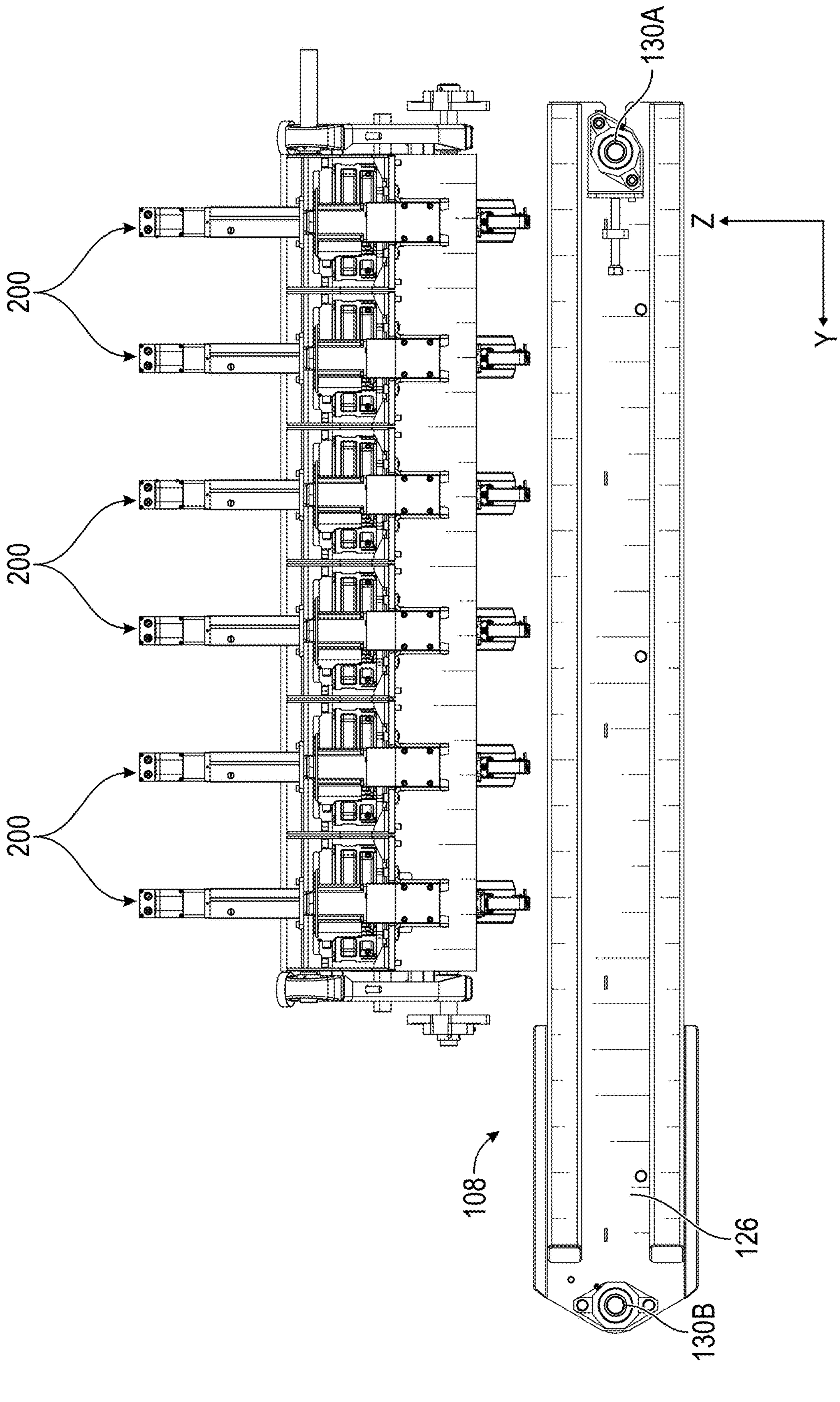
Figure 4A:
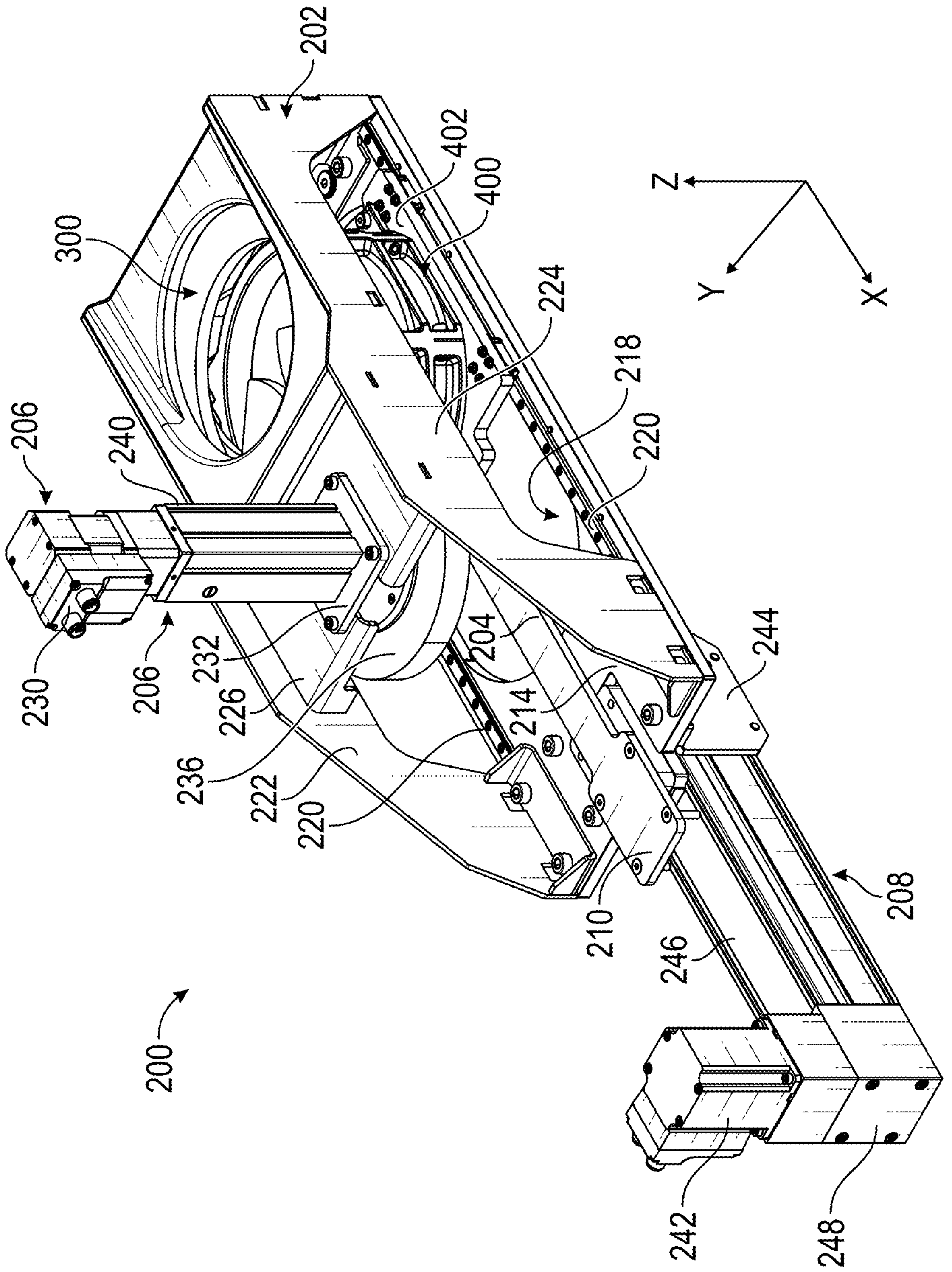
FIGS. 4A-4D illustrate a top back perspective view, a top front perspective view, a bottom view, and an exploded view of a chopping cartridge.
Figure 4B:
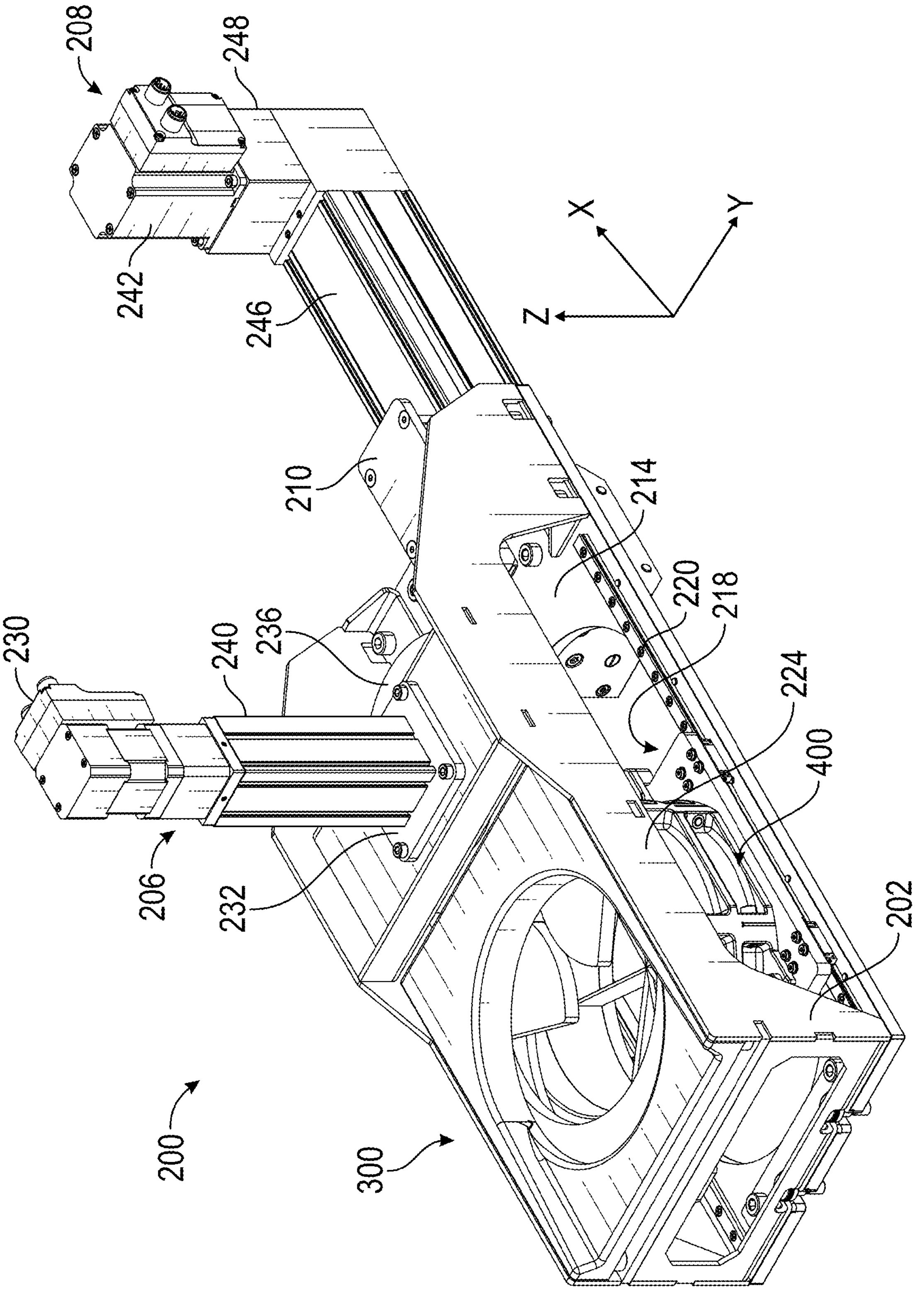
Figure 4C:
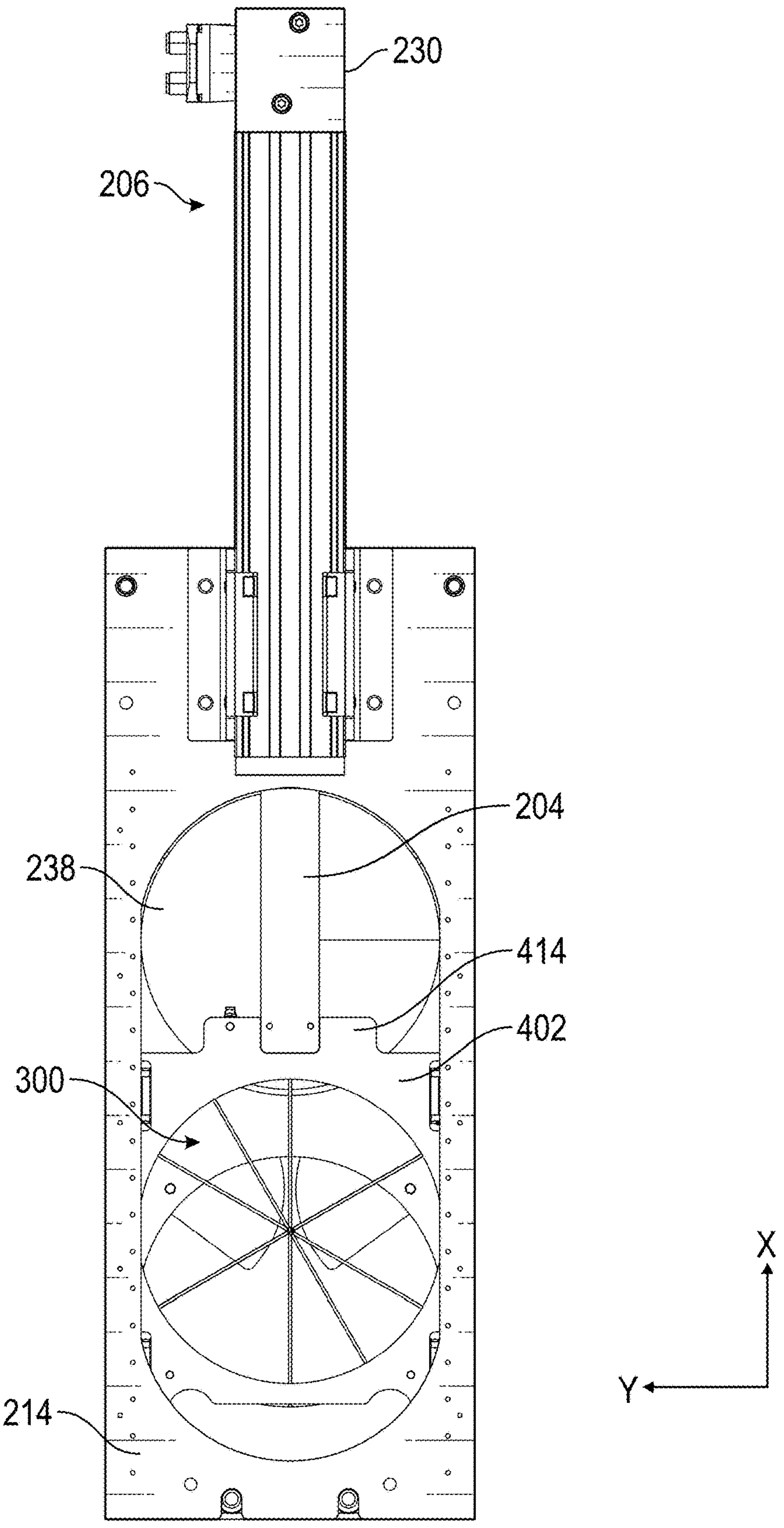
Figure 4D:
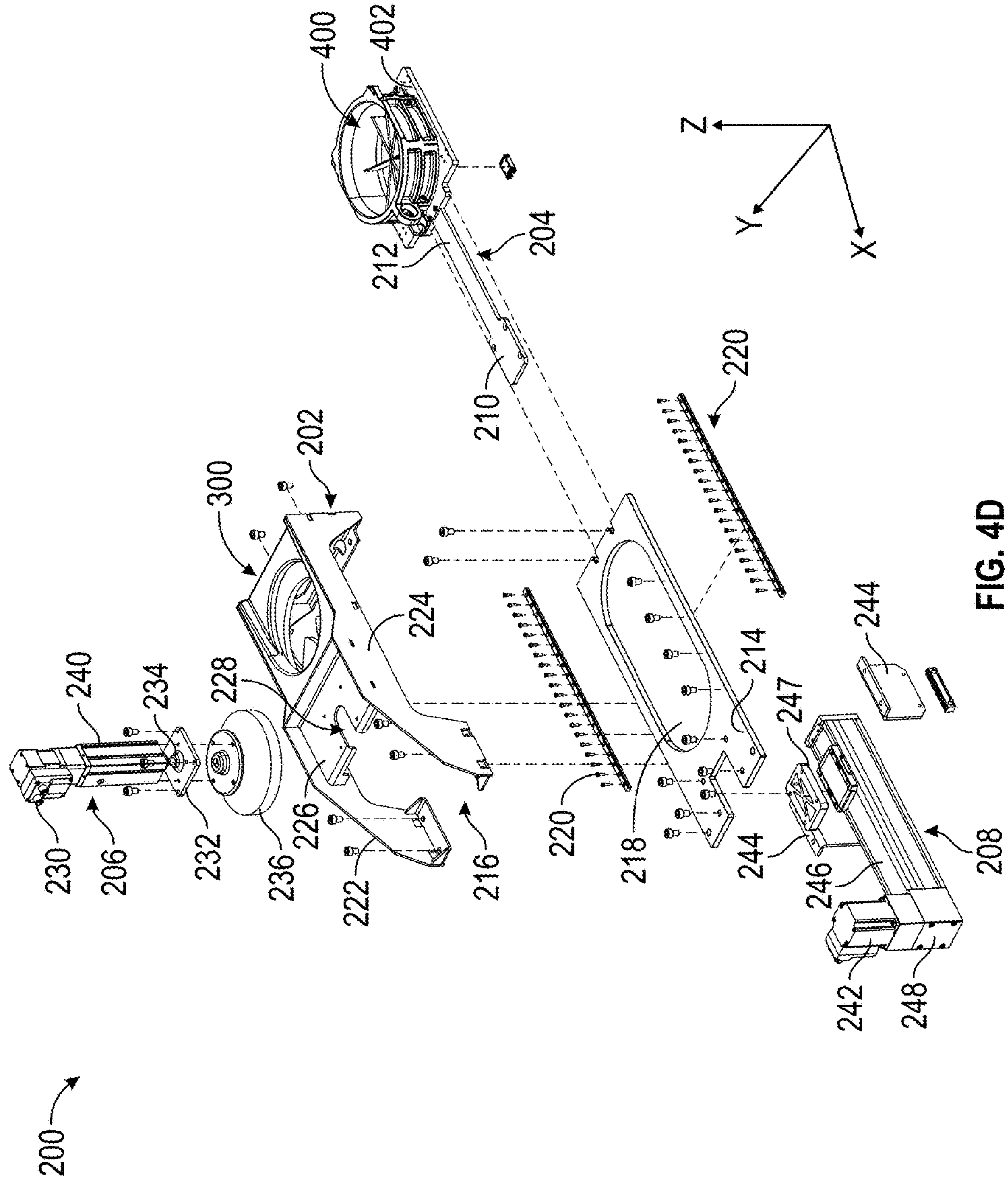

FIGS. 3A and 3B illustrate a left side view and back side view respectively of the chute system 104, the infeed conveyor system 106, the discharge conveyor system 108, and the chopping cartridges 200, with the other components of the chip chopper system 100 removed for illustrative purposes. As shown, the chopping cartridges 200 can be positioned such that tortillas can be received by from the infeed conveyor system 106 by the chopping cartridges 200 and the cut tortillas pieces can be deposited from the chopping cartridges 200 onto the discharge conveyor system 108.

FIG. 4A-4D illustrate various views of the chopping cartridge 200. FIG. 4A-4D illustrate a top back perspective view, a top front perspective view, a bottom view, and an exploded view respectively. The chopping cartridges 200 can be configured to receive rows of tortillas from the infeed conveyor system 106 and form small stacks of tortillas for further processing. The chopping cartridges 200 can also be configured to cut the stacks of tortillas into tortilla pieces (e.g., in the shape of tortilla chips). Once the tortillas have been cut into pieces, the chopping cartridges 200 can direct the cut tortilla pieces towards and onto the discharge conveyor system 108, which can convey the cut tortilla pieces away from the chip chopper system 100 for further processing. In some embodiments, the chopping cartridges 200 can be individually controlled by and/or individually removable from the chip chopper system 100. As such, each chopping cartridge 200 can process rows of tortillas independently of the other chopping cartridge 200. This configuration can provide a benefit of allowing one chopping cartridge 200 to be shut down for operator interaction (e.g., maintenance), while one or more of the other chopping cartridge 200 continue to operate. For example, when an operator needs to access one chopping cartridge 200, the operator can move the corresponding chute plate 118 into the rejecting configuration and power down the chopping cartridge 200. The operator can then interact with the chopping cartridge 200 while the remaining chopping cartridges 200 continue to cut the tortillas into pieces. As such, neither the upstream production equipment nor the downstream production equipment may be required to shut down, reducing the amount of waste in the tortilla production assembly.

The chopping cartridges 200 can include a frame assembly 202, a connecting arm 204, a vertical actuator 206 (also referred to herein as the "vertical press 206"), a horizontal actuator 208, a valve assembly (e.g., the valve assembly 300, the valve assembly 600, etc.) and/or a blade holder assembly 400. While particular reference is made to the valve assembly 300, it is recognized that either the valve assembly 300 or the valve assembly 600 can be used in the chopping cartridges 200. The chopping cartridges 200 can be coupled to the support frame assembly 102, such that the support frame assembly 102 supports the chopping cartridges 200 via the frame assembly 202. In some embodiments, the chopping cartridges 200 can be removable from the chip chopper system 100. For example, the chopping cartridges 200 can be removably coupled to the support frame assembly 102 via the frame assembly 202. In some cases, the chopping cartridge 200 may be removed to inspect or perform maintenance on the components of the chopping cartridges 200. The valve assembly 300 can be configured to receive tortillas from the infeed conveyor system 106. For example, the valve assembly 300 can function as the intake portion of the chopping cartridges 200. The valve assembly 300 can create stacks of tortillas (e.g., between 8-12 tortillas). The valve assembly 300 can then transfer a single stack of tortillas to the blade holder assembly 400 by moving from a closed position to an open position, which causes the stack of tortillas to fall through the valve assembly 300 and into the blade holder assembly 400. The valve assembly 300 can then return to the closed position to form a new stack of tortillas. The blade holder assembly 400 can be connected to the horizontal actuator 208 via the connecting arm 204. The horizontal actuator 208 can drive the blade holder assembly 400 such that the blade holder assembly 400 translates within the chopping cartridge 200. For example, once the blade holder assembly 400 receives a stack of tortillas from the valve assembly 300, the horizontal actuator 208 can move the blade holder assembly 400 to a position below the vertical actuator 206. As explained herein, the vertical press 206 can include a press or ram and can be configured to press the stack of tortillas through the blade holder assembly 400, causing the stack of tortillas to be cut into pieces. The cut tortilla pieces can fall through the chopping cartridges 200 and a portion of the support frame assembly 102 and onto the discharge conveyor system 108. The vertical actuator 206 can retract the ram out of the blade holder assembly 400. The horizontal actuator 208 can return the blade holder assembly 400 to a position below the valve assembly 300, and one or more steps in the process can be repeated. As explained herein, in some embodiments, engagement between the blade holder assembly 400 and the valve assembly 300 can cause the valve assembly 300 to transfer the stack of tortillas to the blade holder assembly 400.

While the valve assembly 300 is shown as a portion of the chopping cartridges 200 in the chip chopper system 100, it is recognized that the valve assembly 300 and/or the valve assembly 600 can be used in other systems. For example, the valve assembly 300 and/or the valve assembly 600 can be used in any other system where a round product (e.g., a tortilla) is stacked and dropped onto another component of the system. For example, the valve assembly 300 and/or the valve assembly 600 could be used in other tortilla production equipment such as a counter stacker, a packaging system, and/or the like.

The frame assembly 202 can provide support for some of the components of the chopping cartridge 200. For example, the frame assembly 202 can support some of the components of the chopping cartridges 200 and allow the components of the chopping cartridges 200 to move relative to each other, while the frame assembly 202 provides support. As explained herein, the blade holder assembly 400 can travel between receiving and cutting configurations during the processing of the tortilla stacks. The frame assembly 202 can allow the blade holder assembly 400 to travel within the frame assembly 202 and move between interacting with the valve assembly 300 and the vertical actuator 206. The frame assembly 202 can include a base portion 214, a top portion 216, and/or a valve support portion 250 (also referred to herein as "valve base plate 250"). The top portion 216 can be removably coupled to a top side of the base portion 214. The base portion 214 be a plate. The base portion 214 can include a frame hole 218 and rails 220. The base portion 214 can be used to support some components of the chopping cartridges 200. For example, the base portion 214 can support the top portion 216, which can support at least a portion of the vertical actuator 206 and the valve assembly 300 (e.g., via the valve support portion 250). As noted above, the valve assembly 300 acts as the tortilla intake for the chopping cartridges 200 and can be located near one end of the base portion 214 (in the negative X-direction). The vertical actuator 206 works in combination with the blade holder assembly 400 to cut the stacks of tortillas and can be located upstream (e.g., in the positive X-direction) relative to the valve assembly 300. The base portion 214 can also allow the blade holder assembly 400 to travel between configurations within the frame assembly 202. For example, the blade holder assembly 400 can travel along the base portion 214 in the negative X-direction to a position below the valve assembly 300 and in the positive X-direction to a position below the vertical actuator 206.

Additionally, the base portion 214 can provide access from the chopping cartridges 200 to the discharge conveyor system 108 (e.g., via the frame hole 218). The frame hole 218 can be formed in the center of the base portion 214. The frame hole 218 can be configured to allow the cut tortilla pieces to travel through the chopping cartridges 200 and onto the discharge conveyor system 108. The frame hole 218 can be any suitable shape, such as a circle, square, rectangle, and/or the like. In the illustrated embodiment, the frame hole 218 is shaped as an elongated circle (e.g., two rounded ends and straight side portions). The frame hole 218 can have a length and width that are sized based on the food product being processed in the chip chopper system 100. For example, the frame hole 218 can have a length and width that is greater than the diameter of a tortilla. At least a portion of the frame hole 218 can be positioned over the conveyor belt 128 of the discharge conveyor system 108 in the assembled chip chopper system 100. As such, chopped tortilla pieces can pass through the blade holder assembly 400 and the frame hole 218 and onto the conveyor belt 128 for further processing.

The base portion 214 can include two rails 220. The rails 220 can be configured to allow the blade holder assembly 400 to travel within the chopping cartridges 200 between configurations. The rails 220 can be formed on or coupled to a top side of the base portion 214. The rails 220 can be bearing rails. One rail 220 can be near a left side edge of the base portion 214 outwardly of the frame hole 218. The other rail 220 can be near a right side edge of the base portion 214 outwardly of the frame hole 218. The rails 220 can extend along the X-axis. The rails 220 can be configured to allow the blade holder assembly 400 to travel along the top side of the base portion 214. For example, as described herein, the blade holder assembly 400 can include a base plate 402. The base plate 402 can include one or more bearings that interface with the rails 220. As such the blade holder assembly 400 can travel in the X-axis along the top side of the base portion 214.

The top portion 216 can be coupled to the top side of the base portion 214. The top portion 216 can support the valve support portion 250, which can support the valve assembly 300. In this arrangement, the valve assembly 300 can be positioned relative to the infeed conveyor system 106 such that the valve assembly 300 can receive tortillas rows from the infeed conveyor system 106 (e.g., via the valve assembly 300) and transfer stacks of tortillas to the blade holder assembly 400 via gravity. In some cases, the top portion 216 can support at least a portion of the vertical actuator 206. The top portion 216 can include a left side member 222, a right side member 224, and/or a bridge portion 226. The left side member 222 can be coupled to the top side of the base portion 214 and can extend along the left side of the base portion 214 in the X-direction. The right side member 224 can be coupled to the top side of the base portion 214 and can extend along the right side of the base portion 214 in the X-direction. The bridge portion 226 can be coupled to and extend between the left side member 222 and the right side member 224. The bridge portion 226 can extend in the Y-direction. In some embodiments, the vertical actuator 206 can be coupled to the bridge portion 226. The bridge portion 226 can include a cutout 228. The cutout 228 can be configured to allow an arm 234 of the vertical actuator 206 to extend at least partially through the bridge portion 226.

The valve support portion 250 can be configured to support the valve assembly 300. The valve support portion 250 can be positioned between the valve assembly 300 and the blade holder assembly 400. The valve support portion 250 is shown more clearly in at least FIGS. 6A-6C. The valve support portion 250 can be coupled to and supported by the left side member 222 and the right side member 224 of the top portion 216. The valve support portion 250 is described further herein.

The vertical actuator 206 can be configured to cut the stack of tortillas into tortilla pieces in combination with the blade holder assembly 400. As noted above, the blade holder assembly 400 can translate within the chopping cartridges 200 (e.g., via the horizontal actuator 208 and along the base portion 214) from a position below the valve assembly 300 for receiving stacks of tortillas to a position below the vertical actuator 206 for cutting the stack of tortillas. For example, the vertical actuator 206 can drive the tortilla stack through the blade holder assembly 400 to cut the tortilla pieces. In this arrangement, the cut tortilla pieces pass through the blade holder assembly 400 and through the base portion 214 via the frame hole 218. As explained herein, the frame hole 218 is positioned above the discharge conveyor system 108. As such, the cut tortilla pieces can fall through the chopping cartridges 200 and onto the discharge conveyor system 108. The vertical actuator 206 can include a power source 230, a mounting plate 232, a vertical actuating arm 234, a ram 236, and/or a body 240. The vertical actuator 206 can be a linear actuator. The power source 230 can be any suitable power source (e.g., an electric motor, pneumatic cylinder, and/or the like). The mounting plate 232 can be configured to couple to the top portion 216 of the frame assembly 202. For example, the mounting plate 232 can be coupled to a top side of the bridge portion 226. As such, the position of the vertical actuator 206 can be fixed relative to the frame assembly 202. The vertical actuating arm 234 can be configured to travel in the Z-direction. For example, the vertical actuating arm 234 can be configured to move the ram 236 between a top position and a bottom position. The vertical actuating arm 234 can be coupled to the power source 230 on one end and the ram 236 on the opposite end. The power source 230 can drive the vertical actuating arm 234 during the operation of the chip chopper system 100. The vertical actuating arm 234 can extend through and travel through the cutout 228 of the bridge portion 226. The ram 236 can be configured to press the whole tortillas through the blade holder assembly 400 in operation (e.g., when in the bottom position). The ram 236 can have any suitable shape. For example, the ram 236 can be cylindrical. The ram 236 can include a bottom surface 238 (see e.g., FIG. 4C). In some embodiments, the 236 can include slots or cutouts to receive the blades 406 of the blade holder assembly 400. The ram 236 can be any suitable material. For example, the ram 236 can be a metal, a plastic, and/or the like. The diameter of the ram 236 can be larger than the diameter of the tortillas. It can be desirable for the ram 236 to be sufficiently hard such that the ram 236 does not deform while in use of get cut from the blades 406 of the blade holder assembly 400. The bottom surface 238 can apply a force or a pressure to the tortillas in the blade holder assembly 400 in operation. As explained herein, the ram 236 can drive the whole tortilla stack through blades 406 of the blade holder assembly 400 in operation. As such, the bottom surface 238 applies a sufficient force to the tortillas and the blades 406 to cause the tortillas to be cut into tortilla pieces.

The horizontal actuator 208 can be configured to transport the blade holder assembly 400 between configurations. For example, the horizontal actuator 208 can move the blade holder assembly 400 from a position beneath the valve assembly 300, the receiving configuration, so that the blade holder assembly 400 can receive stacks of tortillas, and to a position beneath the vertical actuator 206, the cutting configuration, so the stack of tortillas can be cut into pieces via the blade holder assembly 400 and the vertical actuator 206. The horizontal actuator 208 can include a power source 242, one or more mounting plate(s) 244, a horizontal actuating arm 246, and/or a body 248. The horizontal actuator 208 can be a linear actuator. The power source 242 can be any suitable power source (e.g., an electric motor, pneumatic cylinder, and/or the like). The one or more mounting plates 244 can be configured to couple the body 248 of the horizontal actuator 208 to one or more of the frame assembly 202 and the support frame assembly 102. As such, the position of the body 248 can be fixed relative to the frame assembly 202. The one or more mounting plates 244 can be brackets. The horizontal actuating arm 246 can extend through the body 248. The horizontal actuating arm 246 can be coupled to the power source 242 on one end and the connecting arm 204 on an opposite end. The power source 242 can drive the horizontal actuating arm 246 during the operation of the chip chopper system 100. The horizontal actuating arm 246 can travel in the X-direction. Movement of the horizontal actuating arm 246 can cause corresponding movement of the connecting arm 204 and the blade holder assembly 400 in the X-direction.

The connecting arm 204 can be configured to connect the blade holder assembly 400 to the horizontal actuator 208. For example, the connecting arm 204 can function as an extension of the horizontal actuating arm 246 such that the horizontal actuator 208 can be positioned away from the other components of the chopping cartridges 200. The connecting arm 204 can be any suitable shape. In the illustrated embodiment, the connecting arm 204 is shaped as a rectangular plate. The connecting arm 204 can include a first end 210 and a second end 212. The first end 210 can be coupled to the horizontal actuating arm 246 of the horizontal actuator 208. In some implementations, a spacer 247 can be positioned between the horizontal actuating arm 246 and the first end 210. The spacer 247 can be used to couple the horizontal actuating arm 246 to the first end 210 of the horizontal actuator 208. In some cases, the first end 210 can be a larger rectangular portion compared to the majority of the connecting arm 204. The second end 212 can be coupled to the base plate 402 of the blade holder assembly 400 (e.g., via the arm coupling portion 414 of the base plate 402). As such, movement of the horizontal actuator 208 can cause movement of the connecting arm 204 and the blade holder assembly 400.

Figure 5A:
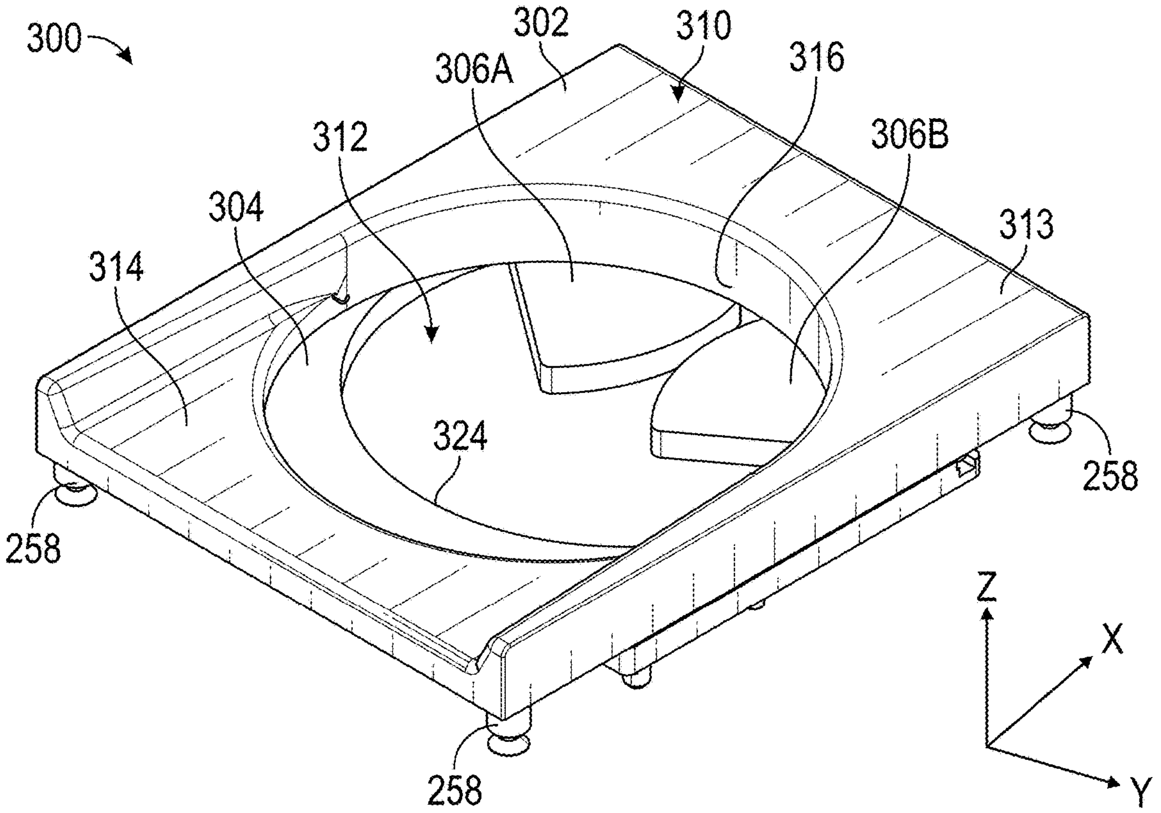
FIGS. 5A-5F and 6A-6C illustrate various views of a valve assembly and components of the valve assembly of the chopping cartridge of FIG. 4A.

FIGS. 5A-6C illustrate various isolation views of the valve assembly 300 and components of the valve assembly 300. FIG. 5A illustrates a top perspective view of the valve assembly 300. FIGS. 5B and 5C illustrate top side views of the valve assembly 300 in a closed configuration and an open configuration respectively. The valve assembly 300 can be removably fixed to at least a portion of the chopping cartridges 200. For example, the valve assembly 300 may be fixed with mechanical fasteners, which can be removed from the chopping cartridges 200 such that the valve assembly 300 can be removed. In some cases, an operator may remove the valve assembly 300 to replace or perform maintenance on the valve assembly 300.

The valve assembly 300 can be configured to receive tortillas from the infeed conveyor system 106. The valve assembly 300 can be configured to create a stack of tortillas. Additionally, the valve assembly 300 can direct the stack of tortillas towards and into the blade holder assembly 400. As explained herein, the valve assembly 300 can create and transfer stacks of tortillas to the blade holder assembly 400 in the desired orientation (e.g., flat) for the cutting process between the vertical actuator 206 and the blade holder assembly 400. The number of tortillas in the stack can vary, depending on the configuration. For example, the valve assembly 300 can create a stack of between 1 and 20 tortillas (e.g., between 1 and 20, between 2 and 18, between 4 and 16, between 6 and 14, between 8 and 12, and/or the like tortillas, values between the foregoing, etc.). The valve assembly 300 can further be configured to transfer the stack of tortillas to the blade holder assembly 400. For example, the valve assembly 300 can have a first/closed configuration, shown in FIG. 5B, and a second/open configuration, shown in FIG. 5C. In the closed configuration, the stack of tortillas can be supported by the valve assembly 300. In the open configuration, the stack of tortillas can pass through the valve assembly 300 and into the blade holder assembly 400, which can be in a receiving configuration, for further processing (e.g., cutting), as described herein. For example, as explained herein, the valve assembly 300 can include a top valve portion, a bottom valve portion, and a valve support portion, each with an individual hole. In the closed configuration, at least one hole (e.g., the bottom valve hole) may be misaligned or axially offset from at least one of the top valve hole and the support portion hole. As such, tortillas cannot cleanly pass through the valve assembly 300. In the open configuration, the holes of the top valve portion, the bottom valve portion, and the valve support portion are sufficiently aligned (e.g., generally axially aligned) such that the stack of tortillas can pass through the valve assembly 300.

Figure 5B:
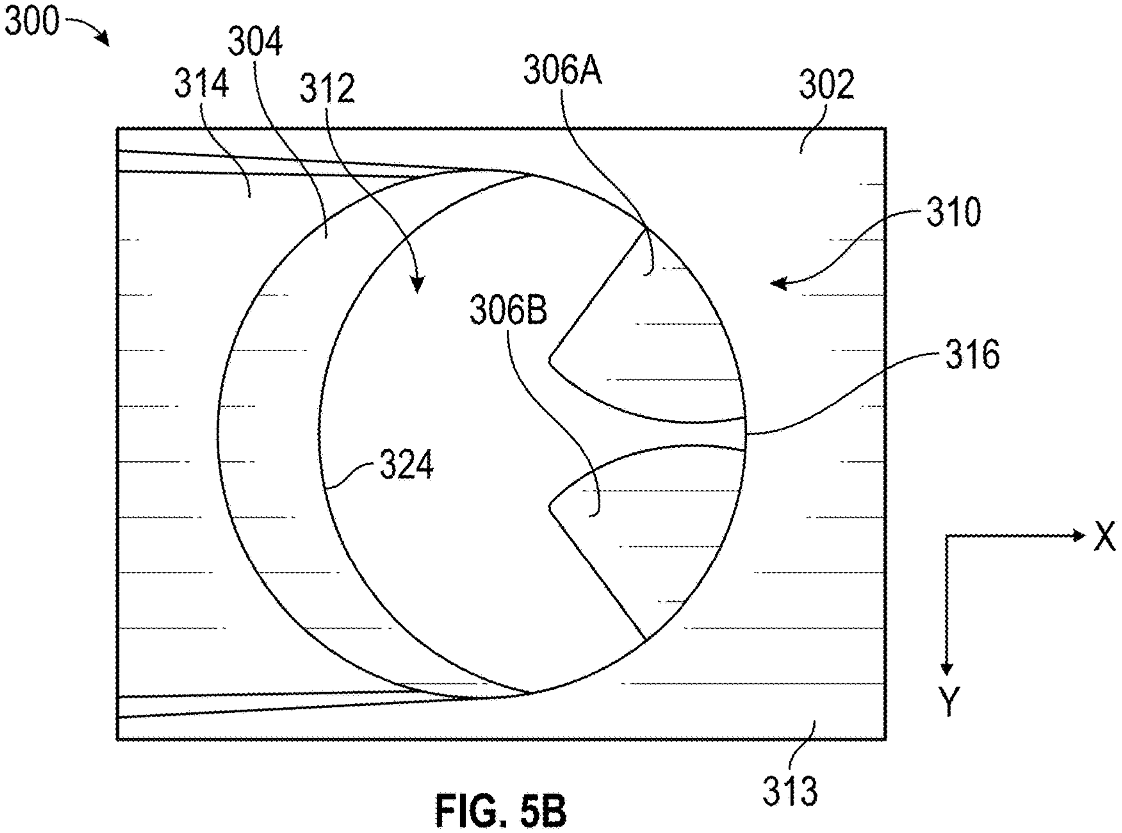

With reference to FIGS. 5A-5F, the valve assembly 300 can include a top valve portion 302, a bottom valve portion 304, one or more vane(s) 306, and/or one or more resilient member(s) 308. The valve assembly 300 can be made of any suitable material (e.g., plastic, metal, etc.). In some cases, the valve assembly 300 can be partially or completely constructed by additive manufacturing (e.g., 3D printing). The top valve portion 302 can be configured to receive tortillas from the infeed conveyor system 106 and form stacks of tortillas in combination with the bottom valve portion 304 and the one or more vanes 306 (also referred to herein as "shutters" or "leaf shutters"). A top surface of the one or more vanes 306 can be positioned at a same plane as a top surface the bottom valve portion 304. For example, the tortillas can be supported by the bottom valve portion 304 and the one or more vanes 306. As shown in FIG. 5B, when the valve assembly 300 is in the closed configuration, the bottom valve portion 304 and the one or more vanes 306 are visible through the top valve portion 302. However, an open area, for example between the bottom valve portion 304 and the one or more vanes 306 extending completely through the valve assembly 300 may still be visible from the top view, even when the valve assembly 300 is in the closed configuration. The open area can reduce the amount of surface area of the valve assembly 300 in contact with the stack of tortillas. In some cases, this can provide a benefit of reducing risk of the tortillas getting stuck to the valve assembly 300, which could cause the stack of tortillas to enter the blade holder assembly 400 in a non-flat orientation, which could compromise the cutting process. When the valve assembly 300 moves to the open configuration (e.g., in FIG. 5C) where top valve hole and bottom valve hole are sufficiently aligned to allow tortillas to pass through the valve assembly 300. In the open configuration, generally neither the top valve portion 302 nor the one or more vanes 306 are visible through the valve assembly 300 from a top view. The top valve portion 302 can include a top side 310, a bottom side 311 (see e.g., FIG. 5E), and/or a top valve hole 312. The top side 310 can include an upper surface 313 and a lower surface/recessed portion 314 and/or a backstop 316. The recessed portion 314 can be a depression extending in the negative Z-direction from the upper surface 313. For example, the recessed portion 314 can have a smaller height than the upper surface 313. The recessed portion 314 can extend into the top valve hole 312 having a smaller area than the recessed portion 314. The backstop 316 can be a wall at least partially formed from the transition from the upper surface 313 to the recessed portion 314. In some embodiments, the backstop 316 can be perpendicular to the upper surface 313 and the recessed portion 314. The top valve hole 312 can be circular shaped. The top valve hole 312 can have a larger diameter than a tortilla. The top valve hole 312 can extend through the top valve portion 302. A portion of the top valve hole 312 can be formed in/extend through the recessed portion 314. Another portion of the top valve hole 312 can be formed in/extend through the upper surface 313. The top valve hole 312 can be formed from at least a portion of the backstop 316. For example, a back side of the top valve hole 312 can be the backstop 316.

In operation, tortillas can enter the valve assembly 300 via the recessed portion 314 from the infeed conveyor system 106. The velocity of the tortillas can cause the tortillas to pass over the recessed portion 314 and into the top valve hole 312. The tortillas can pass partially through the top valve hole 312 and can be supported by the bottom valve portion 304 and/or the one or more vanes 306. In this arrangement, the tortillas are generally at a lower height (in the Z-direction) than the recessed portion 314. As such, subsequent tortillas can continually enter the valve assembly 300 and the top valve hole 312 and can be supported by the previously received tortillas. In some cases, the backstop

316 can prevent the tortillas from passing over the valve assembly 300. For example, a tortilla may contact at least a portion of the backstop 316 when entering the valve assembly 300, which can direct the tortilla to the top valve hole 312.

Figure 5C:
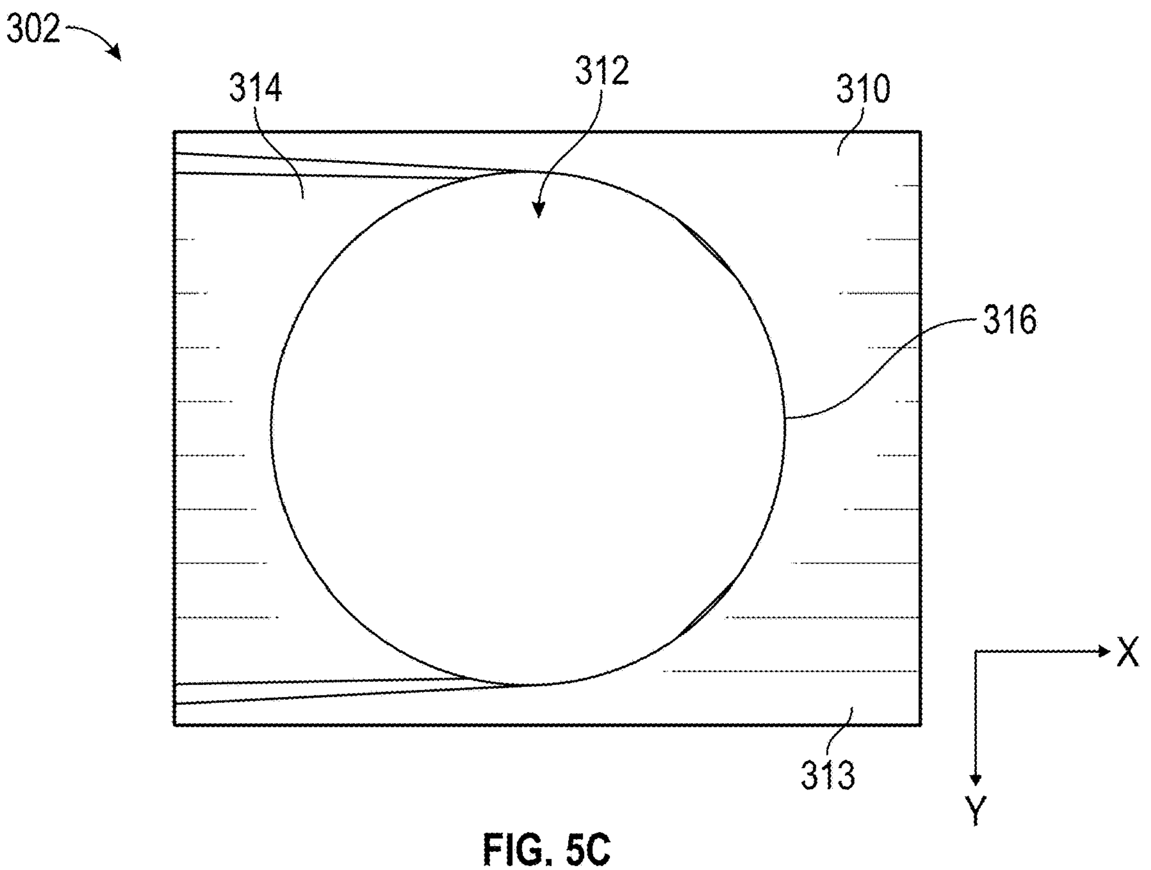
Figure 5D:
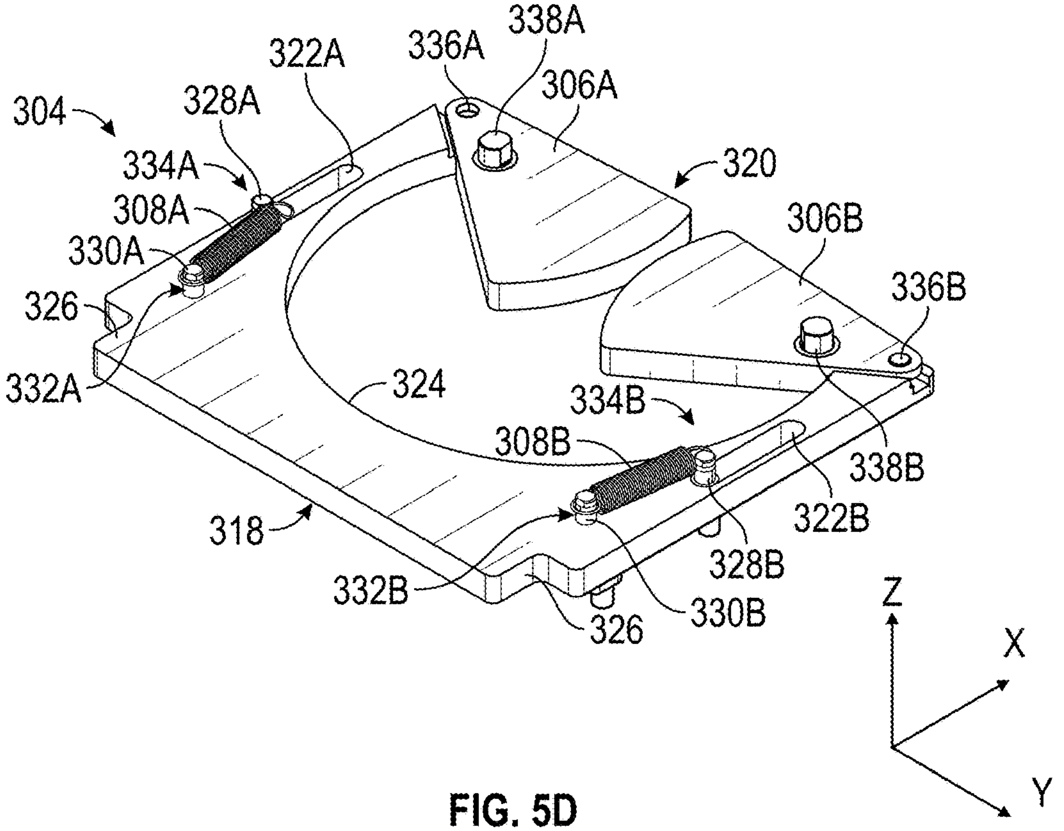
Figure 5E:
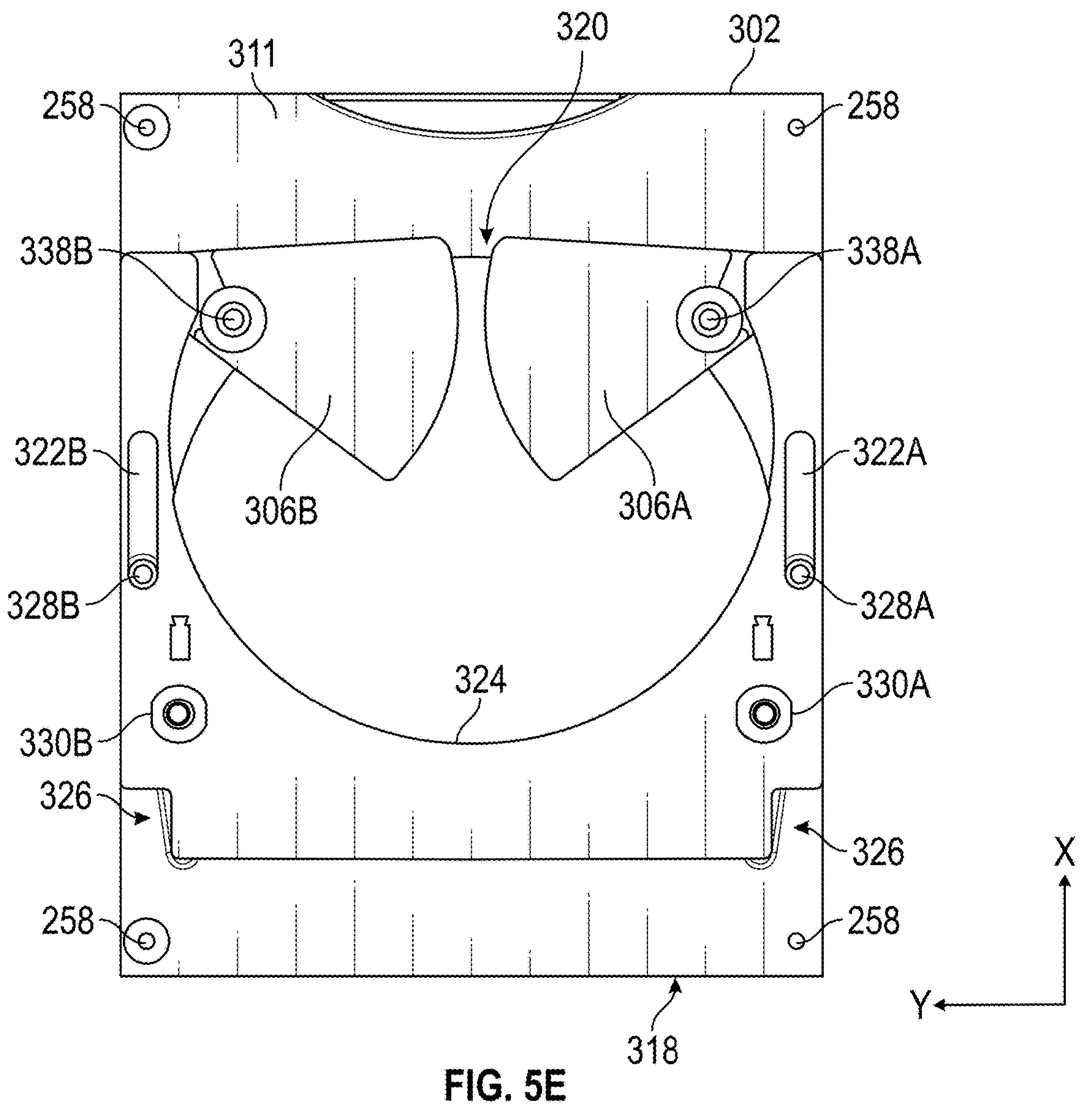
Figure 5F:
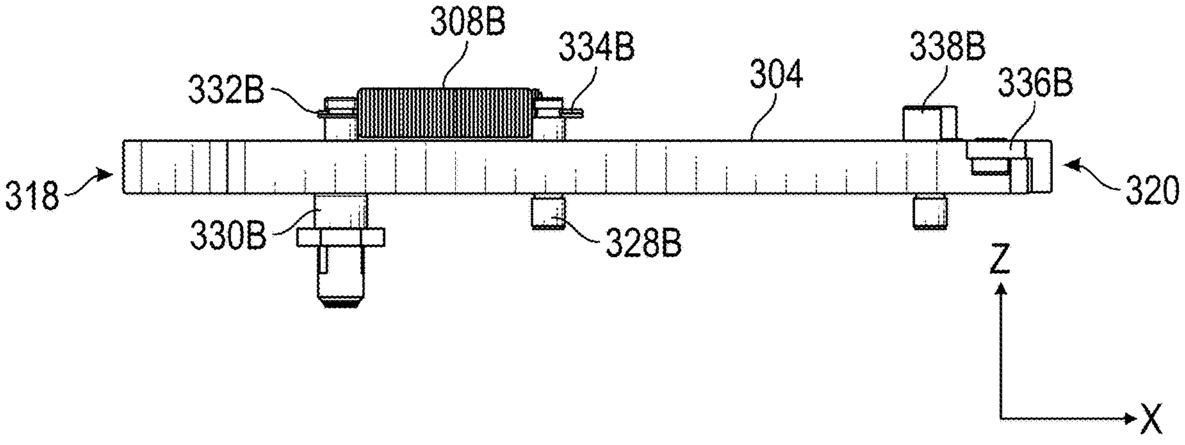

FIGS. 5D-5F illustrate a top perspective view, a bottom view, and a side view respectively of the bottom valve portion 304, the one or more vanes 306, and the one or more resilient members 308 of the valve assembly 300. FIG. 5E also shows the bottom side 311 of the top valve portion 302. The bottom valve portion 304 can be used to form and support the stack of tortillas while the valve assembly 300 is in the closed configuration. The bottom valve portion 304 can also be configured to move relative to the top valve portion 302 and the valve support portion 250 such that the valve assembly 300 moves into the open configuration so stacks of tortillas can be delivered to the blade holder assembly 400. The bottom valve portion 304 can include a front side 318, a back side 320, a first slot 322A, a second slot 322B, and/or a bottom valve hole 324. The front side 318 can include two corner stops 326. The two corner stops 326 can be cutouts extending inwardly from the front side 318 in a direction towards the back side 320 (e.g., the positive X-direction). The two corner stops 326 can prevent the bottom valve portion 304 from traveling too far in operation, as described herein. The first slot 322A and the second slot 322B can be cutouts extending through the bottom valve portion 304. The slots 322A, 322B can be adjacent to the bottom valve hole 324 and can extend in a direction from the front side 318 to the back side 320 (e.g., the X-direction). The first slot 322A can receive fasteners 328. In the illustrated embodiment, the fasteners 328 are pins and the bottom valve portion 304 can include a first pin 328A and a second pin 328B. The first slot 322A can receive the first pin 328A and the second slot 322B can receive the second pin 328B. The pins 328A, 328B can extend through the slots 322A, 322B and can be coupled to the valve support portion 250. As such, the pins 328A, 328B can remain fixed during movement of the bottom valve portion 304. The bottom valve hole 324 can be a cutout. The bottom valve hole 324 can extend inwardly from the back side 320. As shown in FIG. 5B, when the valve assembly 300 is in the closed configuration, the bottom valve hole 324 is axially offset or not aligned with the top valve hole 312 of the top valve portion 302. As such, tortillas passing through the top valve hole 312 can contact and be supported by at least a portion the bottom valve portion 304. This portion of the bottom valve portion 304 may have a crescent shape when view from above. As shown in FIG. 5C, in the open configuration, the bottom valve hole 324 can be aligned with the top valve hole 312 of the top valve portion 302. As such, tortillas passing through the top valve hole 312 will generally not contact the bottom valve portion 304 and can pass cleanly through the top valve hole 312 and the valve assembly 300 into the blade holder assembly 400.

Referring back to FIGS. 5D-5F, the bottom valve portion 304 of the valve assembly 300 can include one or more resilient members 308, a first driving pin 330A, and/or a second driving pin 330B. The combination of the resilient members 308 and the driving pins 330A, 330B can allow the bottom valve portion 304 to move relative to the top valve portion 302 and the valve support portion 250 such that the valve assembly 300 can move between configurations and tortillas can be stacked and transferred to the blade holder assembly 400. The driving pins 330A, 330B can extend through the bottom valve portion 304. Movement of the driving pins 330A, 330B in the X-direction can cause corresponding movement of the bottom valve portion 304. The one or more resilient members 308 can be any suitable component that can deform and return to their original shape (e.g., a springs, elastomeric components, etc.). In the illustrated embodiment, the one or more resilient members 308 are springs, and the valve assembly 300 includes a first spring 308A and a second spring 308B. The first spring 308A can have a first end 332A and a second end 334A. The first end 332A can be coupled to the first driving pin 330A and the second end 334 can be coupled to the first pin 328A. The second spring 308B can have a first end 332B and a second end 334B. The first end 332B can be coupled to the driving pin 330B and the second end 334B can be coupled to the second pin 328B. The driving pins 330A, 330B move in the X-direction (e.g., when the blade holder assembly 400 contacts and applies a force to the driving pins 330A, 330B, moving the valve assembly 300 into the open configuration, while the first and second pins 328A, 328B remain fixed. As such, the springs 308A, 308B can extend and may be in tension. When the force applied to the driving pins 330A, 330B is removed (e.g., when the blade holder assembly 400 is retracted), the springs 308A, 308B compress, causing the bottom valve portion 304 to return to its original position (e.g., with the valve assembly 300 in the closed configuration).

As noted herein, the one or more vanes 306 can be configured to at least partially support the tortilla stack in the closed configuration. Movement of the bottom valve portion 304 and corresponding rotation of the one or more vanes 306 can also allow the tortilla stack to pass through the valve assembly 300 and into the blade holder assembly 400. In the illustrated embodiment, the valve assembly 300 includes two vanes 306, a first vane 306A and a second vane 306B. In other embodiments, the valve assembly 300 could include more vanes 306. For example, the valve assembly 300 could include four vanes 306. The vanes 306A, 306B can have any suitable shape. The first vane 306A can be rotationally coupled to the bottom valve portion 304 at the back side 320 via a first vane pin 336A. The first vane 306A can be rotationally coupled to the valve support portion 250 via a rotating assembly 338A. For example, the rotating assembly may include one or more bushings, one or more bearings, one or more pins, and/or one or more fasteners. In one example, at least one bearing (e.g., a sleeve bearing and/or a thrust bearing) can be coupled to the first vane 306A (e.g., positioned in an opening of the first vane 306A) and configured to rotate about a pin coupled to the valve support portion 250. In this example, the pin can include a channel that can be configured to receive a fastener to secure the pin to the valve support portion 250. Further, in some case, one or more bushings may be positioned between the pin and the valve support portion 250 and/or between the pin and the bearing to reduce wear and friction. As such, motion of the bottom valve portion 304 causes the first vane 306A to rotate about the first vane pin 336A (e.g., about the Z-axis), because the at least a portion of the rotating assembly 338A is fixed to the valve support portion 250. When the bottom valve portion 304 moves from the closed configuration to the open configuration (e.g., while traveling in the negative X-direction), the first vane 306A can rotate outwardly in the opposite direction. Similarly, The second vane 306B can be rotationally coupled to the bottom valve portion 304 at the back side 320 via a second vane pin 336B. The second vane 306B can be coupled to the valve support portion 250 via a second rotating assembly 338B, which can be similar or identical to the first rotating assembly 338A. As such, motion of the bottom valve portion 304 can cause the second vane 306B to rotate about the second vane pin 336B (e.g., about the Z-axis), because at least a portion of the rotating assembly 338B is fixed to the valve support portion 250. When the bottom valve portion 304 moves from the closed configuration to the open configuration (e.g., while traveling in the negative X-direction), the second vane 306B can rotate outwardly in the opposite direction. When then vanes 306A, 306B rotate outwardly, tortillas can pass through the bottom valve hole 324. For example, in FIG. 5B, the valve assembly 300 is in the closed configuration and tortilla stack cannot pass through the bottom valve hole 324 in the desired flat orientation. However, the vanes 306A, 306B do not completely close the bottom valve hole 324, even when the valve assembly 300 is in the closed configuration. For example, as shown in FIG. 5B, the bottom valve hole 324 is visible through the top valve hole 312, with a top side of the bottom valve portion 304 and the vanes 306A, 306B only partially obstructing a path through the valve assembly 300. In this configuration, the top side of the bottom valve portion 304 is on one side of the top valve hole 312 and the vanes 306A, 306B are on the opposite side. Because the tortillas can be flat when entering the valve assembly 300, the partial obstruction provided by the top side of the bottom valve portion 304 and the vanes 306A, 306B can be sufficient to support the stack of tortillas. In FIG. 5C, the valve assembly 300 is in the open configuration, with the vanes 306A, 306B rotated outwardly, and the tortilla stack can pass through the bottom valve hole 324 and the valve assembly 300 in the desired flat orientation. In this arrangement, the bottom valve hole 324 is at a maximum effective size, with the vanes 306A, 306B not obstructing the bottom valve hole 324 or the path through the top valve hole 312. Additionally, because the bottom valve portion changes positions relative to the top valve portion 302, the top side of the bottom valve portion 304 can be positioned under the top valve portion 302 such that top valve hole 312 is not obstructed.

Figure 6A:
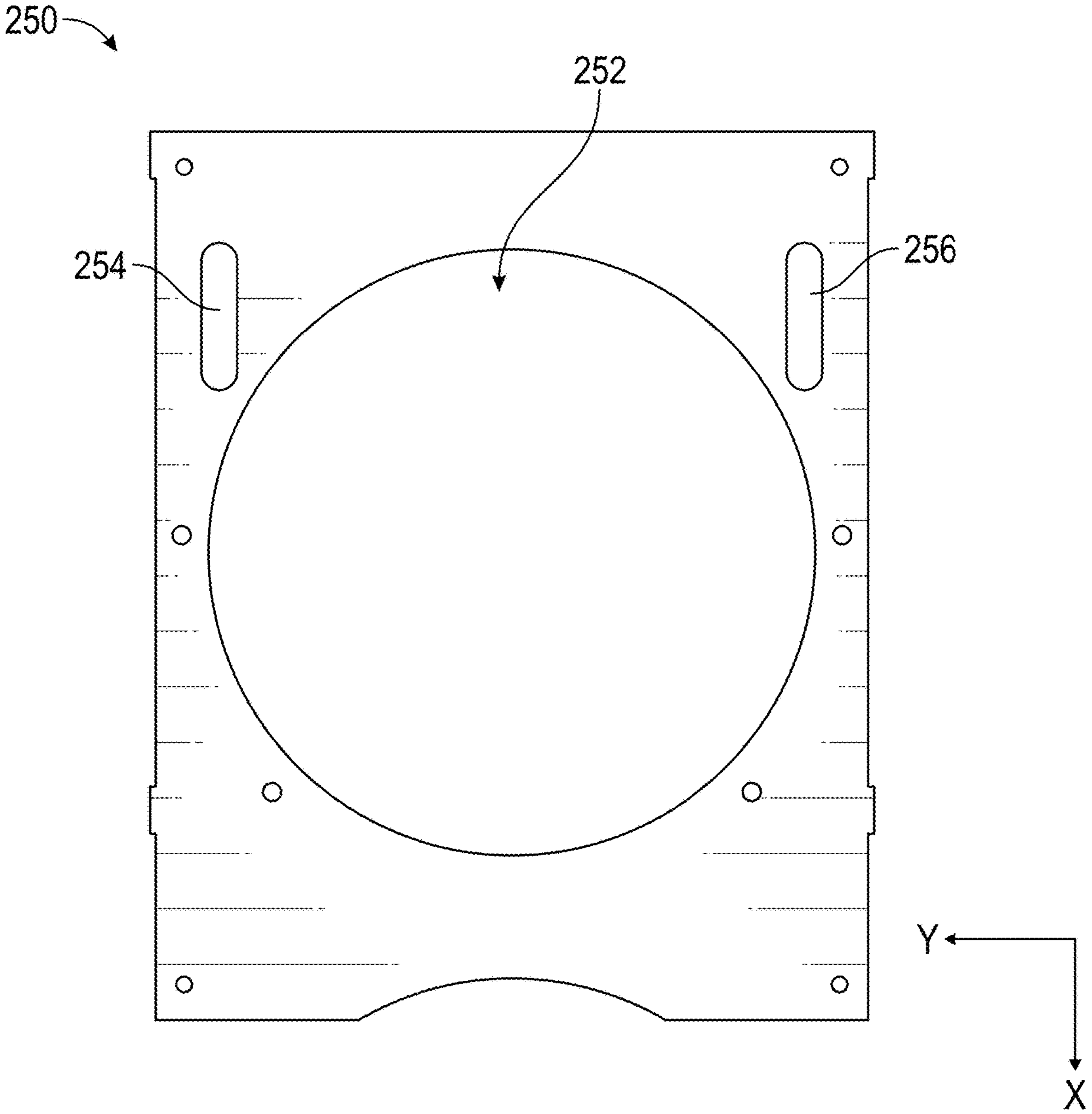
Figure 6B:
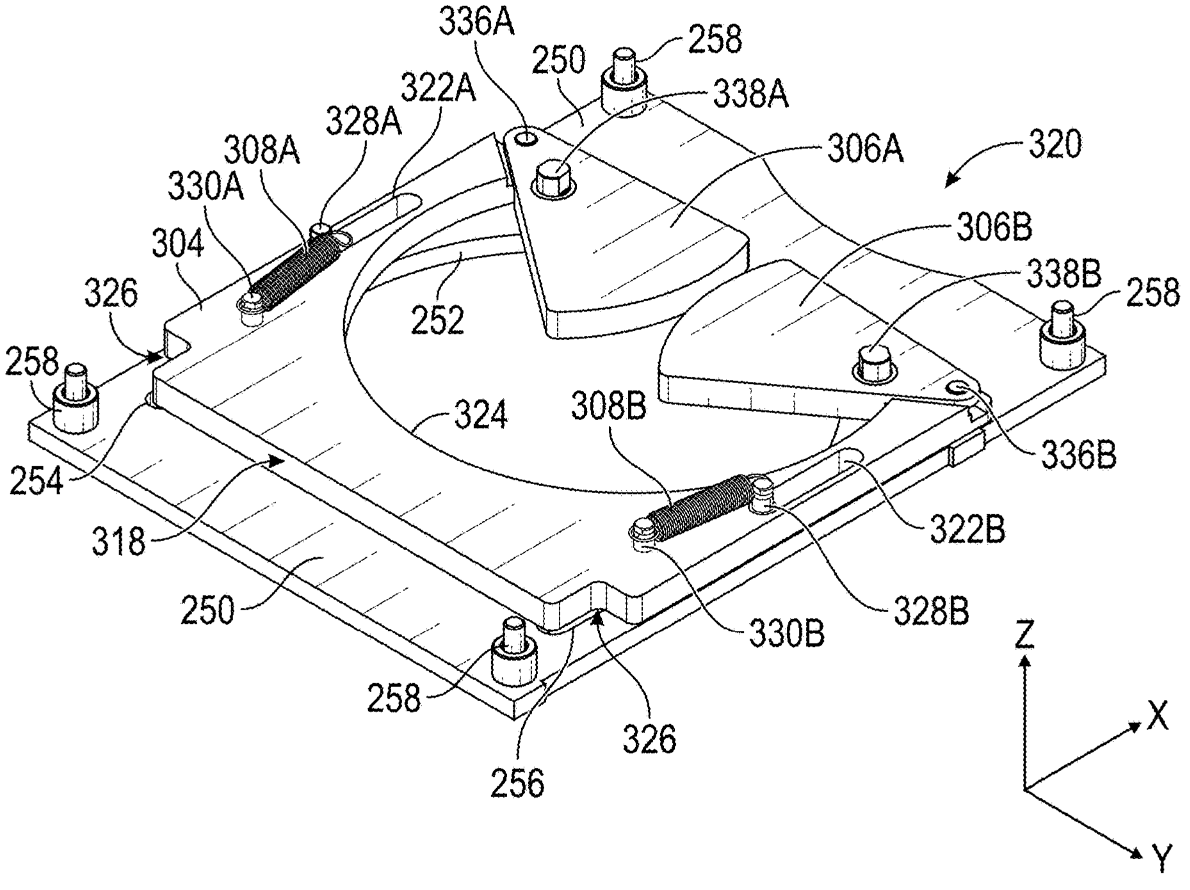
Figure 6C:
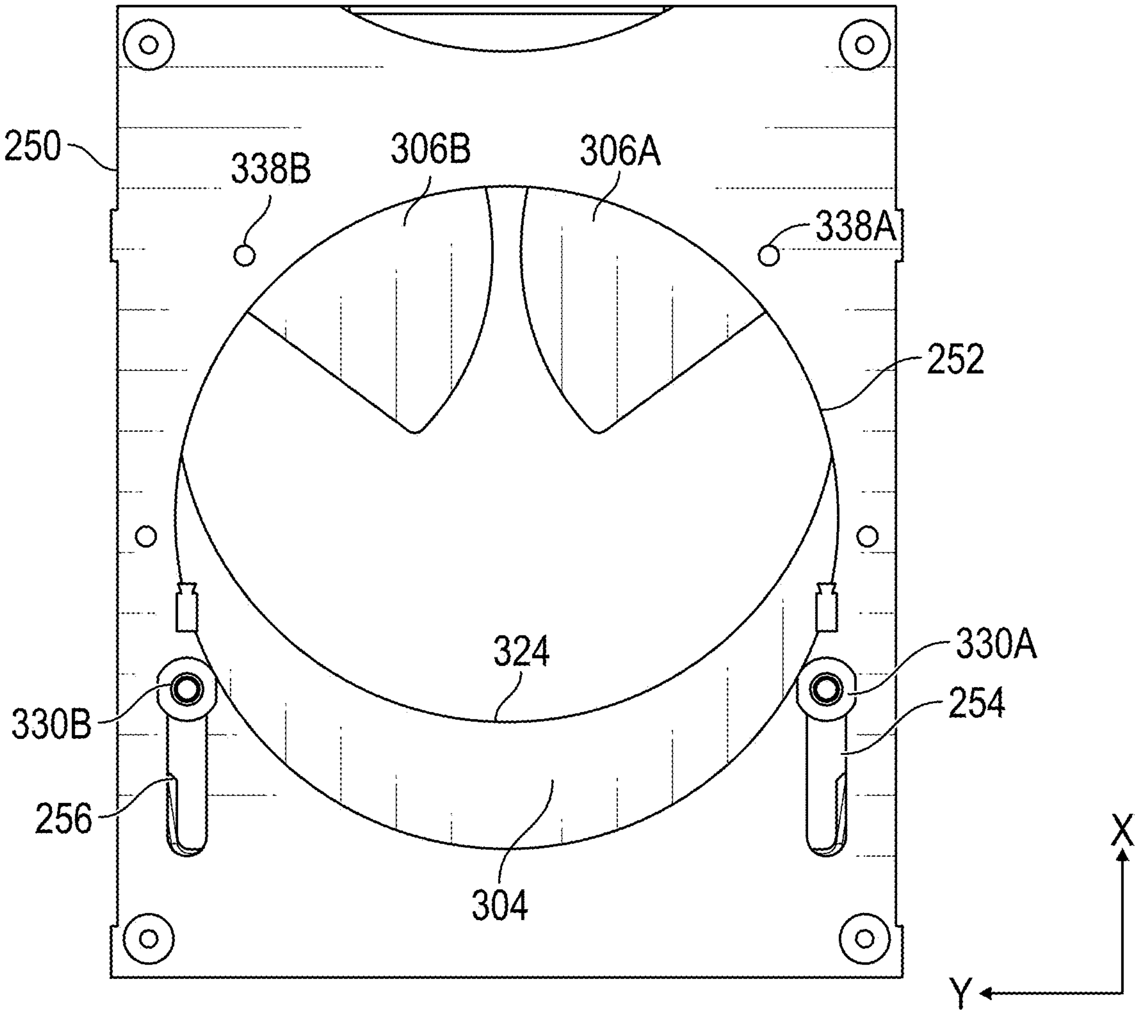

FIG. 6A illustrates a top view of the valve support portion 250. FIG. 6B illustrates a top perspective view of some components of the valve assembly 300 coupled to the valve support portion 250. FIG. 6C illustrates a bottom view of some components of the valve assembly 300 coupled to the valve support portion 250. The valve support portion 250 can be configured to support the valve assembly 300. The valve support portion 250 can also work with the top valve portion 302 and the bottom valve portion 304 such that the valve assembly 300 can move between configurations. The valve support portion 250 can support both the top valve portion 302 and the bottom valve portion 304 separately, such that the bottom valve portion 304 can move relative to both the top valve portion 302 and the valve support portion 250. The valve support portion 250 can form a portion of the frame assembly 202. The valve support portion 250 can extend between the left side member 222 and the right side member 224 of the frame assembly 202. The valve support portion 250 can be positioned between the valve assembly 300 and the blade holder assembly 400. The valve support portion 250 can include a base plate hole 252, a first frame slot 254, and/or a second frame slot 256. The base plate hole 252 can extend through the valve support portion 250. The base plate hole 252 can be circular shaped. The base plate hole 252 can be the same or a similar size as the top valve hole 312 of the top valve portion 302 of the valve assembly 300. In an assembled chopping cartridge 200, a central axis of the base plate hole 252 can be aligned with a central axis of the top valve hole 312. Tortilla stacks passing through the valve assembly 300 can pass through the valve support portion 250 via the base plate hole 252 before entering the blade holder assembly 400.

The first frame slot 254 and the second frame slot 256 can be slot shaped holes extending through the valve support portion 250. With reference to FIGS. 6B and 6C, the first driving pin 330A can extend through the first frame slot 254, and the second driving pin 330B can extend through the second frame slot 256. As such, in the assembled chopping cartridges 200, the blade holder assembly 400 can contact the driving pins 330A, 330B to move the valve assembly 300 from the closed configuration to the open configuration, as the driving pins 330A, 330B travel along the frame slots 254, 256. The frame slots 254, 256 can restrict the range of the driving pins 330A, 330B. For example, the ends of the frame slots 254, 256 can define the maximum positions for the driving pins 330A, 330B in the positive and negative X-direction.

With reference to FIG. 6B, the valve support portion 250 can include a plurality of rods 258. The rods 258 can be positioned near the corners of the valve support portion 250. The rods 258 can extend upwardly (e.g., in the positive Z-direction) from the valve support portion 250. The rods 258 can be extend into or be coupled to the bottom side of the top valve portion 302 (see e.g., FIG. 9C). As such, the rods 258 support the top valve portion 302. Additionally, the rods 258 can provide a gap between the valve support portion 250 and the top valve portion 302 to allow the bottom valve portion 304 to move relative to both components.

FIGS. 10A-11C illustrate various isolation views of the valve assembly 600, the valve support portion 250A, and components thereof. Some features of the valve assembly 600 and the valve support portion 250A are similar or identical to features of the valve assembly 300 and the valve support portion 250 in at least FIGS. 4A-6C and 9A-9C. Thus, reference numerals used to designate the various features or components of the valve assembly 300 and valve support portion 250 are identical to those used for identifying the corresponding features of the components of the valve assembly 600 and the valve support portion 250A in FIGS. 10A-11C, except that the numerical identifiers for the valve assembly 600 begin with a "6" instead of a "3" and the numerical identifiers for the valve support portion 250A end with an "A". Therefore, the structure and description for the various features of the valve assembly 300 and the valve support portion 250 and the operation thereof as described in at least FIGS. 4A-6C and 9A-9C are understood to also apply to the corresponding features of the valve assembly 600 and the valve support portion 250A in FIGS. 10A-11C, except as described differently below.

Figure 10A:
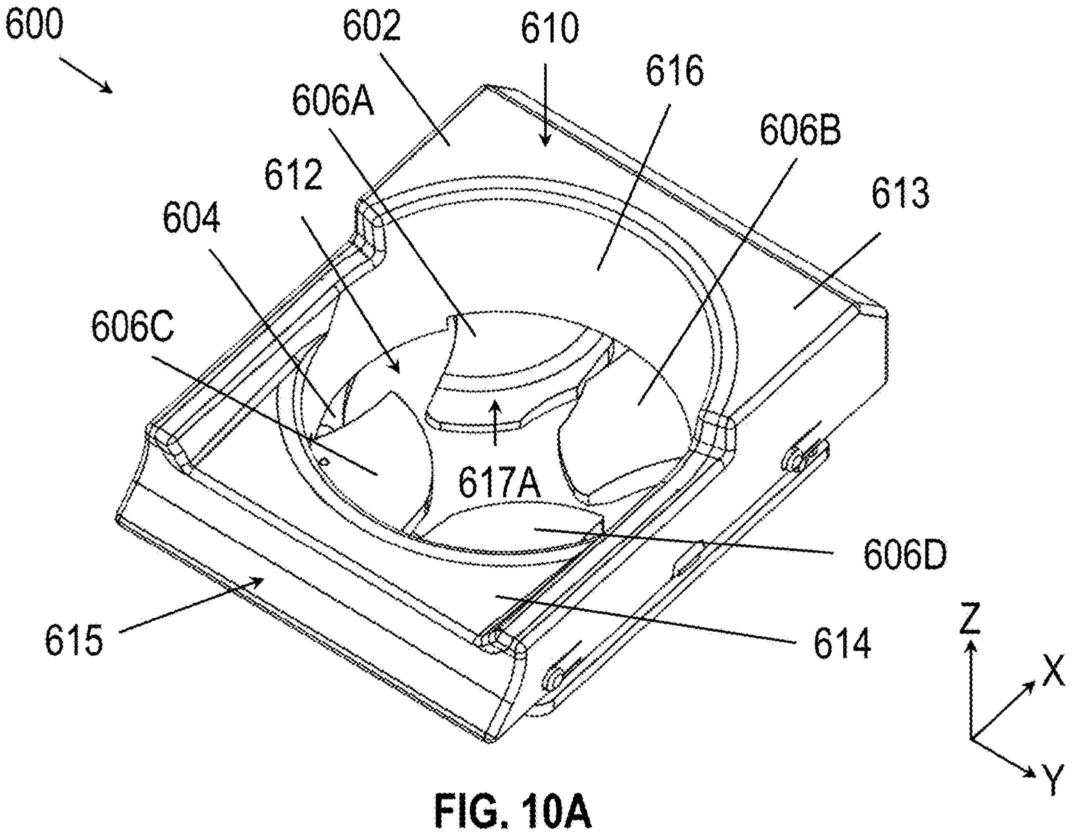
FIGS. 10A-10F and 11A-11C illustrate various views of another embodiment of a valve assembly and associated components that can be used in the chopping cartridge of FIG. 4A.
Figure 10B:
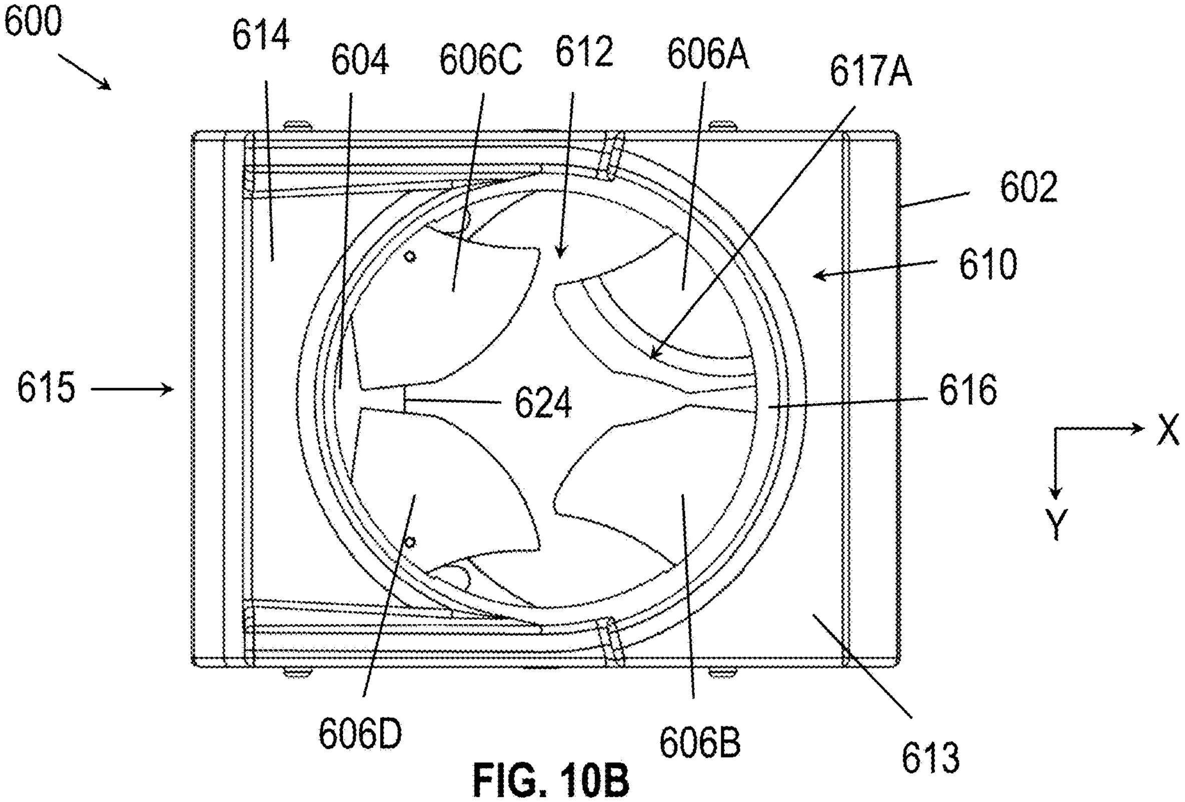
Figure 10C:
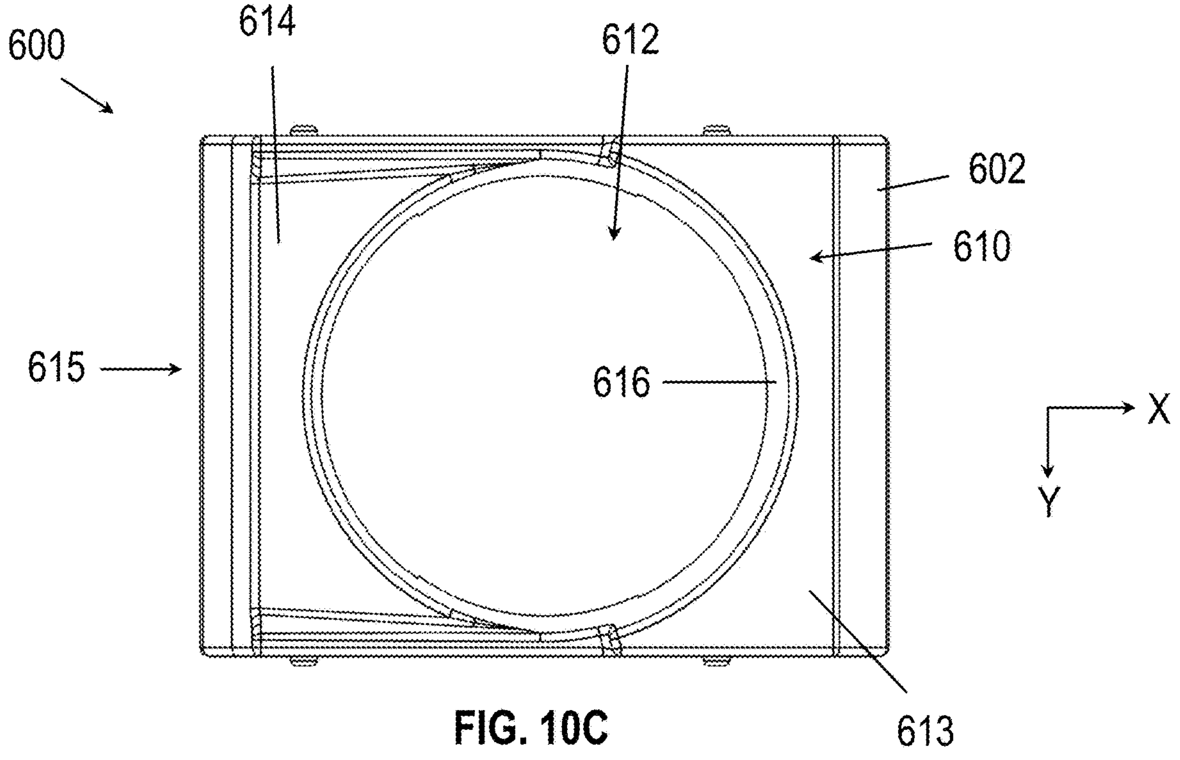

With reference first to FIG. 10A, a top perspective view of the valve assembly 600 is shown. Each valve assembly 600 can be removably fixed to at least a portion of each chopping cartridge 200 (e.g., instead of the valve assembly 300) in the chip chopper system 100. For example, the valve assembly 600 may be fixed with mechanical fasteners, which can be removed from the chopping cartridges 200 such that the valve assembly 600 can be removed. In some cases, an operator may remove the valve assembly 600 to replace or perform maintenance on the valve assembly 600.

Like the valve assembly 300, the valve assembly 600 can be configured to receive tortillas from the infeed conveyor system 106. The valve assembly 600 can be configured to create a stack of tortillas. Additionally, the valve assembly 600 can direct the stack of tortillas towards and into the blade holder assembly 400. For example, the valve assembly 600 can create and transfer stacks of tortillas to the blade holder assembly 400 in the desired orientation (e.g., flat) for the cutting process between the vertical actuator 206 and the blade holder assembly 400. The number of tortillas in the stack can vary, depending on the configuration. For example, the valve assembly 600 can create a stack of between 1 and 20 tortillas (e.g., between 1 and 20, between 2 and 18, between 4 and 16, between 6 and 14, between 8 and 12, and/or the like tortillas, values between the foregoing, etc.). The valve assembly 600 can further be configured to transfer the stack of tortillas to the blade holder assembly 400. For example, the valve assembly 600 can have a first/closed configuration, shown in FIG. 10B, and a second/open configuration, shown in FIG. 10C. In the closed configuration, the stack of tortillas can be supported by the valve assembly 600. In the open configuration, the stack of tortillas can pass through the valve assembly 600 and into the blade holder assembly 400, which can be in a receiving configuration, for further processing (e.g., cutting), as described herein. Like the valve assembly 300, the valve assembly 600 can include a top valve portion, a bottom valve portion, and a valve support portion, each with an individual hole. In the closed configuration, at least one hole (e.g., the bottom valve hole) may be misaligned or axially offset from at least one of the top valve hole and the support portion hole. As such, tortillas cannot cleanly pass through the valve assembly 600. In the open configuration, the holes of the top valve portion, the bottom valve portion, and the valve support portion are sufficiently aligned (e.g., generally axially aligned) such that the stack of tortillas can pass through the valve assembly 600.

The valve assembly 600 differs from the illustrated example of the valve assembly 300 in that the valve assembly 600 includes four shutters or vanes 606. The valve assembly 600 can include a first vane 606A, a second vane 606B, a third vane 606C and a fourth vane 606D (collectively "vanes 606"). The first vane 606A and the second vane 606B can be positioned in the back of the valve assembly 600 (e.g., at least partially below the backstop 616 when in the closed configuration) and the third vane 606C and the fourth vane 606D can be positioned in the front or receiving end of the valve assembly 600 (e.g., in the negative X-direction relative to the back vanes 606A, 606B). In the illustrated example, the back vanes 606A, 606B are larger than the front vanes 606C, 606D. Such an arrangement can be desirable because the tortillas may contact the back vanes 606A, 606B prior to contracting the front vanes 606C, 606D when entering the valve assembly 600. As such, the larger surface area of the back vanes 606A, 606B can increase the amount of friction between the back vanes 606A, 606B and the tortillas, causing the tortillas to move to a stopped position and settle on the four vanes 606. When supporting tortillas in the closed configuration, the tortillas can be substantially or wholly supported by the four vanes 606, instead of another portion of the bottom valve portion 304 as in the valve assembly 300 shown in FIG. 5A. Utilizing four vanes 606 instead of two vanes can provide a benefit of increasing the maximum covered surface area in the bottom valve hole 324 (e.g., in the X-Y plane). By covering more surface area in the closed configuration, the risk of tortillas prematurely moving through the valve system 600 can be reduced. A top surface of the vanes 606 can be positioned above the plane of a top surface the bottom valve portion 604. In some implementations, the valve assembly 600 can move more quickly between the open and closed configuration compared to the valve assembly 300 at least in part due to the quick rotation of the vanes 606. A quicker transition between configurations can provide advantages of allowing the chip chopper system 100 to process more tortillas and/or can promote a smooth transition of the tortillas from the valve assembly 600 to the blade holder assembly 400 during operation.

With continued reference to FIG. 10A, the backstop 616 of the top valve portion 602 can have a greater height (e.g., in the Z-direction) compared to the backstop 316 of the valve assembly 300 shown in FIG. 5A. The increased height of the backstop 616 can provide a benefit of minimizing the risk of tortillas unintentionally exiting the valve assembly 600 through the back (e.g., in the positive X-direction) instead of through the top valve hole 612 (e.g., in the negative Z-direction) when received from the infeed conveyor system 106. Because each tortilla is formed differently (e.g., due to the manufacturing tolerances during production, cooling conditions, operating environment, etc.), the flight characteristics of the tortillas during the transfer from the infeed conveyor system 106 to the valve assembly 600 can vary. Accordingly, including a backstop 616 with a substantially larger height than a standard tortilla can reduce the risk of lost tortillas. In some implementations, the valve assembly 300 can include a top valve hole 312 of a similar height as the top valve hole 612 of the valve assembly 600.

As described herein, tortillas can enter the valve assembly 600 via the recessed portion 614 from the infeed conveyor system 106. As such, it can be desirable for the valve assembly 600 to be positioned as close to the infeed conveyor system 106 as possible to minimize any gaps between the infeed conveyor system 106 and the valve assembly 600 where tortillas may be lost or redirected. As shown in FIG. 10A, the top valve portion 602 can include a front surface 615 that faces the infeed conveyor system 106 in the chip chopper system 100. The front surface 615 can be concave of curved in the X-direction. The curved front surface 615 can allow the valve assembly 600 to be positioned closer to the infeed conveyor system 106 compared to a flat surface. For example, the curved front surface 615 can accommodate or allow a portion of the infeed conveyor system 106 (e.g., a roller) to be positioned closer to the top valve portion 602 and/or to extend at least partially into the space defined by the front surface 615.

Figure 10D:
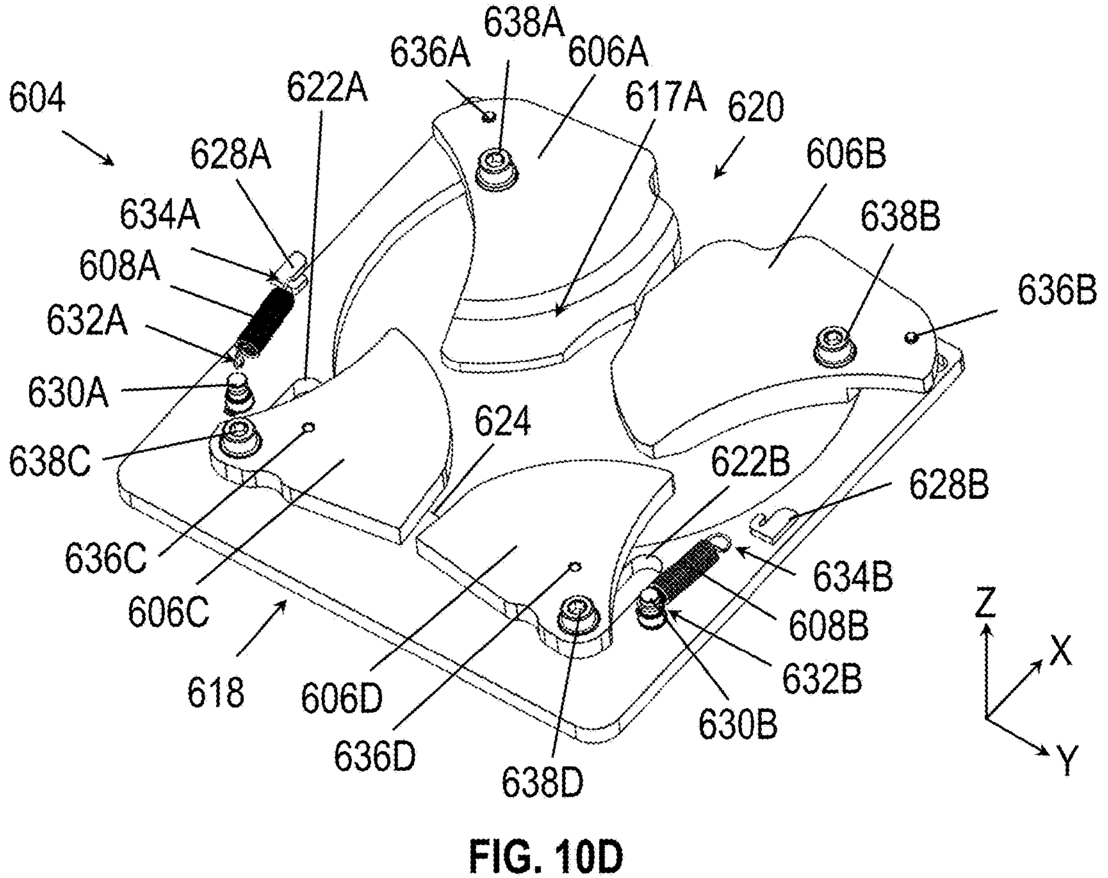
Figure 10E:
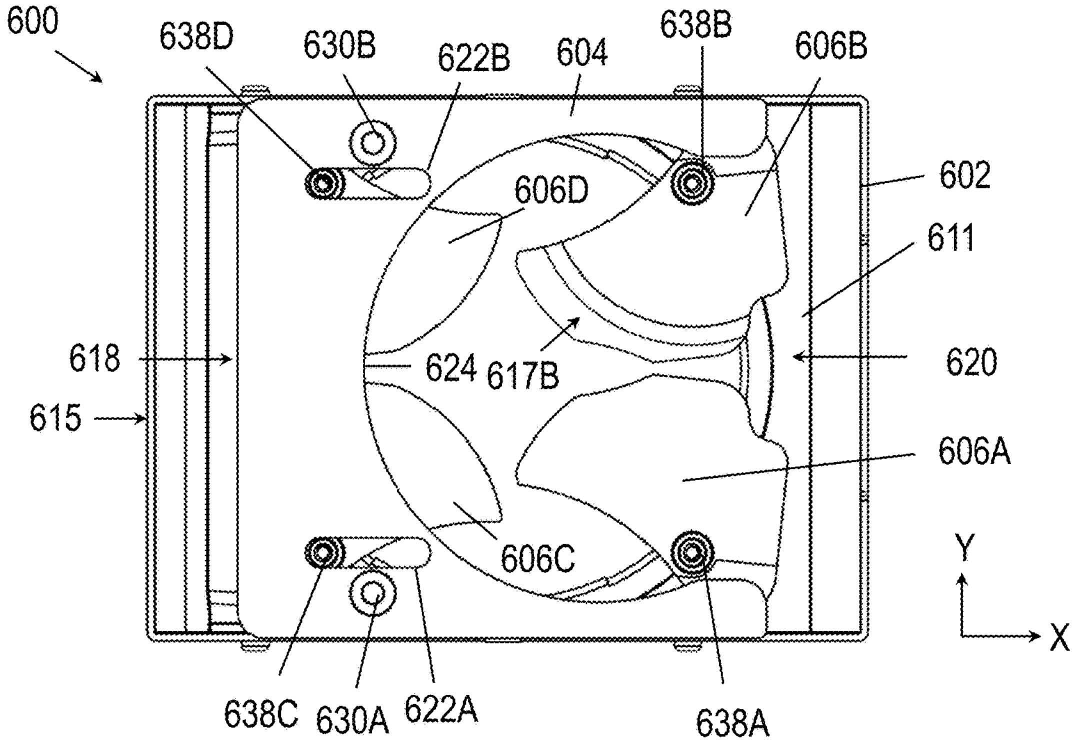
Figure 10F:
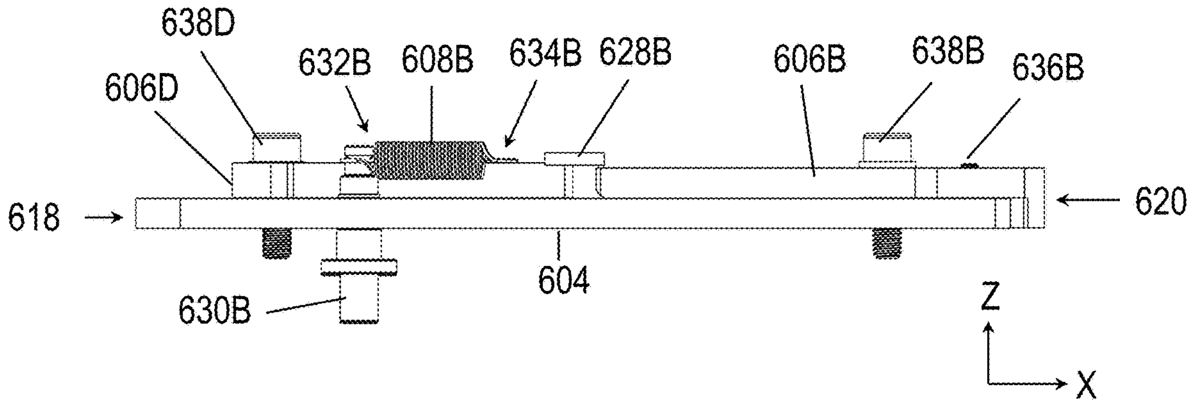

Referring now to FIGS. 10D-10F, a top perspective view, a bottom view, and a side view are shown respectively of the bottom valve portion 604, the vanes 606, and resilient members 608 of the valve assembly 600. The bottom valve portion 604 can support the vanes 606. The vanes 606 can be configured to rotate relative to the bottom valve portion 604. The vanes 606 form and support the stack of tortillas while the valve assembly 600 is in the closed configuration. The bottom valve portion 604 can also be configured to move relative to the top valve portion 602 and the valve support portion 250A such that the valve assembly 600 moves into the open configuration so stacks of tortillas can be delivered to the blade holder assembly 400. For example, movement of the bottom valve portion 604 and corresponding rotation of the vanes 606 allows the tortilla stack to pass through the valve assembly 600 and into the blade holder assembly 400. Each vane 606 can be rotational coupled to the bottom valve portion 604. Each vane 606 can be coupled to the bottom valve portion 604 via a vane pin 636, which can define the pivot point of rotation for the corresponding vane 606. Each vane 606 can also be coupled to the valve support portion 250A via a rotating assembly 638. As such, when the bottom valve portion 604 moves relative to both the valve support portion 250A and the top valve portion 602, the combination of the rotating assemblies 638 and the van pins 636 allow the vanes 606 to rotate relative to the bottom valve portion 604, moving the valve assembly 600 from the closed configuration to the open configuration.

As shown in FIG. 10D, the first vane 606A can be rotationally coupled to the bottom valve portion 604 at the back side 620 via a first vane pin 636A. The first vane 606A can be rotationally coupled to the valve support portion 250A via a rotating assembly 638A. For example, the rotating assembly may include one or more bushings, one or more bearings, one or more pins, and/or one or more fasteners. In one example, at least one bearing (e.g., a sleeve bearing and/or a thrust bearing) can be coupled to the first vane 606A (e.g., positioned in an opening of the first vane 606A) and configured to rotate about a pin coupled to the valve support portion 250A. In this example, the pin can include a channel that can be configured to receive a fastener to secure the pin to the valve support portion 250A. Further, in some case, one or more bushings may be positioned between the pin and the valve support portion 250A and/or between the pin and the bearing to reduce wear and friction. As such, motion of the bottom valve portion 604 causes the first vane 606A to rotate about the first vane pin 636A (e.g., about the Z-axis), because at least a portion of the rotating assembly 638A is fixed to the valve support portion 250A. As shown in FIG. 11B, which shows a top view of the bottom valve portion 604 and valve support portion 250A with the first vane 606A and fourth vane 606D removed for illustrative purposes, the first vane pin 636A can be located in a first pin slot 640A of the bottom valve portion 604. The first vane pin 636A can be fixed relative to the first pin slot 640A in the X-directions and the Z-directions, but moveable relative to the first pin slot 640A in the Y-direction (e.g., within the limits defined by the first pin slot 640A). For example, the first vane pin 636A can travel along the first pin slot 640A. As the bottom valve portion 604 moves relative to the valve support portion 250A in the positive and negative X-directions, the first pin slot 640A can accommodate some movement of the first vane pin 636A in the positive and negative Y-directions. This arrangement can allow for smoother rotation of the first vane 606A relative to the bottom valve portion 604. The second vane 606B, third vane 606C, and fourth vane 606D can be rotationally coupled to the bottom valve portion 604 via vane pins 636B, 636C, 636D in pin slots 640B, 640C, 640D respectively and rotationally coupled to the valve support portion 250A via rotating assemblies 638B, 638C, 638D respectively.

When the bottom valve portion 604 moves from the closed configuration to the open configuration (e.g., while traveling in the negative X-direction), each of the vanes 606 can rotate relative to the bottom valve portion 604, allowing an accumulated stack of tortillas to pass to the blade holder assembly 400. For example, both the first vane 606A and fourth vane 606D can rotate in the positive Z-direction relative to the bottom valve portion 604, and both the second vane 606B and third vane 606C can rotate in the negative Z-direction relative to the bottom valve portion 604. As shown in at least FIGS. 10D and 10E, the first vane 606A can include a tapered top portion 617A and the second vane 606B can include a tapered bottom portion 617B. The tapered portions 617A, 617B of the vanes 606A, 606B can be formed on the portions of the vanes 606A, 606B closest to each other when in the closed positions. The tapered portions 617A, 617B can allow the second vane 606B to be positioned at least partially over the first vane 606A as the vanes 606A, 606B rotate from the closed configuration to the open configuration. For example, the tapered portion 617A of the first vane 606A may be positioned at least partially below the tapered portion 617B of the second vane 606B at some point during the rotation of the vanes 606A, 606B. As such, the first vane 606A and the second vane 606B can be positioned closer together when in the closed configuration, minimizing a gap therebetween. Reducing the gap between the vanes 606A, 606B can provide a benefit of allowing the vanes 606A, 606B to define a more continuous surface for supporting the tortillas in the closed configuration. As shown in, FIG. 10C, which shows a top view of the valve assembly 600 in the open configuration, the vanes 606 are generally not visible through the top valve hole 612 when the valve assembly 600 is in the open configuration. As such, the stack of tortillas can pass cleanly through the valve assembly 600 and onto the blade holder assembly 400.

Referring back to FIGS. 10D and 10E, the valve assembly 600 can include a first slot 622A and a second slot 622B (collectively "slots 622"), similar to the valve assembly 300. The slots 622 can be cutouts extending through the bottom valve portion 604. The slots 622 can be located near the front side 618 of the bottom valve portion 604. The slots 622 can be configured to receive at least a portion of the rotating assemblies 638C, 638D of the vanes 606C, 606D. The slots 622 can allow the vanes 606C, 606D to be coupled to the valve support portion 250A via the rotating assemblies 638C, 638D extending through the bottom valve portion 604 via the slots 622. As such, the pivot points defined by the vane pins 636C, 636D of the vanes 606C, 606D can be located inwardly of the rotating assemblies 638C, 638D relative to the outside edges of the bottom valve portion 604.

Like, the valve assembly 300, the valve assembly 600 can include one or more resilient members 608. The resilient members 608 can be configured to bias the bottom valve portion 600 towards one of the closed configuration and the open configuration, depending on the implementation. In the illustrated example, the resilient members 608 can be configured to bias the valve assembly 600 towards the closed configuration. For example, the resilient members 608 can bias the bottom valve portion 604 in the positive X-direction relative to the top valve portion 602. As such, in the absence of an applied force by the blade holder assembly 400 (e.g., on the driving pins 630A, 630B), the resilient members 608 bias the bottom valve portion 604 in the positive X-direction, which can return the valve assembly 600 to the closed configuration. In the illustrated embodiment, the resilient members 608 are springs, and the valve assembly 600 includes a first spring 608A and a second spring 608B. The first spring 608A can have a first end 632A and a second end 634A. The first end 632A can be coupled to the first driving pin 630A and the second end 634 can be coupled to a spring holder 628A. The second spring 608B can have a first end 632B and a second end 634B. The first end 632B can be coupled to the driving pin 630B and the second end 634B can be coupled to a spring holder 628B. For illustrative purposes, the first spring 608A is shown disconnected from the driving pin 630A and the second spring 608B is shown disconnected from the spring holder 628B. The spring holders 628A, 628B can remain fixed during movement of the top valve portion 602, allowing the springs 608 to elongate and move into tension as the bottom valve portion 604 is driven in the negative X-direction. As shown in FIG. 10E, the spring holders 628A, 628B are suspended relative to the top surface of the bottom valve portion 604. The spring holders 628A, 628B may be coupled to the top valve portion 602 or the side members 222, 224 of the frame assembly 202 of at least FIG. 4A, in some examples. As explained herein, the driving pins 630A, 630B move in the X-direction (e.g., when the blade holder assembly 400 contacts and applies a force to the driving pins 630A, 630B, moving the valve assembly 600 into the open configuration, while the spring holders 628A, 628B remain fixed. As such, the springs 608A, 608B can extend and may be in tension. When the force applied to the driving pins 630A, 630B is removed (e.g., when the blade holder assembly 400 is retracted), the springs 608A, 608B compress, causing the bottom valve portion 604 to return to its original position (e.g., with the valve assembly 600 in the closed configuration).

Figure 11A:
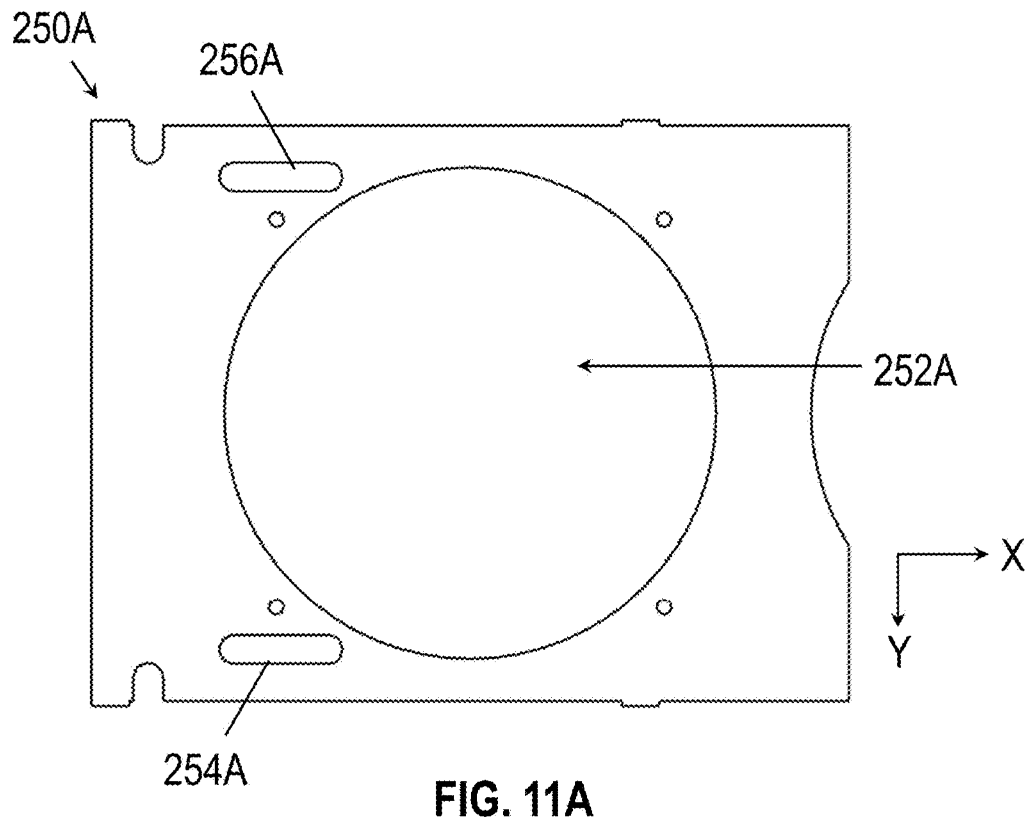
Figure 11B:
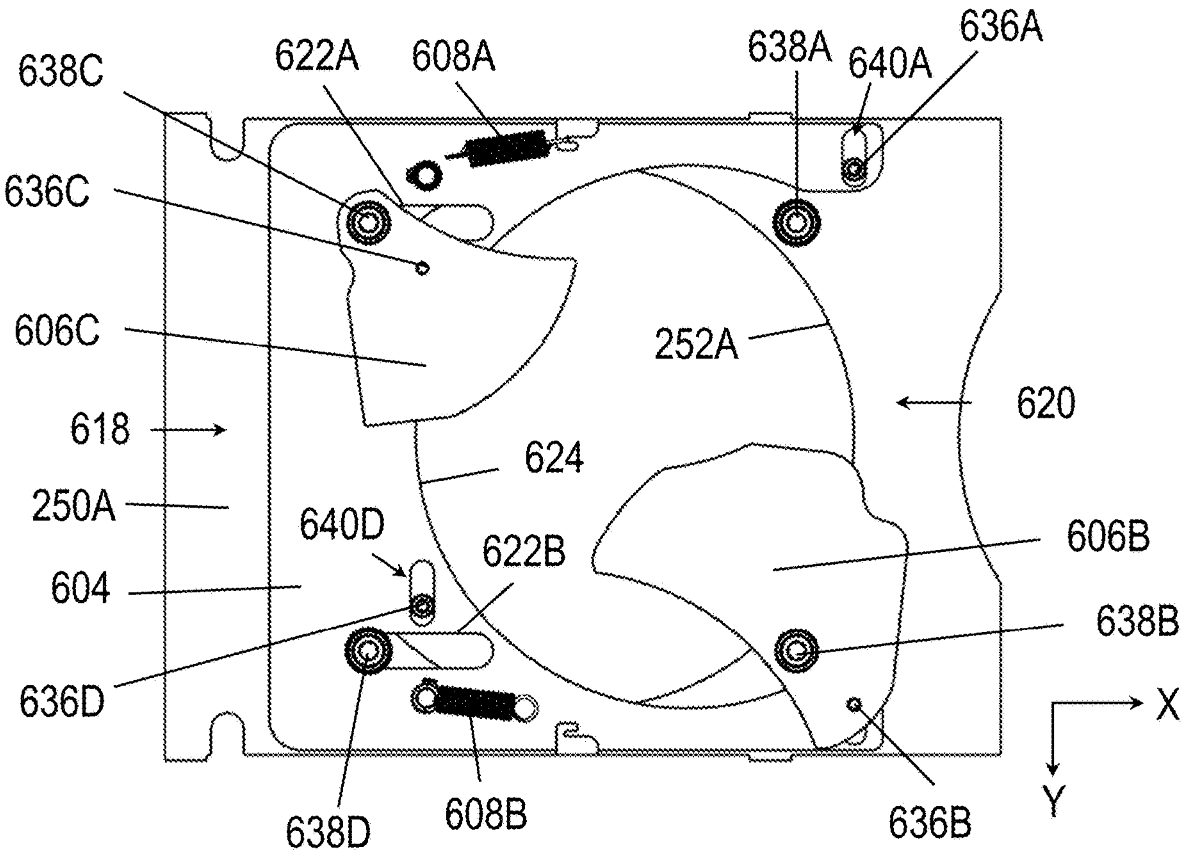
Figure 11C:
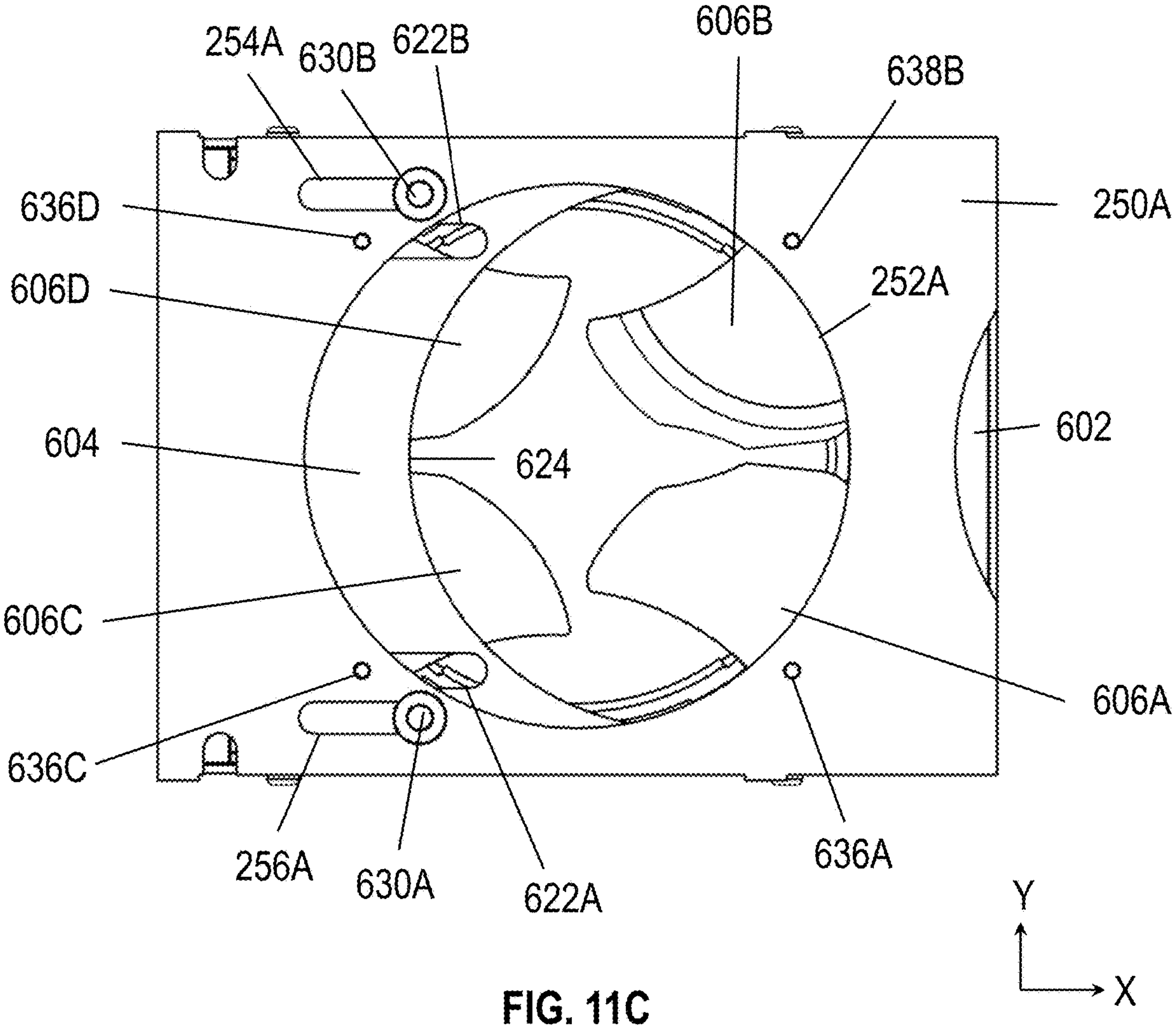

FIG. 11A illustrates a top view of the valve support portion 250A. FIG. 11B illustrates a top view of some components of the valve assembly 600 coupled to the valve support portion 250A. FIG. 11C illustrates a bottom view of some components of the valve assembly 600 coupled to the valve support portion 250A. The valve support portion 250A can function in a similar or identical manner relative to the valve assembly 600 as the valve support portion 250 functions relative to the valve assembly 300. For example, the valve support portion 250A can be configured to support the valve assembly 600. The valve support portion 250A can also work with the top valve portion 602 and the bottom valve portion 604 such that the valve assembly 600 can move between the open and closed configurations.

Figure 7A:
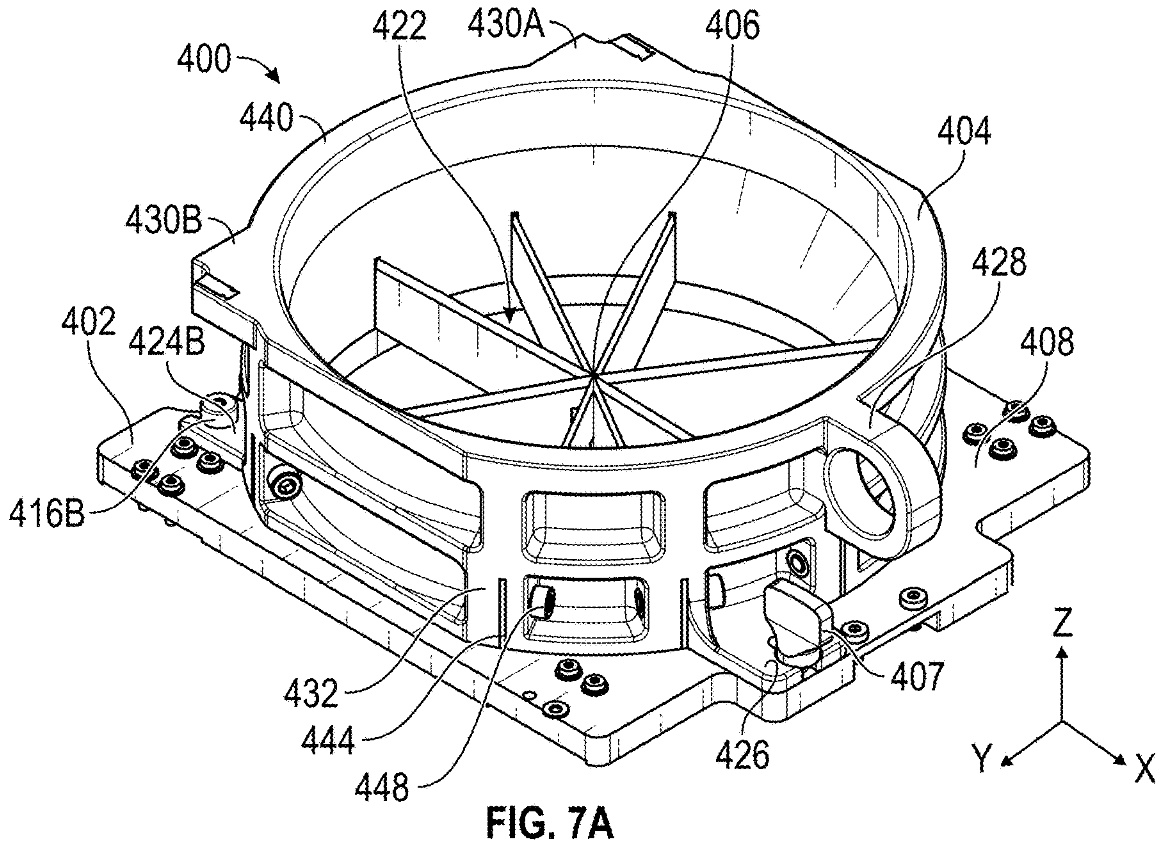
FIGS. 7A-7G illustrate various views of a blade holder assembly and components of the blade holder assembly of the chopping cartridge of FIG. 4A.
Figure 7B:
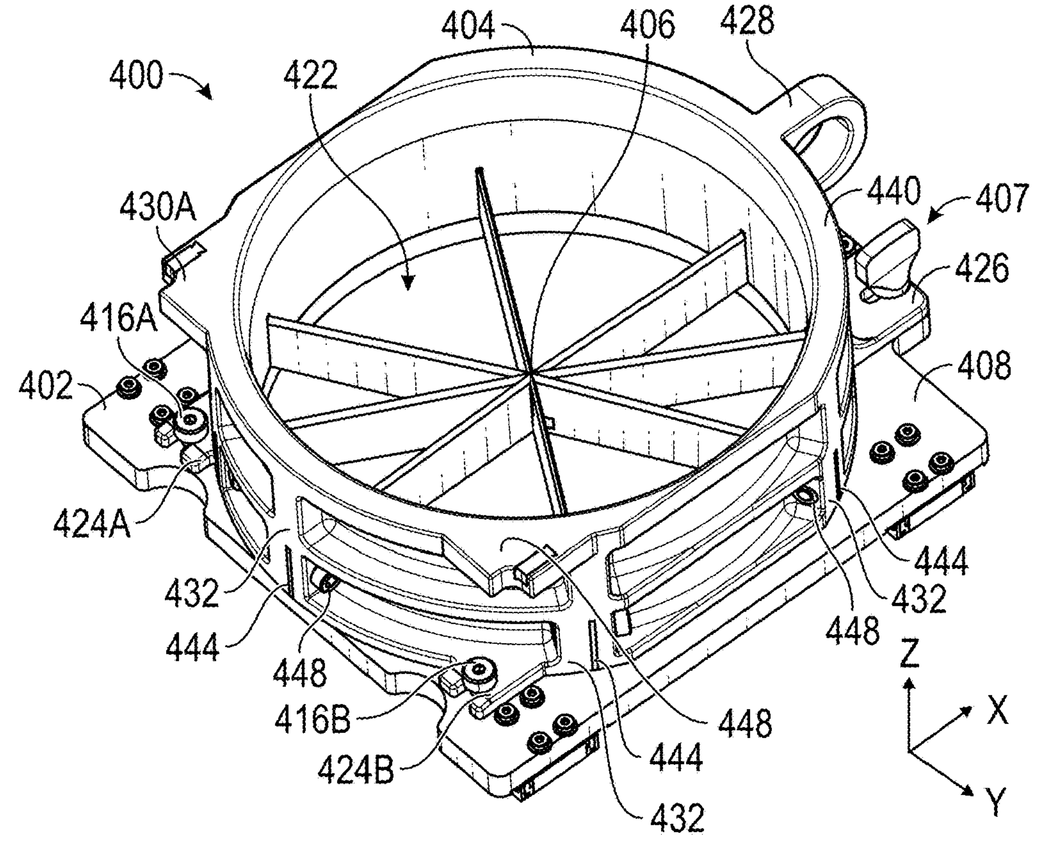
Figure 7C:
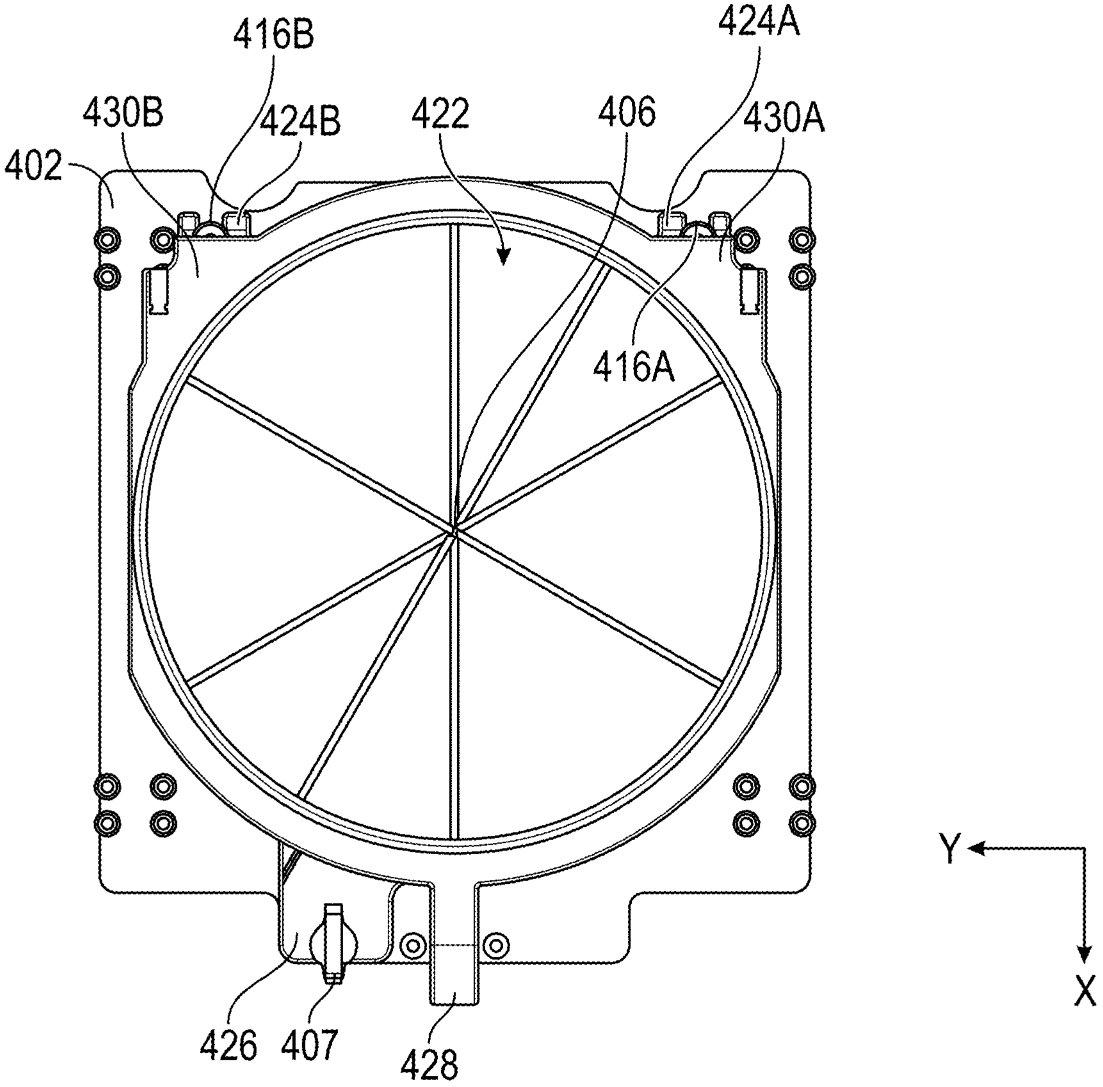
Figure 7D:
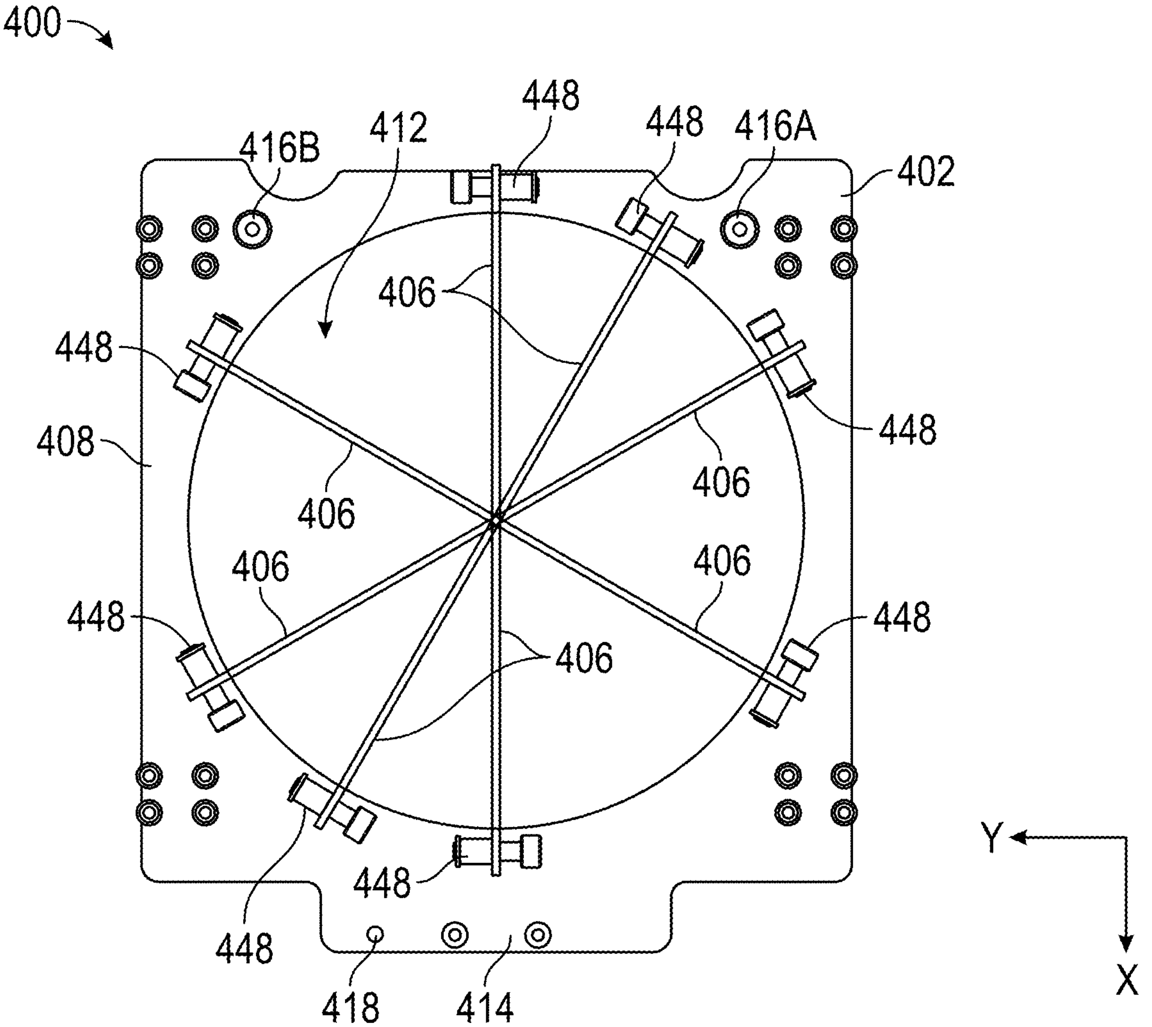
Figure 7E:
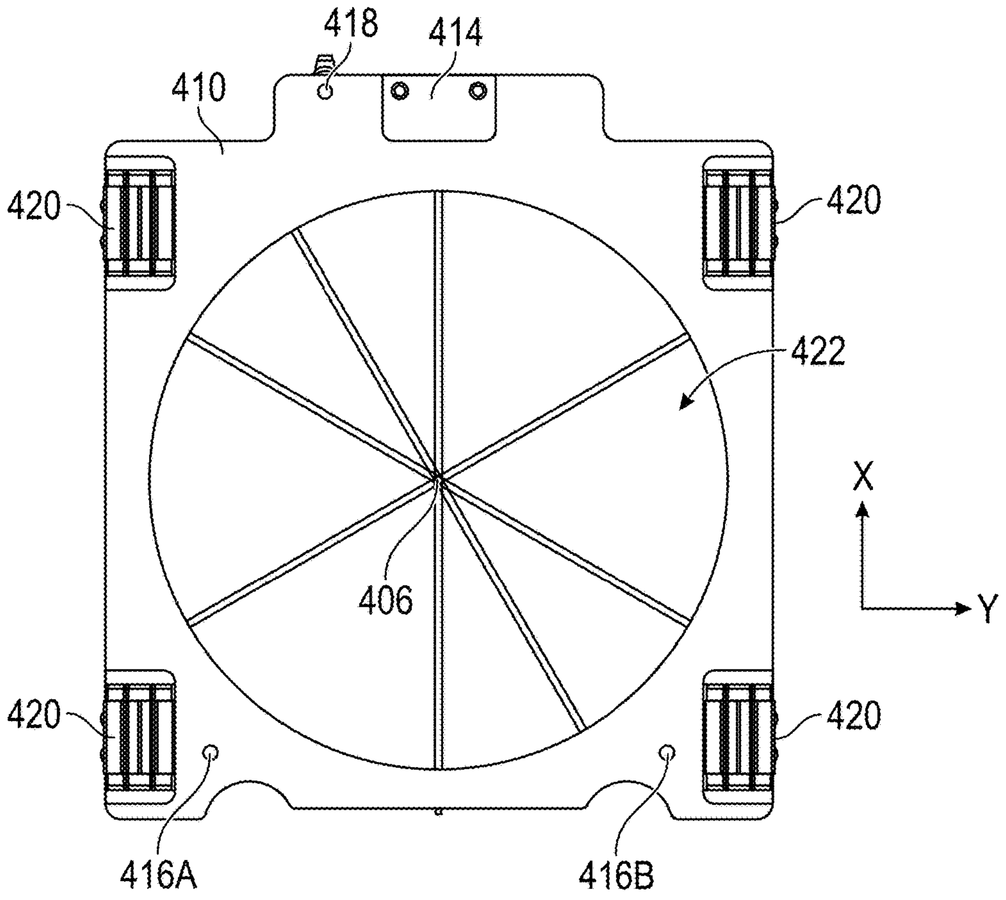
Figure 7F:
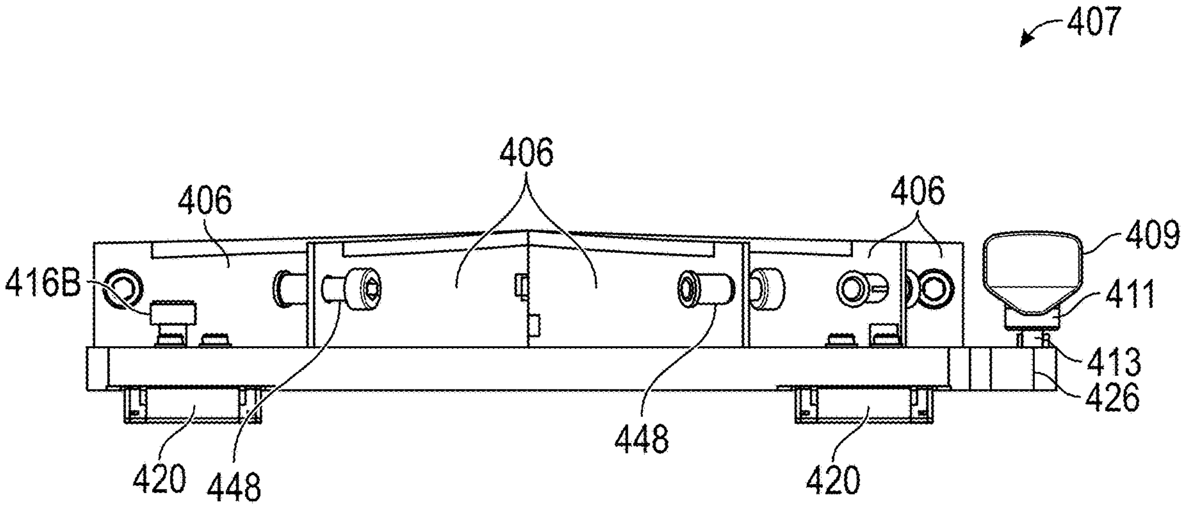
Figure 7G:
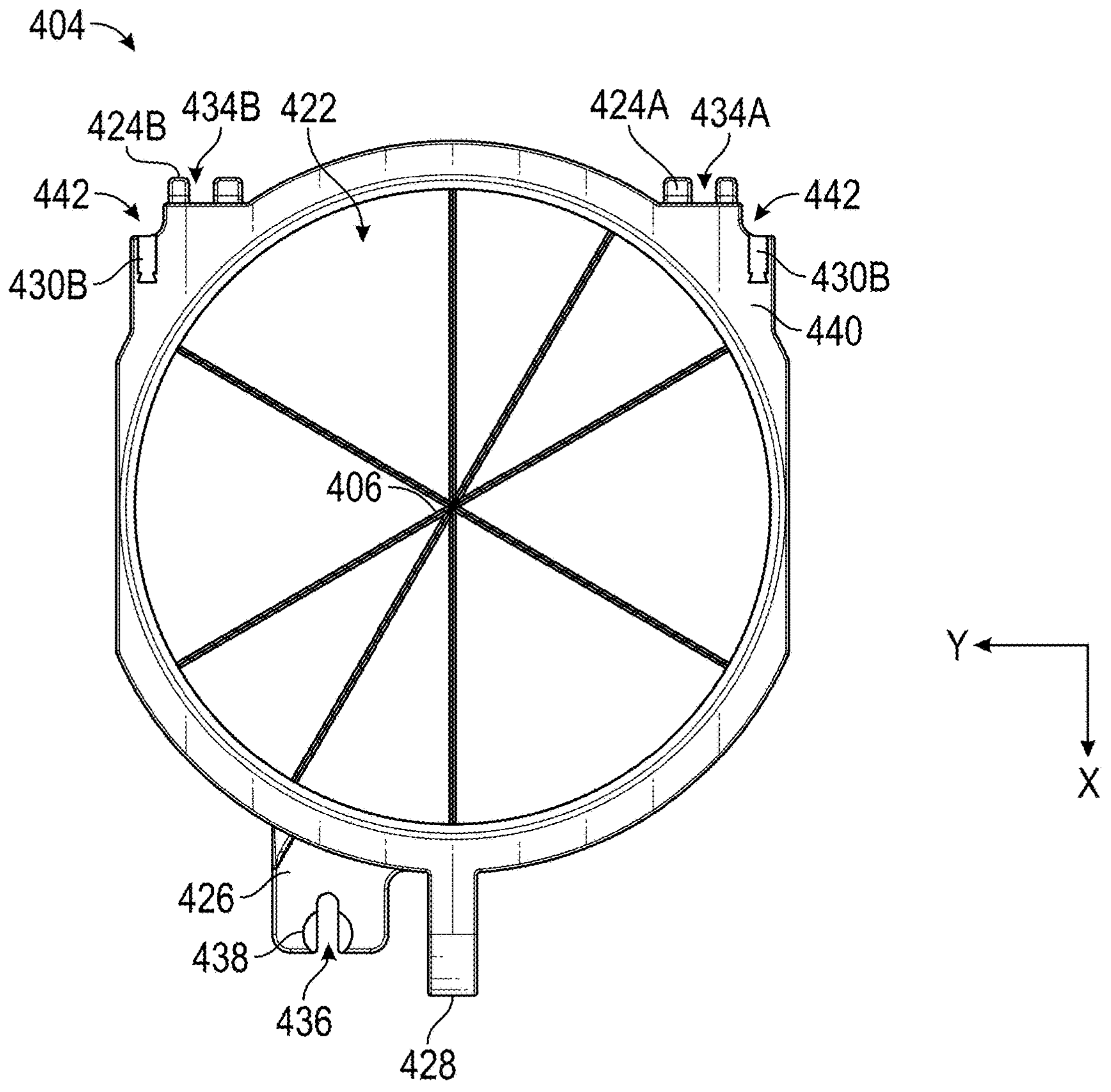

FIGS. 7A-7G illustrate various views of components of the blade holder assembly 400. The blade holder assembly 400 can be configured to receive and support stacks of tortillas from the valve assembly 300 or the valve assembly 600, depending on the implementation, and transfer the stacks of tortillas to different positions within the chopping cartridges 200. As explained herein, the blade holder assembly 400 can also be configured to cut the tortilla stacks into tortilla pieces in combination with the vertical actuator 206. The blade holder assembly 400 can include a base plate 402, a blade holder portion 404, a plurality of blades 406, and/or a thumb screw 407. FIGS. 7A-7C illustrate a top front perspective view, a top back perspective view, and a top view of the blade holder assembly 400. FIGS. 7D-7F illustrate a top view, a bottom view, and a side view of the base plate 402 and blades 406 of the blade holder assembly 400. FIG. 7G illustrates a top view of the blade holder portion 404 and the blades 406 of the blade holder assembly 400. As explained herein, in some embodiments, the blade holder portion 404 can be decoupled or removed from the base plate 402 by removing one or more fastening components (e.g., the thumb screw 407). This process can be a simple operation and may be completed throughout the day by an operator. It may be desirable to have an easily removable blade holder portion 404 such that the blade holder portion 404 can be changed in a short amount of time, with minimum interruption to the production assembly. An operator may remove the blade holder portion 404 to change the number of blade 406 includes in the blade holder assembly 400 (e.g., for different customer tortilla chip sizes) or to replace the blade holder portion 404 with another blade holder portion 404 that has a different number of blades 406. Additionally, this arrangement allows the base plate 402 to be more integrated into the chopping cartridges 200 (e.g., fastened to the connecting arm 204), without compromising the removability of the blades 406 via removal of the blade holder portion 404.

The base plate 402 can provide support for the blade holder portion 404. The blade holder portion 404 can be coupled to and/or can hold the blades 406. As described herein, the horizontal actuator 208 can drive the blade holder assembly 400 and cause the blade holder assembly 400 to travel along the X-axis. The blade holder assembly 400 can be coupled to the connecting arm 204 and can travel along the rails 220 of the base portion 214 of the frame assembly 202. The blade holder assembly 400 can move between a first/receiving configuration and a second/cutting configuration. In the receiving configuration, the horizontal actuating arm 246 of the horizontal actuator 208 can be at its most extended state, with the blade holder assembly 400 in the furthest position along the X-axis in the negative X-direction. In the receiving configuration, the blade holder assembly 400 can engage the valve assembly 300, causing the valve assembly 300 to move to the open configuration. In the receiving configuration, the blade holder assembly 400 can receive the stack of tortillas from the valve assembly 300. The stack of tortillas can travel through the valve assembly 300 and into the blade holder assembly 400, such that the stack of tortillas rest on and is supported by the blades 406. In the receiving configuration, a central axis of the blade holder portion 404 can be aligned with the central axis of the top valve hole 312. In the cutting configuration, the horizontal actuating arm 246 of the horizontal actuator 208 can be at its most retracted state, with the blade holder assembly 400 in the further position along the X-axis in the positive X-direction. In the cutting configuration, the blade holder assembly 400 can be disengaged from the valve assembly 300. As such, the valve assembly 300 can be in the closed configuration. In the cutting configuration, the blade holder assembly 400 can either be supporting the stack of tortillas or can have recently processed/cut the stack of tortillas though engagement with the ram 236. In the cutting configuration, a central axis of the blade holder portion 404 can be aligned with the central axis of the ram 236.

Referring to FIGS. 7C-7E, the base plate 402 can provide support for the other components of the blade holder assembly 400 (e.g., the blade holder portion 404). The base plate 402 can include a top side 408, a bottom side 410, a base plate hole 412, and/or an arm coupling portion 414. The top side 408 can support the blade holder portion 404. The bottom side 410 can engage the frame assembly 202. The base plate hole 412 can extend through the base plate 402. The base plate hole 412 can be configured to allow the cut tortillas pieces from the stack of tortillas to pass through the blade holder assembly 400. When the blade holder assembly 400 is in the cutting configuration, the base plate hole 412 can be positioned over the frame hole 218 of the base portion 214 of the frame assembly 202. As such, cut tortilla pieces passing through the blade holder assembly 400 can pass through the frame hole 218 and onto the discharge conveyor system 108. It should be noted that in the illustrated embodiment, the frame hole 218 is sufficiently large such that the base plate hole 412 can be positioned over the frame hole 218 in both the receiving and cutting configuration. However, such a large frame hole 218 is not required, but can provide a benefit of a lighter base portion 214 and less material required for the base portion 214. The arm coupling portion 414 can allow the base plate 402 to be coupled to the connecting arm 204. The arm coupling portion 414 can be coupled to the connecting arm 204 using any conventional fastening means, such as mechanical fasteners.

The base plate 402 can include a first holder pin 416A, a second holder pin 416B, and a thumb screw hole 418. The holder pins 416A, 416B can extend upwardly (e.g., in the positive Z-direction) from the top side 408 of the base plate 402. The holder pins 416A, 416B can be shoulder bolts. The holder pins 416A, 416B can be configured to engage slot projections 424 of the blade holder portion 404. The thumb screw hole 418 can be a hole extending through the base plate 402. The thumb screw hole 418 can be configured to receive the thumb screw 407. In some embodiments, the thumb screw hole 418 can be threaded. As described herein, the combination of the holder pins 416A, 416B and the thumb screw hole 418 can allow the blade holder portion 404 to be removably coupled to the base plate 402. In such an arrangement, the blade holder portion 404 can be easily removed from the base plate 402. It may be desirable to have an easily removable blade holder portion 404 such that the blade holder portion 404 can be changed in a short amount of time, with minimum interruption to the production assembly. An operator may remove the blade holder portion 404 to change the number of blade 406 includes in the blade holder assembly 400 (e.g., for different customer tortilla chip sizes) or to replace the blade holder portion 404 with another blade holder portion 404 that has a different number of blades 406.

Referring to FIGS. 7E and 7F, the bottom side 410 of the base plate 402 can include a plurality of rail guides 420. In the illustrated embodiment, the base plate 402 includes four rail guides 420. In other embodiments, the base plate 402 could include two, six, eight, and/or the like rail guides 420. The rail guides 420 can be bearing guides and can include bearings (not shown). The rail guides 420 can be configured to engage the rails 220 of the frame assembly 202. The rail guides 420 can allow the base plate 402 and the blade holder assembly 400 to travel smoothly along the rails 220 between the receiving configuration and the cutting configuration. As shown in FIG. 7F, the blades 406 can be positioned on the top side 408 of the base plate 402. In some embodiments, the blades 406 may contact the top side 408. In other embodiments, the blades 406 may be suspended above the top side 408 via the blade holder portion 404.

Referring back to FIGS. 7A-7C and 7G, the blade holder portion 404 can be configured to hold the blades 406. The blade holder portion 404 can also be configured to move the valve assembly 300 from the open configuration to the closed configuration, as explained herein. A blade holder hole 422 can extend through a body of the blade holder portion 404. A central axis of the blade holder hole 422 can be aligned with a central axis of the base plate hole 412 of the base plate 402. The blade holder hole 422 can be configured to receive the stack of tortillas from the valve assembly 300. The blade holder hole 422 can also configured to receive the ram 236 for cutting the stack of tortillas, as explained herein.

The blade holder portion 404 can include one or more slot projection(s) 424, a thumb screw projection 426, a handle 428, one or more valve engagement projection(s) 430, and/or a plurality of blade retaining portions 432. The slot projections 424 can be configured to interface with the base plate 402. For example, the slot projections 424 can engage the holder pins 416A, 416B of the base plate 402. The number of slot projections 424 can be defined by the number of holder pins 416. In the illustrated embodiment, the blade holder portion 404 includes a first slot projection 424A and a second slot projection 424B. The first slot projection 424A can be a projection extending from the blade holder portion 404. The first slot projection 424A can include a first slot 434A. The first slot 434A can be any suitable shape, such as semi-circular, square, rectangular, etc. Similarly, the second slot projection 424B can be a projection extending from the blade holder portion 404. The second slot projection 424B can include a second slot 434B. The second slot 434B can be any suitable shape, such as semi-circular, square, rectangular, etc. In the assembled blade holder assembly 400, the slot projection 424A, 424B can be at the bottom of the blade holder portion 404 and can be in contact with the top side 408 of the base plate 402 in some cases. The slot projections 424A, 424B can extend from the body of the blade holder portion 404 in the negative X-direction when the chopping cartridge 200 is assembled. The slot projection 424A, 424B can engage the holder pins 416A, 416B when the blade holder portion 404 is engaged with the base plate 402. The holder pins 416A, 416B can be received in the slots 434A, 434B in this arrangement, with a portion of the holder pins 416A, 416B extending above the height of the slots 434A, 434B. As such, movement of the blade holder portion 404 in the negative X-direction can be restricted by the base plate 402 via the holder pins 416A, 416B. The holder pins 416A, 416B can have top portions that are larger than the width of the slots 434A, 434B. As such, when the holder pins 416A, 416B are received in the slots 434A, 434B, movement of the blade holder portion 404 in the positive Z-direction can be restricted by the base plate 402 via the holder pins 416A, 416B. In some cases, the width of the slots 434A, 434B can be sized based on the diameter of the holder pins 416A, 416B. For example, it can be desirable for there to be a transition fit between the slots 434A, 434B and the holder pins 416A, 416B. In this arrangement, when the holder pins 416A, 416B are received in the slots 434A, 434B, movement of the blade holder portion 404 in the Y-direction can be restricted by the base plate 402 via the holder pins 416A, 416B.

The thumb screw projection 426 can be configured to interface with the base plate 402. The thumb screw projection 426 can also be configured to interface with the thumb screw 407 of the blade holder assembly 400. In some embodiments, the thumb screw projection 426 can be located on an opposite side of the body of the blade holder portion 404 than the slot projections 424A, 424B. The thumb screw projection 426 can be a projection extending from the body of the blade holder portion 404. The thumb screw projection 426 can include a thumb screw slot 436 and/or a thumb screw recess 438. The thumb screw slot 436 can be any suitable shape. The thumb screw recess 438 can be a recess extending from a top side of the thumb screw projection 426 and at least partially into the thumb screw projection 426 and the thumb screw slot 436. The thumb screw recess 438 can have a larger diameter than the width of the thumb screw slot 436. In the assembled blade holder assembly 400, the thumb screw projection 426 can be at the bottom of the blade holder portion 404 and can be in contact with the top side 408 of the base plate 402 in some cases. The thumb screw projection 426 can extend from the body of the blade holder portion 404 in the positive X-direction when the chopping cartridge 200 is assembled. The thumb screw projection 426 can engage the thumb screw 407 in the assembled blade holder assembly 400, as described herein, to further restrict the movement of the blade holder portion 404 relative to the base plate 402.

Referring to FIG. 7F, the thumb screw 407 can include a head 409, a shoulder 411, and a shaft 413. The shoulder 411 is positioned between the head 409 and the shaft 413. The shaft 413 can be threaded. The thumb screw 407 can be configured to be received within the base plate 402 via the thumb screw hole 418. For example, the thumb screw 407 can threadedly engage the thumb screw hole 418 via the shaft 413. The thumb screw 407 can be configured to secure the blade holder portion 404 to the base plate 402 and restrict the movement of the blade holder portion 404 in the positive X-direction relative to the base plate 402.

Referring back to FIGS. 7A-7C, in the assembled blade holder assembly 400, the slot projections 424A, 424B can be engaged with the holder pins 416A, 416B via the slots 434A, 434A. In this arrangement, the thumb screw slot 436 can be positioned over the thumb screw hole 418 of the base plate 402 such that the thumb screw hole 418 is exposed. The thumb screw 407 can be threaded into the thumb screw hole 418 via the shaft 413. In some cases, the shoulder 411 of the thumb screw 407 can be received within the thumb screw recess 438. In this arrangement, movement of the blade holder portion 404 in the positive X-direction relative to the base plate 402 can be restricted by the thumb screw 407. Additionally, in part because the shoulder 411 engages the thumb screw recess 438, movement of the blade holder portion 404 relative to the base plate 402 in the Z-direction can restricted. In some cases, the width of the thumb screw slot 436 can be sized based on the diameter of the shaft 413. For example, in some cases it can be desirable for there to be a transition fit between the thumb screw slot 436 and the shaft 413. In this arrangement, when the thumb screw 407 is received within the thumb screw slot 436 and the thumb screw hole 418, movement of the blade holder portion 404 relative to the base plate 402 in the Y-direction can be restricted by the base plate 402 via the thumb screw 407.

As noted herein, the blade holder portion 404 can be removable from the base plate 402 by removing one or more fastening components (e.g., the thumb screw 407). This process can be a simple operation and may be completed throughout the day by an operator. It may be desirable to have an easily removable blade holder portion 404 such that the blade holder portion 404 can be changed in a short amount of time, with minimum interruption to the production assembly. To remove the blade holder portion 404 from the base plate 402 (e.g., to change out the blade holder portion 404), the thumb screw 407 can be removed from the thumb screw hole 418 and the thumb screw slot 436. When the thumb screw 407 is removed, the blade holder portion 404 can freely move in the positive X-direction relative to the base plate 402. As such, an operator can slide the blade holder portion 404 in the in the positive X-direction to remove the blade holder portion 404 from the base plate 402. To insert a new blade holder portion 404 (e.g., with a different number of blades 406), the operator can slide the new blade holder portion 404 in the negative X-direction such that the holder pins 416A, 416B are received in the slot projection 424A, 424B. The operator can then reinsert (e.g., thread) the thumb screw 407 into the thumb screw hole 418 and the thumb screw slot 436, thus fixing the blade holder portion 404 to the base plate 402. The ease of replacing the blade holder portion 404 can enable an operator to be able to replace a blade holder portion 404 within a short time period of time (e.g., 30 seconds or less). The ease of replacement can provide a benefit of reducing the amount of wasted tortilla product. For example, the upstream production equipment can continue running, and only a few tortillas can be rejected during the blade holder portion 404 replacement.

In some embodiments, the blade holder portion 404 can include the handle 428. The handle 428 can allow the blade holder portion 404 to be more easily replaced. The handle 428 can extend from the body of the blade holder portion 404. The handle 428 can be located on the same side of the blade holder portion 404 as the thumb screw projection 426.

Referring to FIG. 7B, the blade holder portion 404 can include a first valve engagement projection 430A and a second valve engagement projection 430B. The valve engagement projections 430A, 430B can be configured to engage a portion of the valve assembly 300 (e.g., the driving pins 330A, 330B). The valve engagement projections 430A, 430B can be located on the same side of the blade holder portion 404 as the slot projections 424A, 424B. The valve engagement projections 430A, 430B can be projections extending from the body of the blade holder portion 404. The valve engagement projections 430A, 430B can be located at the top of the blade holder portion 404. For example, the valve engagement projections 430A, 430B can form a portion of a top rim 440 of the blade holder portion 404. In the illustrated embodiment, each valve engagement projection 430A, 430B includes a cutout 442. The cutout 442 can define the portions of the valve engagement projections 430A, 430B that contact the driving pins 330A, 330B. Other embodiments may not include the cutout 442. In operation, as the blade holder assembly 400 moves from the cutting configuration to the receiving configuration, the valve engagement projections 430A, 430B can contact the driving pins 330A, 330B. As the valve engagement projections 430A, 430B continues to engage the driving pins 330A, 330B, the blade holder assembly 400 can cause the valve assembly 300 to move from the closed configuration to the open configuration. At this point, the blade holder assembly 400 is in the receiving configuration. Once the blade holder assembly 400 has received the stack of tortillas, the blade holder assembly 400 can move back to the cutting configuration and the valve engagement projections 430A, 430B can disengage the driving pins 330A, 330B.

With continued reference to FIG. 7B, the blade holder portion 404 can include the plurality of blade retaining portions 432. The blade retaining portions 432 can be configured to hold the blades 406 in the blade holder assembly 400. The blade retaining portions 432 can be positioned around the body of the blade holder portion 404 on the bottom side of the blade holder portion 404. In some cases, the number of blade retaining portions 432 included in the blade holder portion 404 can be determined by the number of blades 406 included in the blade holder assembly 400. For example, when the blade holder assembly 400 includes four blades 406, the blade holder portion 404 may include four blade retaining portions 432, when the blade holder assembly 400 includes six blades 406, the blade holder portion 404 may include six plurality of blade holder portions 432, etc. In some cases, the number of blade retaining portions 432 can be defined by the maximum number of blades 406 the blade holder assembly 400 could include. For ease of illustration, the blade holder assembly 400 is illustrated as including eight blades 406. However, generally, the blade holder assembly 400 includes either four or six blades in operation. The illustrated blade holder assembly 400 shows a four blade 406 arrangement, where the four blades 406 form a cross or T-shape, as well as a six blade 406 arrangement, where the six blades 406 form a six-sided star shape.

Each blade retaining portion 432 can include a blade slot 444 and/or a through hole 446. The blade slot 444 can extend upwardly through the blade retaining portion 432. The blade slot 444 can be configured to receive a blade 406. The blade slot 444 can be perpendicular to the top side 408 of the base plate 402 in the assembled blade holder assembly 400. In some embodiments, the blade slot 444 may have an interference fit with the blade 406. The through hole 446 can be a hole that extends through the blade retaining portion 432 and the blade slot 444. A central axis of the through hole 446 can be orthogonal to the blade slot 444. In some embodiments, in the assembled blade holder portion 404, the through hole 446 can be aligned with a hole 458 of the blade 406. In other embodiments, the blade 406 may not include the hole 458. The through hole 446 can be configured to receive one or more fasteners 448. The one or more fasteners 448 can secure the blade 406 to the blade retaining portion 432. For example, where the blade 406 includes the hole 458, the one or more fasteners 448 can extend through the hole 458 of the blade 406. In another example, where the blades 406 do not include holes 458, the one or more fasteners 448 can apply a force to one or more sides of the blades 406.

Figure 8:
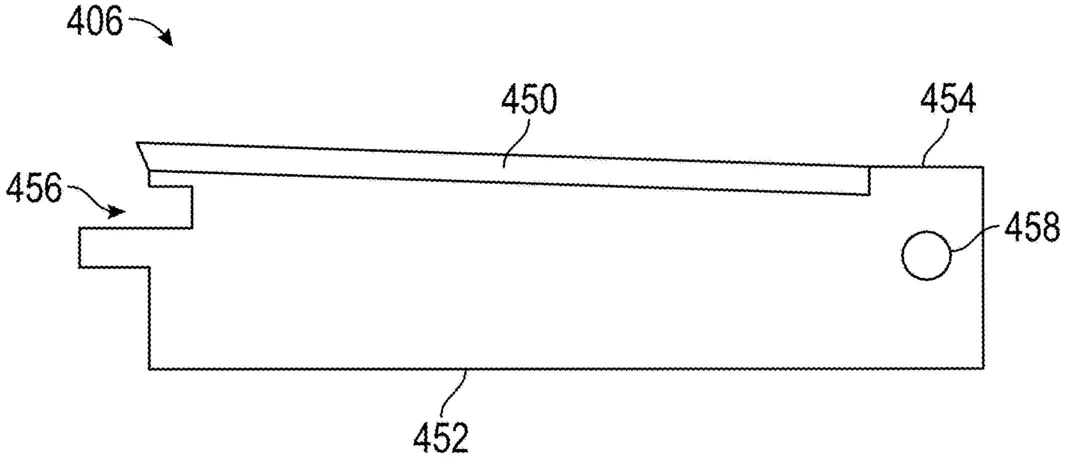
FIG. 8 illustrates a side view on an individual blade of the blade holder assembly of FIG. 7A.

FIG. 8 illustrates a side view on an individual blade 406 of the plurality of blades 406 of the blade holder assembly 400. The blades 406 can be configured to cut the stack of tortillas into tortilla pieces in combination with the ram 236. The blades 406 can be any suitable material, such as metal, plastic, and/or the like. The blade 406 can include a cutting edge 450, a bottom edge 452, a holder portion 454, and/or a blade connection portion 456. In the illustrated embodiment, the blade 406 also include the hole 458. The cutting edge 450 can be a sharp portion of the blade 406. The cutting edge 450 can be configured to cut tortillas. The cutting edge 450 can at least partially define a top edge of the blade 406. The bottom edge 452 can be opposite the cutting edge 450. In the assembled blade holder assembly 400, the blade 406 can be supported by the top side 408 of the base plate 402 via at least a portion of bottom edge 452 (see e.g., FIG. 7F). In some embodiments, the cutting edge 450 and the bottom edge 452 can be perpendicular to each other. In the illustrated embodiment, the cutting edge 450 and the bottom edge 452 are not perpendicular to each other. Instead, the cutting edge 450 extends at an upward angle relative to the cutting edge 450 moving from the holder portion 454 to the blade connection portion 456. This angle can provide a benefit of reducing the cutting pressure by a single point of contact along the cutting edge 450.

The holder portion 454 can be configured to secure the blade 406 to the blade holder portion 404 via the blade retaining portion 432. The holder portion 454 can extend into the blade slot 444 of the blade retaining portion 432. The holder portion 454 can define the remaining portion of the top edge of the blade 406 along with the cutting edge 450. The hole 458 can extend through the holder portion 454. The blade connection portion 456 can be configured to connect the individual blades 406 to each other. Different blades 406 in the blade holder assembly 400 can have different blade connection portions 456 that interface together. The blade connection portion 456 are located on an opposite side of the holder portion 454.

Figure 9A:
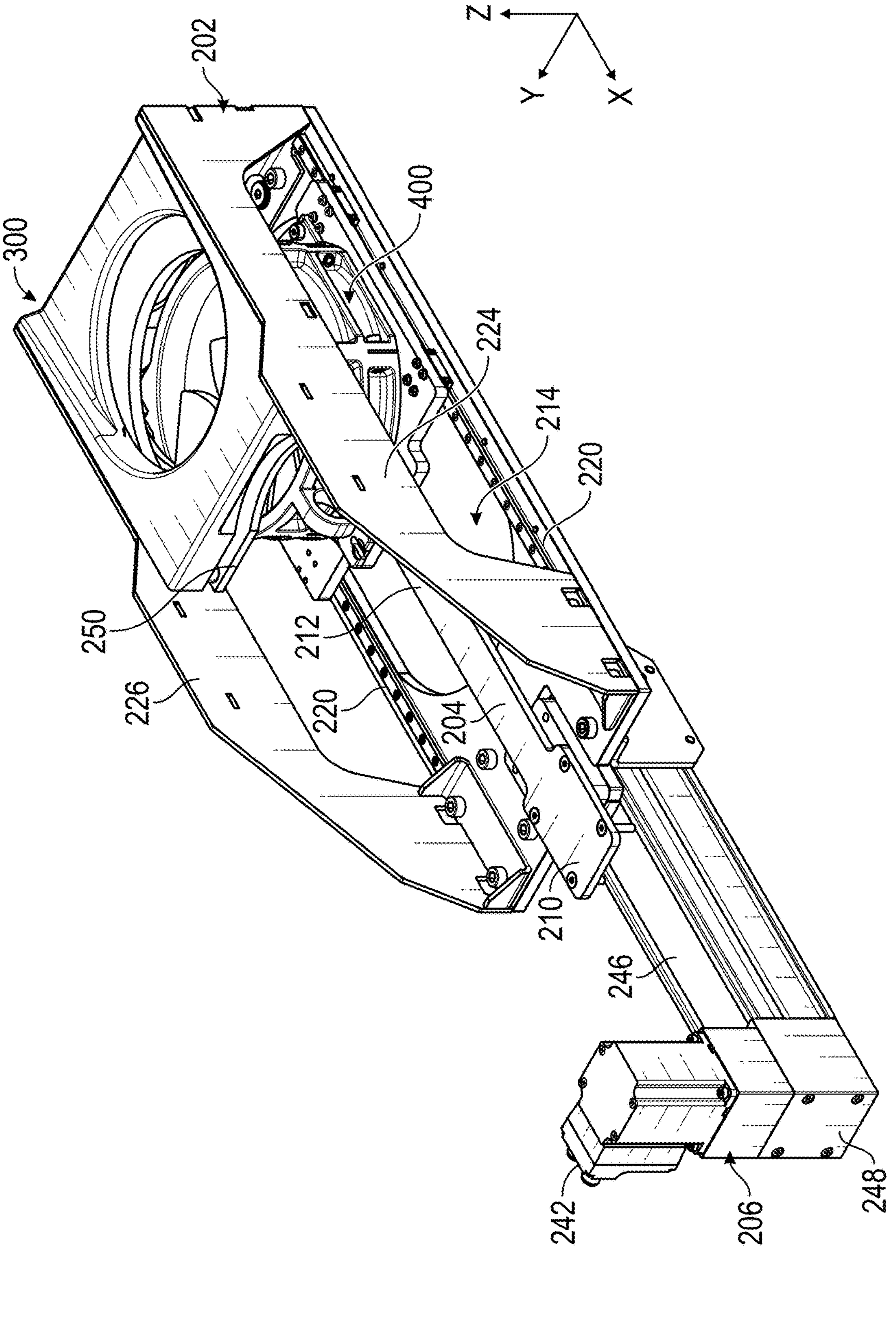
FIG. 9A illustrates the chopping cartridge of FIG. 4A with a vertical actuator removed.
Figure 9B:
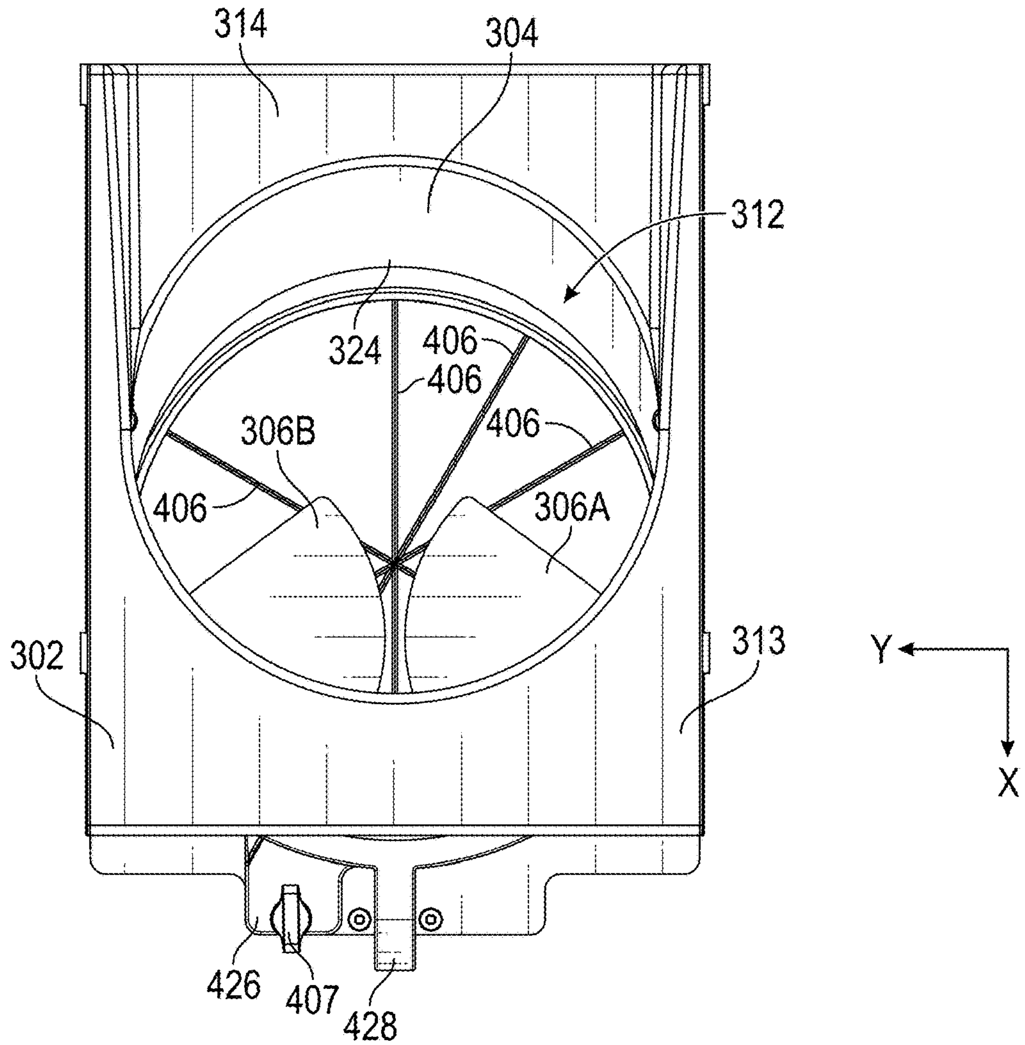
FIGS. 9B and 9C illustrate a top view and a side view of the valve assembly of FIG. 5A and the blade holder assembly of FIG. 7A.
Figure 9C:
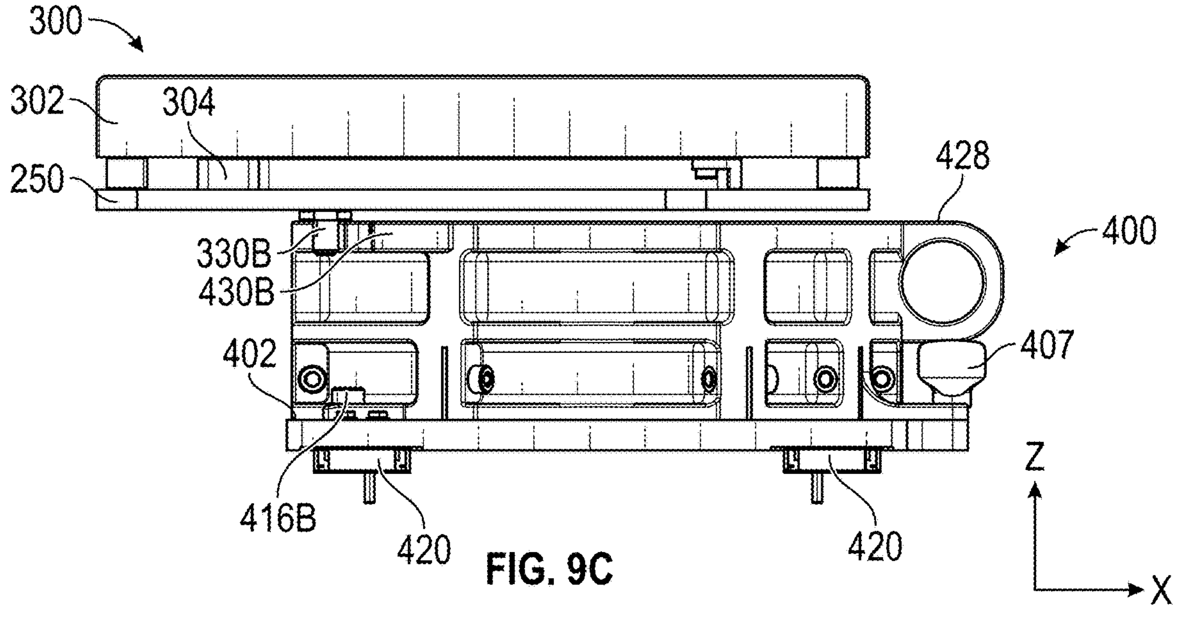

FIG. 9A illustrates an individual chopping cartridge 200 with the vertical actuator 206 removed for illustrative purposes. FIGS. 9B and 9C illustrate a top view and a side view of the valve assembly 300, blade holder assembly 400, and valve support portion 250 respectively. As shown, the valve support portion 250 is positioned below the valve assembly 300 and above the blade holder assembly 400 and supported by the frame assembly 202. In operation, the blade holder assembly 400 can travel below the valve support portion 250 without directly contacting the valve support portion 250.

In operation, tortillas can be received by the chip chopper system 100 from the upstream equipment. The tortillas can be received by the chip chopper system 100 in rows via the chute system 104. The rows of tortillas can travel down the chute plates 118 (in the receiving configuration) to the infeed conveyor belt 124. The infeed conveyor belt 124 can direct each row of tortillas to the individual chopping cartridges 200 for a cutting operation.

Each row of tortillas can enter an individual chopping cartridge 200 via the valve assembly 300. The infeed conveyor belt 124 can have a set velocity such that the tortillas can enter the valve assembly 300 with sufficient velocity to travel into the top valve hole 312 while maintaining a flat profile. For example, the tortillas can travel along the recessed portion 314 of the top valve portion 302 and into the top valve hole 312 such that the tortilla rests on the bottom valve portion 304 and the vanes 306A, 306B. The tortillas can enter the valve assembly 300 while the valve assembly 300 is in the closed configuration. In some cases, the tortillas may partially contact the backstop 316 of the top valve portion 302 before settling into the top valve hole 312. As each tortilla enters the valve assembly 300, the tortilla can come to rest on the preceding tortilla in the same row. As such, a stack of tortillas can begin to form in the valve assembly 300. The number of tortillas included in the stack can vary, depending on the implementation. In one example, the timing of the chip chopper system 100 may be set such that stacks include no more than 8 to 12 tortillas. Having stacks of tortillas in small sizes compared to conventional chip chopping systems (e.g., which can include 100 tortillas or more) can contribute to the chip chopper system 100 not requiring a waiting period before a cutting operation, as explained herein.

Once a stack of tortillas has formed in the valve assembly 300, the stack can be transferred to the blade holder assembly 400 when the valve assembly 300 moves from the closed configuration to the open configuration. For example, the horizontal actuator 208 can drive the horizontal actuating arm 246 in the negative X-direction, causing both the connecting arm 204 and the blade holder assembly 400 (e.g., via the base plate 402 on the rails 220) to move in the negative X-direction from the previous position of the blade holder assembly 400 (e.g., below the vertical actuator 206). Generally, the blade holder assembly 400 is either in the cutting configuration while the stack of tortillas is forming in the valve assembly 300 or in motion, traveling along the base portion 214 between the two configurations. As the blade holder assembly 400 travels under the valve support portion 250, the blade holder assembly 400 can begin to engage (e.g., apply a force to) the driving pins 330A, 330B of the valve assembly 300 via the valve engagement projections 430A, 430B respectively. Continued movement of the blade holder assembly 400 in the negative X-direction and engagement of the driving pins 330A, 330B with valve engagement projections 430A, 430B can cause the bottom valve portion 304 to move in the negative X-direction as the driving pins 330A, 330B travel along the frame slots 254, 256. This movement can cause the springs 308A, 308B to elongate and be in tension. As the bottom valve portion 304 continues to move in the negative X-direction, the bottom valve hole 324 can move from a misaligned position with the top valve hole 312 (see e.g., FIG. 5B), corresponding to the closed configuration, to an aligned position with the top valve hole 312 (see e.g., FIG. 5C), corresponding to the open configuration. Additionally, the vanes 306A, 306B can pivot about the rotating assemblies 338A, 338B respectively, which can cause the vanes 306A, 306B to rotate out of the bottom valve hole 324. As such, when the blade holder assembly 400 reaches the receiving configuration, the valve assembly 300 can be in the open configuration, as a result of engagement between the blade holder assembly 400 and the valve assembly 300 noted above. For further clarity, the blade holder assembly 400 causes the valve assembly 300 to move to the open configuration through direct engagement. As such, the stack of tortillas remains supported by the valve assembly 300 until the blade holder assembly 400 engages the valve assembly 300. Through continued engagement, the valve assembly 300 moves to the open configuration as the blade holder assembly 400 reaches the receiving configuration, and the stack of tortillas can travel through the top valve hole 312, the bottom valve hole 324, and the base plate hole 252 and into the blade holder hole 422. Generally, the timing of the chopping cartridges 200 is set such that the blade holder assembly 400 comes to rest in the receiving configuration before the stack of tortillas can completely pass through the valve assembly 300. In some cases, the timing of the movement of the valve assembly 300 from the closed configuration to the open configuration can be set such that the stack of tortillas remains in a flat orientation (e.g., in an X-Y plane) as the stack of tortillas travels into the blade holder assembly 400. As the stack of tortillas travels through the blade holder hole 422, the stack of tortillas can contact and come to rest on the blades 406 in the blade holder assembly 400.

Once the blade holder assembly 400 has received the stack of tortillas, the blade holder assembly 400 can move from the receiving configuration to the cutting configuration. For example, the horizontal actuator 208 can drive the horizontal actuating arm 246 in the positive X-direction, causing both the connecting arm 204 and the blade holder assembly 400 (e.g., via the base plate 402 on the rails 220) to move in the positive X-direction. As the blade holder assembly 400 travels in the positive X-direction, the valve engagement projections 430A, 430B can disengage the driving pins 330A, 330B such that the no force from the blade holder assembly 400 is applied to the driving pins 330A, 330B. As such, the tension in the springs 308A, 308B can cause the pins 330A, 330B to travel along the frame slots 254, 256 in the positive X-direction, which can cause the bottom valve portion 304 to travel in positive X-direction. As the bottom valve portion 304 continues to move in the positive X-direction, the bottom valve hole 324 can move from an aligned position with the top valve hole 312, corresponding to the open configuration, to a misaligned position with the top valve hole 312, corresponding to the closed configuration. Additionally, the vanes 306A, 306B can pivot about the rotating assemblies 338A, 338B respectively, which can cause the vanes 306A, 306B to rotate into the bottom valve hole 324. As such, the valve assembly 300 can move back to the closed configuration to receive another stack of tortillas. In some cases, the timing of the chip chopper system 100 can be set such that the blade holder assembly 400 can move from the closed configuration to the open configuration and back to the closed configuration without any tortillas completely entering the top valve hole 312. As such, a first stack of tortillas can drop into the blade holder assembly 400 without any tortillas in a second stack of tortillas entering the valve assembly 300 incorrectly.

As the blade holder assembly 400 continues to travel along the rails 220 in the positive X-direction, the blade holder assembly 400 can travel to the cutting configuration. In this position, the blade holder assembly 400 can be positioned under the ram 236, where a central axis of the ram 236 and/or vertical actuating arm 234 can be generally aligned with a central axis of the blade holder hole 422. Once the blade holder assembly 400 reaches the position corresponding to the cutting configuration, the ram 236 can travel from the top position in the negative Z-direction towards and into the blade holder hole 422. The ram 236 can then contact the stack of tortillas, pushing the stack through the blades 406. As the ram 236 reaches the bottom position, the stack of tortillas can be pressed through blade holder assembly 400 and the ram 236 can be in contact with the blades 406. The cut tortillas pieces can travel completely through the blade holder assembly 400 and through the frame hole 218 in the negative Z-direction. The cut tortillas pieces can land on the conveyor belt 128 of the discharge conveyor system 108 and be directed away from the chip chopper system 100 for further processing. The ram 236 can move out of the blade holder assembly 400 in the positive Z-direction and back to the top position and the process can be repeated.

Additional Embodiments

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include these features, elements and/or states.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

Additionally, features described in connection with one embodiment can be incorporated into another of the disclosed embodiments, even if not expressly discussed herein, and embodiments having the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Reference to any prior art in this description is not, and should not be taken as, an acknowledgement or any form of suggestion that that prior art forms part of the common general knowledge in the field of endeavor in any country in the world.

The invention may also be said broadly to consist in the parts, elements and features referred to or indicated in the description of the application, individually or collectively, in any or all combinations of two or more of said parts, elements or features.

Where, in the foregoing description, reference has been made to integers or components having known equivalents thereof, those integers are herein incorporated as if individually set forth. In addition, where the term "substantially" or any of its variants have been used as a word of approximation adjacent to a numerical value or range, it is intended to provide sufficient flexibility in the adjacent numerical value or range that encompasses standard manufacturing tolerances and/or rounding to the next significant figure, whichever is greater.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention. Accordingly, the scope of the present invention is intended to be defined only by the claims.

What is claimed is:

1. A cutting assembly configured to receive a food product and cut the food product, the cutting assembly comprising:

a valve having an open configuration and a closed configuration, wherein in the closed configuration, the valve is configured to receive and support the food product, and wherein in the open configuration, the valve opens to allow the food product to pass through the valve; and a blade assembly comprising one or more blades, the blade assembly configured to move between a receiving configuration and a cutting configuration, wherein when the blade assembly is in the receiving configuration, the blade assembly is positioned below the valve to receive the food product passing through the valve.

2. The cutting assembly of claim 1, wherein the valve is configured to receive a stack of the food product when the valve is in the closed configuration.

3. The cutting assembly of claim 1, further comprising a vertical press configured to move between a top position and a bottom position, wherein when the blade assembly is in the cutting configuration, the blade assembly is positioned below the vertical press and the vertical press is allowed to press the food product through the blade assembly to cut the food product.

4. The cutting assembly of claim 3, wherein the blade assembly moves between the receiving configuration and the cutting configuration in a horizontal direction perpendicular to movement of the vertical press.

5. The cutting assembly of claim 4, wherein the blade assembly is configured to engage the valve in the receiving configuration, wherein the blade assembly is configured to move the valve from the closed configuration to the open configuration when engaged with the valve.

6. The cutting assembly of claim 5, wherein the valve comprises one or more resilient members, the one or more resilient members configured to return the valve to the closed configuration when the valve is not engaged with the blade assembly.

7. The cutting assembly of claim 6, wherein the blade assembly is configured to apply a horizontal force to the one or more resilient members, the horizontal force causing the valve to move to the open configuration.

8. The cutting assembly of claim 1, wherein the valve comprises one or more vanes configured to support the food product in the closed configuration.

9. The cutting assembly of claim 8, wherein the valve further comprises:

a top valve portion comprising a first hole; and a bottom valve portion comprising a second hole, the bottom valve portion positioned below the top valve portion, the bottom valve portion configured to move relative to the top valve portion, wherein in the open configuration the second hole is aligned with the first hole, wherein in the closed configuration the second hole is misaligned with the first hole.

10. The cutting assembly of claim 9, wherein the one or more vanes are rotationally coupled to the bottom valve portion, the one or more vanes extending into the second hole in the closed configuration, the one or more vanes rotating outwardly from the second hole in the open configuration.

11. The cutting assembly of claim 1, wherein the blade assembly comprises:

a blade holder portion comprising:

a body; and a blade holder hole, the blade holder hole extending through the body; and one or more blades, the one or more blades coupled to the body and extending across the blade holder hole.

12. The cutting assembly of claim 11, wherein the blade holder portion further comprises a handle coupled to an outer surface of the body.

13. The cutting assembly of claim 11, wherein the blade assembly further comprises a base plate, the body configured to be removably coupled to the base plate.

14. The cutting assembly of claim 13, wherein the blade assembly further comprises a fastener, the fastener configured to by removably coupled to the base plate, wherein the body is fixed to the base plate when the fastener is coupled to the base plate, wherein the body is removable from the base plate when the fastener is not coupled to the base plate.

15. The cutting assembly of claim 13, wherein the base plate comprises a base plate hole, the blade holder hole aligned with the base plate hole.

16. The cutting assembly of claim 11, wherein the one or more blades comprise four blades, the four blades intersecting within the blade holder hole.

17. The cutting assembly of claim 16, wherein the four blades form a cross shape within the blade holder hole.

18. The cutting assembly of claim 11, wherein the one or more blades comprise six blades, the six blades intersecting within the blade holder hole.

19. The cutting assembly of claim 1, further comprising a bottom frame portion and a top frame portion coupled to the bottom frame portion, the valve coupled to the top frame portion, the blade assembly configured to translate along the bottom frame portion between the receiving configuration and the cutting configuration.

20. A cutting assembly configured to receive a food product and cut the food product, the cutting assembly comprising:

a valve comprising one or more shutters configured to move between a first configuration, in which the food product is supported by the valve, and a second configured, in which the food product can pass through the valve; and a blade assembly comprising one or more blades, the blade assembly configured to receive the food product from the valve and to cut the food product.

* * * * *